United States Patent
Tamura

(10) Patent No.: US 10,166,784 B2
(45) Date of Patent: Jan. 1, 2019

(54) PHOTOTHERMAL CONVERSION IMAGE GENERATING DEVICE, THREE-DIMENSIONAL IMAGE FORMING SYSTEM, AND COMPUTER READABLE STORAGE MEDIUM

(71) Applicant: CASIO COMPUTER CO., LTD., Tokyo (JP)

(72) Inventor: Koji Tamura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/656,304

(22) Filed: Jul. 21, 2017

(65) Prior Publication Data
US 2018/0037033 A1    Feb. 8, 2018

(30) Foreign Application Priority Data

Aug. 8, 2016   (JP) .................................. 2016-155215
May 25, 2017  (JP) .................................. 2017-104011

(51) Int. Cl.
| | | |
|---|---|---|
| B41J 3/60 | (2006.01) | |
| B41J 2/435 | (2006.01) | |
| B29C 64/00 | (2017.01) | |
| B41J 29/38 | (2006.01) | |
| B41J 29/377 | (2006.01) | |

(52) U.S. Cl.
CPC ................. *B41J 3/60* (2013.01); *B29C 64/00* (2017.08); *B41J 2/435* (2013.01); *B41J 29/377* (2013.01); *B41J 29/38* (2013.01)

(58) Field of Classification Search
CPC ...................................................... B41J 3/407
See application file for complete search history.

(56) References Cited

U.S. PATENT DOCUMENTS

| | | | |
|---|---|---|---|
| 9,162,486 B2 * | 10/2015 | Motoyanagi | B41J 11/002 |
| 2013/0161874 A1 * | 6/2013 | Horiuchi | B29C 44/022 |
| | | | 264/415 |
| 2013/0168903 A1 * | 7/2013 | Horiuchi | B29C 44/0461 |
| | | | 264/413 |
| 2017/0195522 A1 * | 7/2017 | Suzuki | H04N 1/4072 |

FOREIGN PATENT DOCUMENTS

| | | |
|---|---|---|
| JP | S64-28660 A | 1/1989 |
| JP | 2001-150812 A | 6/2001 |

* cited by examiner

*Primary Examiner* — Shelby L Fidler
(74) *Attorney, Agent, or Firm* — Chen Yoshimura LLP

(57) ABSTRACT

A photothermal conversion image generating device that generates a photothermal conversion image for forming a three-dimensional image by causing a thermally expandable sheet having a thermally expandable layer on a base material to expand, the device including: a processor that allocates, based on a line width of a line forming the three-dimensional image, an image for forming the line to either a front surface of the thermally expandable sheet or a rear surface of the thermally expandable sheet.

8 Claims, 58 Drawing Sheets

311

| Height [mm] | Line Width [mm] | Drawing Surface | Black Ink Density [%] |
|---|---|---|---|
| 0.1 | 0.3 | Front | 10 |
| 0.2 | 0.3 | Front | 20 |
| 0.3 | 0.3 | Front | 30 |
| 0.4 | 0.3 | Front | 40 |
| 0.5 | 0.3 | Front | 50 |
| ... | ... | ... | ... |
| 0.1 | 1.0 | Rear | 5 |
| 0.2 | 1.0 | Rear | 10 |
| 0.3 | 1.0 | Rear | 15 |
| 0.4 | 1.0 | Rear | 20 |
| 0.5 | 1.0 | Rear | 25 |
| ... | ... | ... | ... |

311

| Height [mm] | Line Width [mm] | Drawing Surface | Black Ink Density [%] |
|---|---|---|---|
| 0.1 | 0.3 | Front | 10 |
| 0.2 | 0.3 | Front | 20 |
| 0.3 | 0.3 | Front | 30 |
| 0.4 | 0.3 | Front | 40 |
| 0.5 | 0.3 | Front | 50 |
| ... | ... | ... | ... |
| 0.1 | 1.0 | Rear | 5 |
| 0.2 | 1.0 | Rear | 10 |
| 0.3 | 1.0 | Rear | 15 |
| 0.4 | 1.0 | Rear | 20 |
| 0.5 | 1.0 | Rear | 25 |
| ... | ... | ... | ... |

FIG. 5

| Front Surface Line Width [mm] | Rear Surface Line Width [mm] | Height of Intersection and Line [mm] | Front Surface Black Ink Density [%] | Rear Surface Black Ink Density [%] |
|---|---|---|---|---|
| 0.3 | 1.0 | 0.1 | 5 | 2.5 |
| 0.3 | 1.0 | 0.2 | 10 | 5 |
| 0.3 | 1.0 | 0.3 | 15 | 7.5 |
| 0.3 | 1.0 | 0.4 | 20 | 10 |
| 0.3 | 1.0 | 0.5 | 25 | 12.5 |
| ... | ... | ... | ... | ... |

| [mm] | [mm] | [mm] | [mm] | | [%] | [%] |
|---|---|---|---|---|---|---|
| Front Surface Line Width | Front Surface Line Height | Rear Surface Line Width | Rear Surface Line Height | Height Setting | Front Surface Black Ink Density | Rear Surface Black Ink Density |
| 0.3 | 0.1 | 1.0 | 0.1 | Equal to height of thin line | 4 | 0 |
| 0.3 | 0.1 | 1.0 | 0.2 | | 4 | 0 |
| 0.3 | 0.1 | 1.0 | 0.3 | | 4 | 0 |
| 0.3 | 0.1 | 1.0 | 0.4 | | 3 | 0 |
| 0.3 | 0.1 | 1.0 | 0.5 | | 3 | 0 |
| ... | ... | ... | ... | | ... | ... |
| 0.3 | 0.2 | 1.0 | 0.1 | | 9 | 0 |
| 0.3 | 0.2 | 1.0 | 0.2 | | 9 | 0 |
| 0.3 | 0.2 | 1.0 | 0.3 | | 8 | 0 |
| 0.3 | 0.2 | 1.0 | 0.4 | | 7 | 0 |
| 0.3 | 0.2 | 1.0 | 0.5 | | 7 | 0 |
| ... | ... | ... | ... | | ... | ... |
| 0.3 | 0.3 | 1.0 | 0.1 | | 14 | 0 |
| 0.3 | 0.3 | 1.0 | 0.2 | | 13 | 0 |
| 0.3 | 0.3 | 1.0 | 0.3 | | 12 | 0 |
| 0.3 | 0.3 | 1.0 | 0.4 | | 12 | 0 |
| 0.3 | 0.3 | 1.0 | 0.5 | | 11 | 0 |
| ... | ... | ... | ... | ... | ... | ... |
| 0.3 | 0.1 | 1.0 | 0.1 | Equal to height of thick line | 0 | 5 |
| 0.3 | 0.1 | 1.0 | 0.2 | | 0 | 10 |
| 0.3 | 0.1 | 1.0 | 0.3 | | 0 | 15 |
| 0.3 | 0.1 | 1.0 | 0.4 | | 0 | 20 |
| 0.3 | 0.1 | 1.0 | 0.5 | | 0 | 25 |
| ... | ... | ... | ... | | ... | ... |
| 0.3 | 0.2 | 1.0 | 0.1 | | 0 | 5 |
| 0.3 | 0.2 | 1.0 | 0.2 | | 0 | 10 |
| 0.3 | 0.2 | 1.0 | 0.3 | | 0 | 15 |
| 0.3 | 0.2 | 1.0 | 0.4 | | 0 | 20 |
| 0.3 | 0.2 | 1.0 | 0.5 | | 0 | 25 |
| ... | ... | ... | ... | | ... | ... |
| 0.3 | 0.3 | 1.0 | 0.1 | | 0 | 5 |
| 0.3 | 0.3 | 1.0 | 0.2 | | 0 | 10 |
| 0.3 | 0.3 | 1.0 | 0.3 | | 0 | 15 |
| 0.3 | 0.3 | 1.0 | 0.4 | | 0 | 20 |
| 0.3 | 0.3 | 1.0 | 0.5 | | 0 | 25 |
| ... | ... | ... | ... | ... | ... | ... |

| Height [mm] | Post-expansion Line Width [mm] | Pre-expansion Line Width [mm] | Drawing Surface | Black Ink Density [%] |
|---|---|---|---|---|
| 0.1 | 0.4 | 0.3 | Front | 10 |
| 0.2 | 0.4 | 0.3 | Front | 20 |
| 0.3 | 0.4 | 0.3 | Front | 30 |
| 0.4 | 0.4 | 0.3 | Front | 40 |
| 0.5 | 0.4 | 0.3 | Front | 50 |
| ... | ... | ... | ... | ... |
| 0.1 | 1.2 | 1.0 | Rear | 5 |
| 0.2 | 1.2 | 1.0 | Rear | 10 |
| 0.3 | 1.2 | 1.0 | Rear | 15 |
| 0.4 | 1.2 | 1.0 | Rear | 20 |
| 0.5 | 1.2 | 1.0 | Rear | 25 |
| ... | ... | ... | ... | ... |

| Front Surface Pre-expansion Line Width [mm] | Rear Surface Pre-expansion Line Width [mm] | Height of Intersection and Line [mm] | Front Surface Black Ink Density [%] | Rear Surface Black Ink Density [%] |
|---|---|---|---|---|
| 0.3 | 1.0 | 0.1 | 5 | 2.5 |
| 0.3 | 1.0 | 0.2 | 10 | 5 |
| 0.3 | 1.0 | 0.3 | 15 | 7.5 |
| 0.3 | 1.0 | 0.4 | 20 | 10 |
| 0.3 | 1.0 | 0.5 | 25 | 12.5 |
| ... | ... | ... | ... | ... |

FIG. 39

| | | | | | | | |
|---|---|---|---|---|---|---|---|
| [mm] | [mm] | [mm] 312A | [mm] | | [%] | [%] | |
| Front Surface Pre-expansion Line Width | Front Surface Line Expansion Height | Rear Surface Pre-expansion Line Width | Rear Surface Line Expansion Height | Height Setting | Front Surface Black Ink Density | Rear Surface Black Ink Density | |
| 0.3 | 0.1 | 1.0 | 0.1 | Equal to height of thin line | 4 | 0 |
| 0.3 | 0.1 | 1.0 | 0.2 | | 4 | 0 |
| 0.3 | 0.1 | 1.0 | 0.3 | | 4 | 0 |
| 0.3 | 0.1 | 1.0 | 0.4 | | 3 | 0 |
| 0.3 | 0.1 | 1.0 | 0.5 | | 3 | 0 |
| ... | ... | ... | ... | | ... | ... |
| 0.3 | 0.2 | 1.0 | 0.1 | | 9 | 0 |
| 0.3 | 0.2 | 1.0 | 0.2 | | 9 | 0 |
| 0.3 | 0.2 | 1.0 | 0.3 | | 8 | 0 |
| 0.3 | 0.2 | 1.0 | 0.4 | | 7 | 0 |
| 0.3 | 0.2 | 1.0 | 0.5 | | 7 | 0 |
| ... | ... | ... | ... | | ... | ... |
| 0.3 | 0.3 | 1.0 | 0.1 | | 14 | 0 |
| 0.3 | 0.3 | 1.0 | 0.2 | | 13 | 0 |
| 0.3 | 0.3 | 1.0 | 0.3 | | 12 | 0 |
| 0.3 | 0.3 | 1.0 | 0.4 | | 12 | 0 |
| 0.3 | 0.3 | 1.0 | 0.5 | | 11 | 0 |
| ... | ... | ... | ... | ... | ... | ... |
| 0.3 | 0.1 | 1.0 | 0.1 | Equal to height of thick line | 0 | 5 |
| 0.3 | 0.1 | 1.0 | 0.2 | | 0 | 10 |
| 0.3 | 0.1 | 1.0 | 0.3 | | 0 | 15 |
| 0.3 | 0.1 | 1.0 | 0.4 | | 0 | 20 |
| 0.3 | 0.1 | 1.0 | 0.5 | | 0 | 25 |
| ... | ... | ... | ... | | ... | ... |
| 0.3 | 0.2 | 1.0 | 0.1 | | 0 | 5 |
| 0.3 | 0.2 | 1.0 | 0.2 | | 0 | 10 |
| 0.3 | 0.2 | 1.0 | 0.3 | | 0 | 15 |
| 0.3 | 0.2 | 1.0 | 0.4 | | 0 | 20 |
| 0.3 | 0.2 | 1.0 | 0.5 | | 0 | 25 |
| ... | ... | ... | ... | | ... | ... |
| 0.3 | 0.3 | 1.0 | 0.1 | | 0 | 5 |
| 0.3 | 0.3 | 1.0 | 0.2 | | 0 | 10 |
| 0.3 | 0.3 | 1.0 | 0.3 | | 0 | 15 |
| 0.3 | 0.3 | 1.0 | 0.4 | | 0 | 20 |
| 0.3 | 0.3 | 1.0 | 0.5 | | 0 | 25 |
| ... | ... | ... | ... | | ... | ... |

| Ink Type | Correction Value |
|---|---|
| Ink A (Reference Ink) | 1.0 |
| Ink A1 | 1.02 |
| Ink B | 0.98 |
| Ink C | 0.99 |
| Ink D | 1.01 |
| Ink E | 1.01 |
| ... | ... |

FIG. 56

PHOTOTHERMAL CONVERSION IMAGE GENERATING DEVICE, THREE-DIMENSIONAL IMAGE FORMING SYSTEM, AND COMPUTER READABLE STORAGE MEDIUM

BACKGROUND OF THE INVENTION

Technical Field

The present invention relates to a photothermal conversion image generating device, a three-dimensional image forming system, and a computer readable storage medium.

Background Art

To date, there are known methods and systems that are used to form a three-dimensional image by forming via printing a photothermal conversion layer, which converts light into heat, on a medium (for example, a thermally expandable sheet) having on one surface thereof an expandable layer that expands in accordance with the amount of heat absorbed thereby, and then causing parts of the expandable layer where the photothermal conversion layer is formed on the medium to expand by being heated via irradiation of light (for example, refer to Japanese Patent Application Laid-Open Publication No. S64-28660, Japanese Patent Application Laid-Open Publication No. 2001-150812). Here, the term "light" includes infrared light as well as visible light.

The thus-formed three-dimensional image can be utilized as an effective information source by a visually impaired person, for example. For example, a map can be realized using a three-dimensional image by raising up lines that represent paths on the map so that the lines have a protruding shape. A visually impaired person is able to grasp the contents illustrated by the map by touching the three-dimensional image map. Hereafter, such a three-dimensional image map may be referred to as a "tactile map."

SUMMARY OF THE INVENTION

A photothermal conversion image based on the density of black ink is usually drawn on the rear side of a thermally expandable sheet, and then the sheet is irradiated with light in order to generate heat in accordance with the density of the ink. A base material is arranged on the rear side of the thermally expandable sheet. Heat is transmitted to the expandable layer via the base material, and the expandable layer is thereby made to expand.

However, when the width of the path is small, the line representing the path is narrow. When such a thin line is irradiated with light, the heat escapes in planar directions via the base material, and thus the heat is not sufficiently transmitted to the expandable layer and sufficient raising of the line (expansion height) is not realized.

Therefore, a thin line is realized by drawing a photothermal conversion image on the front side of a thermally expandable sheet and then irradiating the image with light to cause foaming. An expandable layer is arranged below a thin inkjet receiving layer on the front side of the thermally expandable sheet. When a photothermal conversion image is drawn on the inkjet receiving layer and heat is generated in accordance with the density of the ink through irradiation of light, the heat is transmitted to the expandable layer with hardly any heat being dispersed in the horizontal directions. Therefore, a line can be raised to a desired degree (expansion height).

Currently, the person manufacturing the tactile map decides up to what thickness of line is to be drawn on the front side of a thermally expandable sheet and beyond what thickness of line is to be drawn on the rear side of the thermally expandable sheet. However, when there are many paths and many lines on a map, making such decisions manually for a large number of lines is complicated. In addition, in the case where the decisions are made manually, there is a risk that variations may occur in deciding whether to allocate a line to a photothermal conversion image on the front side of the thermally expandable sheet or to a photothermal conversion image on the rear side of the thermally expandable sheet depending on the operator, and the quality of the finished three-dimensional images may not be maintained. This problem is not limited to tactile maps; general three-dimensional images also have a similar problem.

Accordingly, the present invention addresses the problem of generating a photothermal conversion image that can stably form a desired three-dimensional image without relying on manual work in a photothermal conversion image generating device, a three-dimensional image forming system, and a computer readable storage medium. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a photothermal conversion image generating device that generates a photothermal conversion image for forming a three-dimensional image by causing a thermally expandable sheet to expand, the device including: a processor that allocates, based on at least one of a pre-expansion or post-expansion line width and an expansion height of a line in the three-dimensional image, an image for forming the line to either a front surface of the thermally expandable sheet or a rear surface of the thermally expandable sheet, the processor causing the image so allocated to be printed on the allocated front or rear surface of the thermally expandable sheet.

In another aspect, the present disclosure provides a three-dimensional image forming system for forming a three-dimensional image by causing a thermally expandable sheet to expand, including: a photothermal conversion image generating device including a processor that allocates, based on at least one of a pre-expansion or post-expansion line width and an expansion height of each line in a three-dimensional image, an image for forming the line to either a front surface of the thermally expandable sheet or a rear surface of the thermally expandable sheet; an image forming device that forms the image of each line on the allocated front or rear surface of the thermally expandable sheet; and a light irradiation device that causes the thermally expandable sheet to expand by irradiating the image formed on the thermally expandable sheet with light.

In another aspect, the present disclosure provides a non-transitory storage medium storing instructions executable by a processor controlling a device that generates a photothermal conversion image for forming a three-dimensional image by expanding a thermally expandable sheet, the instructions causing the processor to perform the following:

allocating, based on at least one of a pre-expansion or post-expansion line width and an expansion height of a line in the three-dimensional image, an image for forming the line to either a front surface of the thermally expandable sheet or a rear surface of the thermally expandable sheet, and causing the image so allocated to be printed on the allocated front or rear surface of the thermally expandable sheet.

According to the present invention, it is possible to form a photothermal conversion image that can stably form a desired three-dimensional image without relying on manual work. It is to be understood that both the foregoing general description and the following detailed description are exemplary and explanatory, and are intended to provide further explanation of the invention as claimed.

BRIEF DESCRIPTION OF THE DRAWINGS

FIG. 5 is a diagram for explaining the structure of an expansion height database.

FIG. 15 is a diagram for explaining the structure of an intersection expansion height database.

FIG. 29 is a diagram for explaining the structure of an intersection expansion height database of Embodiment 3.

FIG. 34 is a diagram for explaining the structure of an expansion height database.

FIG. 39 is a diagram for explaining the structure of an intersection expansion height database.

FIG. 53 is a diagram for explaining the structure of an intersection expansion height database of Embodiment 6.

FIG. 56 is a diagram illustrating an ink correction database.

DETAILED DESCRIPTION OF EMBODIMENTS

Figure 1:
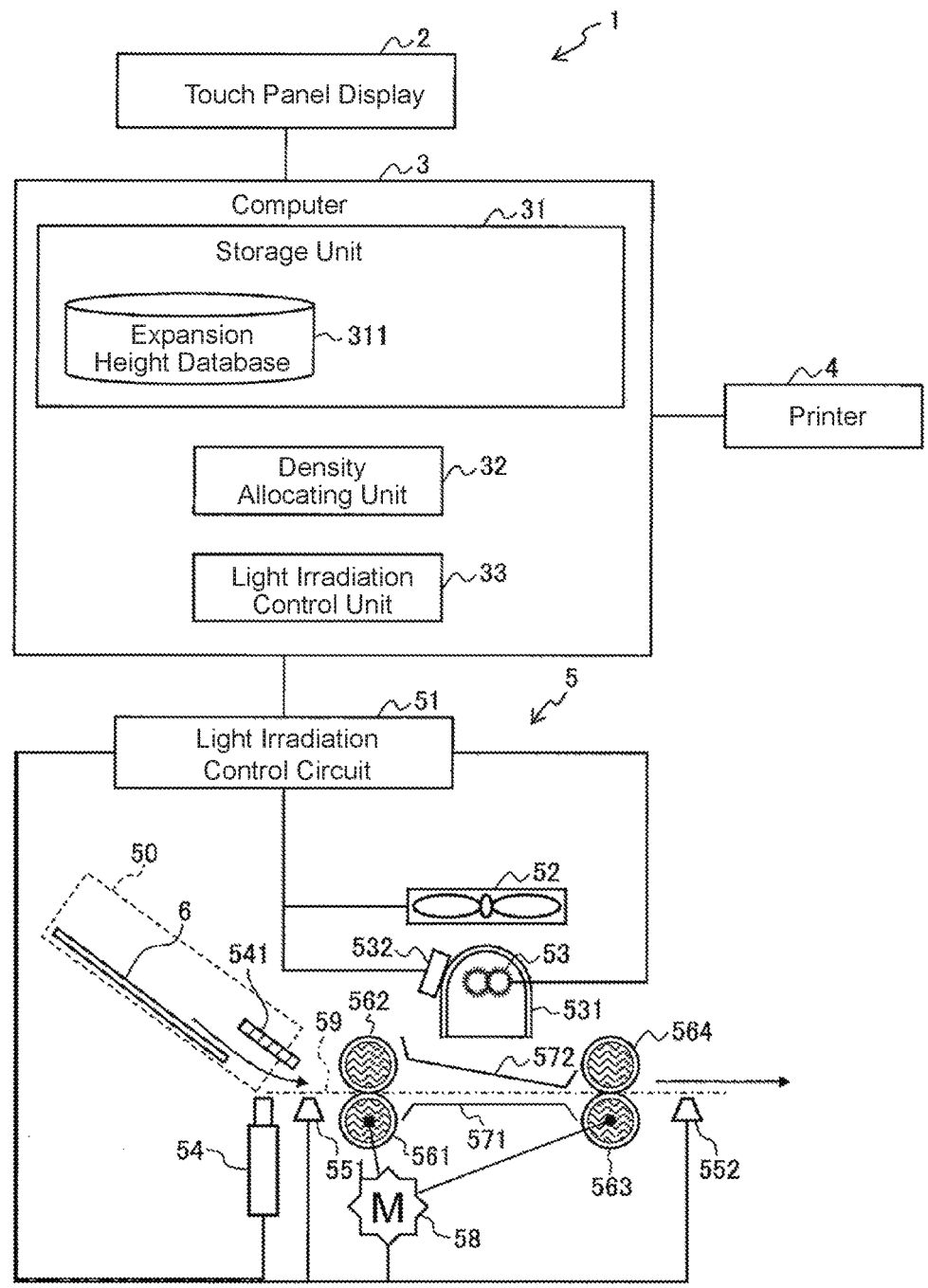
FIG. 1 is a configuration diagram that schematically illustrates a three-dimensional image forming system of Embodiment 1.

Hereafter, modes for carrying out the present invention will be described in detail while referring to the drawings. In addition, although a case in which a tactile map is manufactured is exemplified in the embodiments, the present invention is not limited to being applied to a tactile map, and may be applied to a three-dimensional image formed of any contents.

<Embodiment 1>

A three-dimensional image forming system of Embodiment 1 allocates lines input thereto to a rear side and a front side of a thermally expandable sheet in accordance with the line widths of the lines. Hereafter, the configuration and operation of the three-dimensional image forming system will be described while referring to FIGS. 1 to 9.

FIG. 1 is a configuration diagram that schematically illustrates a three-dimensional image forming system 1 of Embodiment 1. As illustrated in FIG. 1, the three-dimensional image forming system 1 includes a touch panel display 2, a computer 3, a printer 4, and a light irradiation unit 5. The three-dimensional image forming system 1 forms a three-dimensional image by performing printing on a thermally expandable sheet 6 as desired, and then irradiating the thermally expandable sheet 6 with light using the light irradiation unit 5.

The computer 3 includes a storage unit 31 that stores an expansion height database 311, a density allocating unit 32, and a light irradiation control unit 33. The computer 3 further includes a central processing unit (CPU) (processor) and a random access memory (RAM), which are not illustrated, and controls the printer 4 (image-forming device) and the light irradiation unit 5.

Upon receiving three-dimensional image design information, the density allocating unit 32 allocates the densities of lines or the like to the front side and the rear side of the thermally expandable sheet 6 in accordance with line widths and expansion heights included in the design information. The light irradiation control unit 33 irradiates the thermally expandable sheet 6 with light while conveying the thermally expandable sheet 6 by controlling the light irradiation unit 5 (light-irradiating device).

The touch panel display 2 is constructed by adhering a liquid crystal display panel to a touch panel, and is used to operate the computer 3.

The printer 4 is an inkjet printing apparatus, for example. The printer 4 prints a density image formed of black ink (photothermal conversion image) and a density image formed of color ink on the front surface of the thermally expandable sheet 6, and then prints a density image formed of black ink (photothermal conversion image) on the rear surface of the thermally expandable sheet 6.

The light irradiation unit 5 irradiates the thermally expandable sheet 6 with visible light and near infrared light while conveying the thermally expandable sheet 6, and causes heat to be generated in parts of the thermally expandable sheet 6 where a density image (photothermal conversion image) has been formed using black ink. The light irradiation unit 5 includes a light irradiation control circuit 51, a cooling fan 52, a lamp heater 53, a reflective plate 531, a temperature sensor 532, a barcode reader 54, and a mirror 541.

The light irradiation control circuit 51 includes, for example, a CPU and a memory, which are not illustrated, and performs overall control of the light irradiation unit 5 on the basis of instructions from the computer 3. The light irradiation control circuit 51 controls the cooling fan 52 and a motor 58 on the basis of signals input from the barcode reader 54, an entrance sensor 551, and an exit sensor 552. The light irradiation control circuit 51 further controls the lamp heater 53 on the basis of a signal input from the temperature sensor 532. The light irradiation control circuit 51 causes the thermally expandable sheet 6 to be conveyed at a prescribed conveying speed with the thermally expandable sheet 6 being set such that one surface thereof is irradiated with light by the lamp heater 53. The light irradiation control circuit 51 then causes the thermally expandable sheet 6 to be conveyed at a prescribed conveying speed with the thermally expandable sheet 6 being set such that the other surface thereof is irradiated with light by the lamp heater 53.

The cooling fan 52 cools the reflective plate 531 with air. The temperature sensor 532 measures the temperature of the reflective plate 531. The reflective plate 531 reflects visible light and near infrared light generated by the lamp heater 53. The lamp heater 53 and the reflective plate 531 form light irradiation means that generates visible light and near infrared light, and irradiates the thermally expandable sheet 6 with the visible light and near infrared light.

The barcode reader 54 reads a barcode printed at an end of the rear surface of the thermally expandable sheet 6. When the thermally expandable sheet 6 is set so that the rear side thereof faces upward, the mirror 541 enables the barcode to be read from the barcode reader 54 by reflecting the barcode on the thermally expandable sheet 6. The front surface and the rear surface of the thermally expandable sheet 6 can be discriminated between on the basis of the position at which the barcode is read by the barcode reader 54.

The light irradiation unit 5 includes a sheet-feeding unit 50, the entrance sensor 551, insertion rollers 561 and 562, a lower guide 571, an upper guide 572, discharge rollers 563 and 564, and the exit sensor 552, which are arranged along a conveyance path 59 represented by an alternating dot and dash line. The light irradiation unit 5 further includes the motor 58. The motor 58 drives the insertion rollers 561, 562, the discharge rollers 563, 564, and the like.

The sheet-feeding unit 50 is a unit in which the thermally expandable sheet 6 is set. When the thermally expandable sheet 6 is set in the sheet-feeding unit 50 and light irradiation is instructed, the light irradiation unit 5 initiates conveying and light irradiation of the thermally expandable sheet 6. The conveying is initiated by a conveying mechanism, which is not illustrated, of the sheet-feeding unit 50.

The entrance sensor 551 detects when the front end of the thermally expandable sheet 6 reaches a region immediately in front of the insertion rollers 561 and 562, and when the rear end of the thermally expandable sheet 6 reaches the region immediately in front of the insertion rollers 561 and 562.

The insertion rollers 561 and 562 are separately provided on the left side and the right side of the conveyance path 59, and convey the thermally expandable sheet 6 by sandwiching the end of the thermally expandable sheet 6 therebetween from above and below. The insertion rollers 561 and 562 are driven by the motor 58. The lower guide 571 and the upper guide 572 are latticed shaped, and guide the thermally expandable sheet 6 from below and above the conveyance path 59. The upper guide 572 is provided in an inclined direction so as not to cast a strong shadow on the thermally expandable sheet 6. As a result of the upper guide 572 and the thermally expandable sheet 6 being separated by a prescribed distance in a region directly below the lamp heater 53 in this manner, the upper guide 572 does not cast a strong shadow.

The discharge rollers 563 and 564 convey the thermally expandable sheet 6 by sandwiching the thermally expandable sheet 6 therebetween from above and below. The discharge rollers 563 and 564 are also driven by the motor 58.

The exit sensor 552 detects when the front end of the thermally expandable sheet 6 is discharged from the discharge rollers 563 and 564, and when the rear end of the thermally expandable sheet 6 is discharged from the discharge rollers 563 and 564.

In addition, in Embodiment 1, the front surface of the thermally expandable sheet 6 is irradiated with light, and then the tactile map operator sets the thermally expandable sheet 6 such that the rear surface thereof faces upward and then the rear surface is irradiated with light. In this way, both surfaces of the thermally expandable sheet 6 can be irradiated with light.

FIGS. 2A to 2D illustrate the results of line allocation processing in Embodiment 1. FIGS. 2A to 2D are partial enlarged views on the same scale.

Figure 2A:
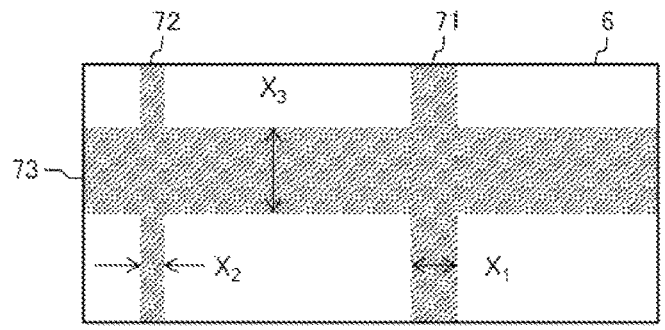
FIG. 2A illustrates width information and height information of protruding lines forming a three-dimensional image in Embodiment 1.

FIG. 2A illustrates width information and height information of protruding lines that form a three-dimensional image. The information illustrated in FIG. 2A is three-dimensional image design information. The three-dimensional image design information is stored in the storage unit 31 of the computer 3, and displayed on the touch panel display 2, for example.

As illustrated in FIG. 2A, protruding thin lines 71 and 72 are drawn vertically on the thermally expandable sheet 6. The line width of the protruding thin line 71 pre-expansion is $X_1$. The line width of the protruding thin line 72 pre-expansion is $X_2$. A protruding thick line 73 is drawn horizontally, and intersects the protruding thin lines 71 and 72. The line width of the protruding thick line 73 pre-expansion is $X_3$.

In FIG. 2A, the height information of the protruding lines is represented using hatching. An expansion height of 0 is represented when there is no hatching and the color is white. The denser the hatching, the higher the region is. The protruding thin lines 71 and 72 and the protruding thick line 73 are displayed using the same hatching, and this indicates that the protruding thin lines 71 and 72 and the protruding thick line 73 have the same expansion height.

Figure 2B:
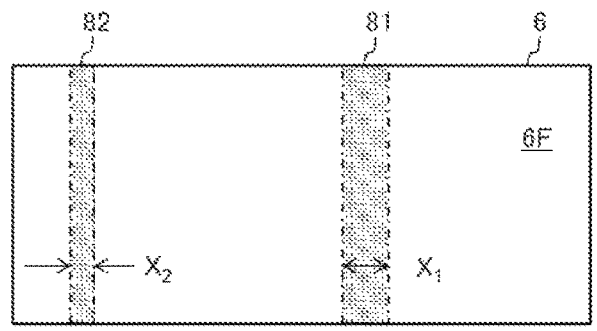
FIG. 2B illustrates a density image on a front surface of a thermally expandable sheet for forming a three-dimensional image.

FIG. 2B illustrates a density image that is for forming a three-dimensional image on a front surface 6F of the thermally expandable sheet 6.

A line 81 that corresponds to the protruding thin line 71 pre-expansion and a line 82 that corresponds to the protruding thin line 72 pre-expansion are drawn vertically on the front surface 6F of the thermally expandable sheet 6. The line width of the line 81 is $X_1$, and the line width of the line 82 is $X_2$. The lines 81 and 82 are printed at a prescribed density using black ink, and when irradiated with light, the lines 81 and 82 convert the light into heat in accordance with the density. Thus, the regions of the lines 81 and 82 expand and form protruding lines. The lines 81 and 82 are lines for causing the protruding thin lines 91 and 92 shown in FIG. 2D to be formed.

In addition, although an image is also formed using color ink on the front surface 6F of the thermally expandable sheet 6, illustration of such an image is omitted here. When irradiated with light, a smaller amount of heat is converted from the light in the region printed using color ink compared with the region printed using black ink, and therefore the thermally expandable sheet 6 does not expand in the region printed using color ink.

Figure 2C:
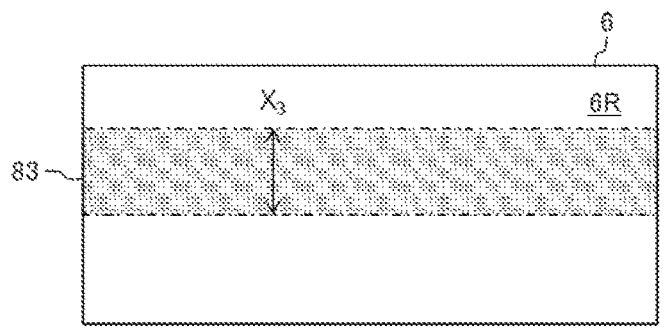
FIG. 2C illustrates a density image on a rear surface of a thermally expandable sheet for forming a three-dimensional image.

FIG. 2C illustrates a density image that is for forming a three-dimensional image on a rear surface 6R of the thermally expandable sheet 6.

A line 83 that corresponds to the protruding thick line 73 pre-expansion is drawn horizontally on the rear surface 6R of the thermally expandable sheet 6, and the line width of the line 83 is $X_3$. The line 83 is printed at a prescribed density using black ink, and when irradiated with light, the line 83 converts the light into heat in accordance with the density. Thus, a region of the front surface corresponding to the region of the line 83 expands and forms a protruding line. The line 83 is a line for causing the protruding thick line 93 in FIG. 2D to be formed.

Figure 2D:
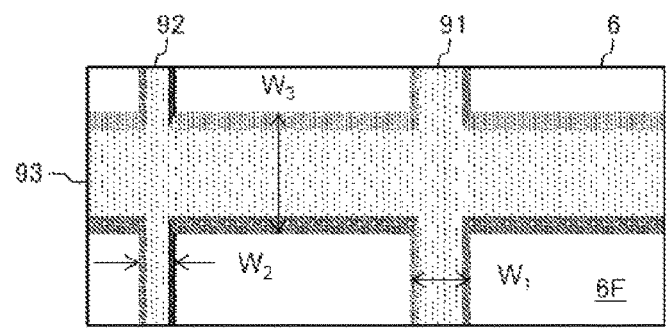
FIG. 2D illustrates a three-dimensional image formed by irradiating a front surface and rear surface of a thermally expandable sheet with light.

FIG. 2D illustrates a three-dimensional image formed by irradiating the front surface 6F and the rear surface 6R of the thermally expandable sheet 6 with light. Here, a shadow cast by the three-dimensional image is illustrated with hatching.

Protruding thin lines 91 and 92 are formed in a vertical direction on the front surface 6F of the thermally expandable sheet 6, and a protruding thick line 93 is additionally formed in a horizontal direction on the front surface 6F of the thermally expandable sheet 6. The protruding thin lines 91 and 92 are expanded protruding lines formed by irradiating the lines 81 and 82 printed on the front surface 6F (refer to FIG. 2B) with light. The line width of the protruding thin line 91 post-expansion is $W_1$. The line width of the protruding thin line 92 post-expansion is $W_2$. The protruding thick line 93 is an expanded protruding line formed by irradiating the line 83 printed on the rear surface 6R (refer to FIG. 2C) with light, and the line width of the protruding thick line 93 is $W_3$.

The line width $W_1$ of the protruding thin line 91 post-expansion is approximately equal to and slightly wider than the line width $X_1$ of the protruding thin line 71, which is the design information for the protruding thin line 91. The line width $W_2$ of the protruding thin line 92 post-expansion is approximately equal to and slightly wider than the line width $X_2$ of the protruding thin line 72, which is the design information for the protruding thin line 92. The line width $W_3$ of the protruding thick line 93 post-expansion is approximately equal to and slightly wider than the line width $X_3$ of the protruding thick line 73, which is the design information for the protruding thick line 93. In other words, the design information illustrated in FIG. 2A is realized as a three-dimensional image.

Figure 3:
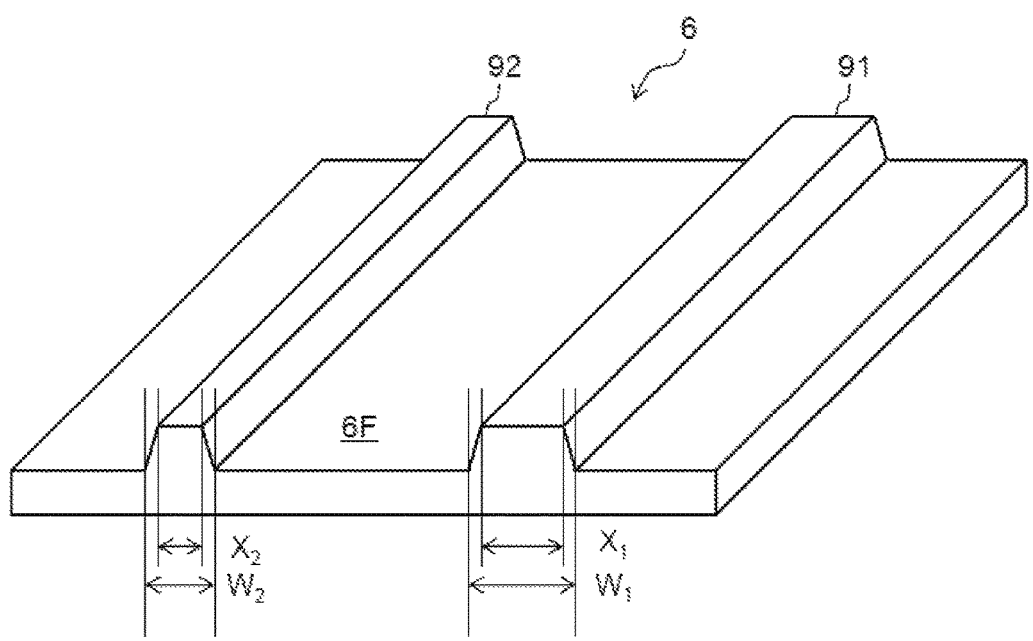
FIG. 3 is a perspective view of a three-dimensional image formed by irradiating a front surface of a thermally expandable sheet with light.

FIG. 3 is a perspective view of the three-dimensional image formed by irradiating the front surface 6F of the thermally expandable sheet 6 with light.

The protruding thin line 91 of line width $W_1$ is formed in a vertical direction at a prescribed height on the front surface 6F of the thermally expandable sheet 6. The protruding thin line 92 of line width $W_2$ is also formed in the vertical direction at a prescribed height. The protruding thin lines 91 and 92 are formed by irradiating the lines 81 and 82 printed on the front surface 6F (refer to FIG. 2B) with light. The line width $W_1$ of the protruding thin line 91 is approximately equal to and slightly wider than the line width $X_1$ of the line 81. This is because the heat generated at the line 81 by the light irradiation is transmitted to the area surrounding the line, thus causing the thermally expandable sheet 6 to expand. Similarly, the line width $W_2$ of the protruding thin line 92 is approximately equal to and slightly wider than the line width $X_2$ of the line 82. The top surface of the line 81 and the protruding thin line 91 are schematically shown as being the same, and the top surface of the line 82 and the protruding thin line 92 are schematically shown as being the same.

Figure 4:
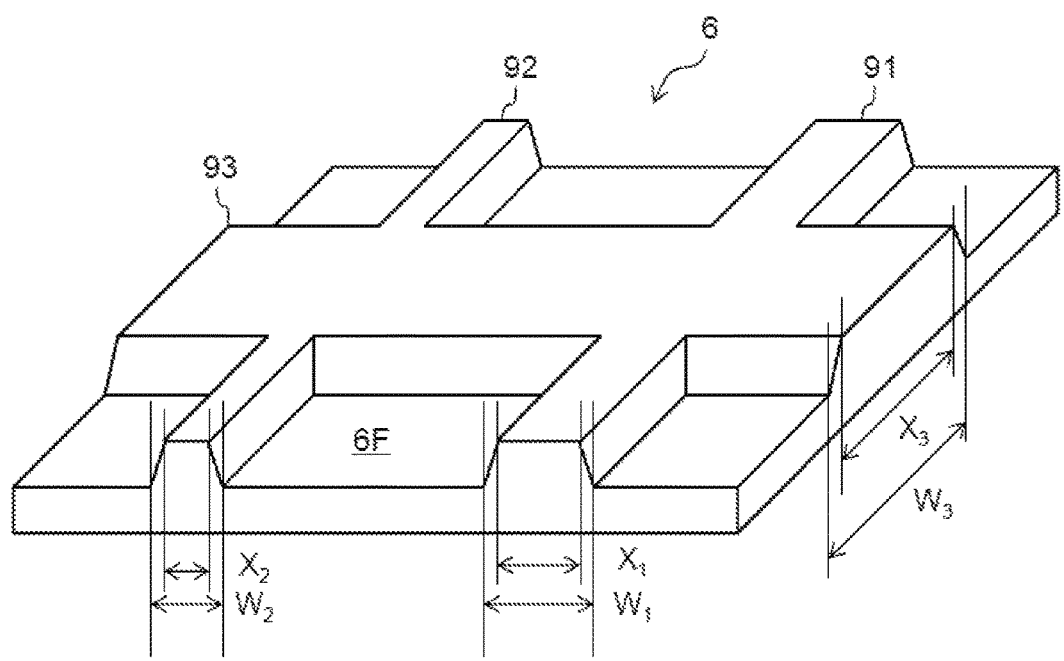
FIG. 4 is a perspective view of a three-dimensional image formed by irradiating a rear surface of a thermally expandable sheet with light after the front surface is irradiated.

FIG. 4 is a perspective view of the three-dimensional image formed by irradiating the rear surface 6R of the thermally expandable sheet 6 with light after the front surface 6F has been irradiated.

In FIG. 4, the three-dimensional image illustrated in FIG. 2D is seen from a diagonal direction. The protruding thin lines 91 and 92 are formed in a vertical direction, and the protruding thick line 93 of line width $W_3$ is additionally formed in a horizontal direction on the front surface 6F of the thermally expandable sheet 6. The line width of the protruding thick line 93 post-expansion is $W_3$. The protruding thin lines 91 and 92 are formed by irradiating the lines 81 and 82 printed on the front surface 6F (refer to FIG. 2B) with light. The protruding thick line 93 is formed by irradiating the line 83 printed on the rear surface 6R (refer to FIG. 2C) with light. The line width $W_3$ of the protruding thick line 93 is approximately equal to and slightly wider than the line width $X_3$ of the line 83. This is because the heat generated at the line 83 by the light irradiation is transmitted to the area surrounding the line, thus causing the thermally expandable sheet 6 to expand. The top surface of the protruding thick line 93 is schematically illustrated as having plane symmetry with the line 83.

FIG. 5 is a diagram for explaining the structure of the expansion height database 311.

The expansion height database 311 includes a height column, a line width column, a drawing surface column, and a black ink density column.

The height column is a column that stores expansion height information of the lines. The line width column is a column that stores line width (thickness) information of the lines formed by ink on the thermally expandable sheet 6. The drawing surface column is a column that stores whether the lines are to be drawn on the front surface 6F or the rear surface 6R of the thermally expandable sheet 6. The black ink density column is a column that stores the densities of black ink required when the protruding lines listed in the height column and the line width column are formed on the surfaces listed in the drawing surface column.

The protruding lines that form a three-dimensional image are preferably formed in accordance with the three-dimensional image design information. Accordingly, in Embodiment 1, expansion heights corresponding to black ink densities and line widths, which affect the expansion heights of the lines, are measured in experiments and stored in a database in advance. In the experiments, lines of various thicknesses and densities are drawn on the front side and the rear side of the thermally expandable sheet 6, and then the front side and the rear side of the thermally expandable sheet 6 are irradiated with light and the expansion heights of the lines are measured. Thus, the expansion height database 311 illustrated in FIG. 5 can be created.

A desired three-dimensional image can be formed by referring to the expansion height database 311 and generating a density image for the front surface and a density image for the rear surface.

Figure 6:
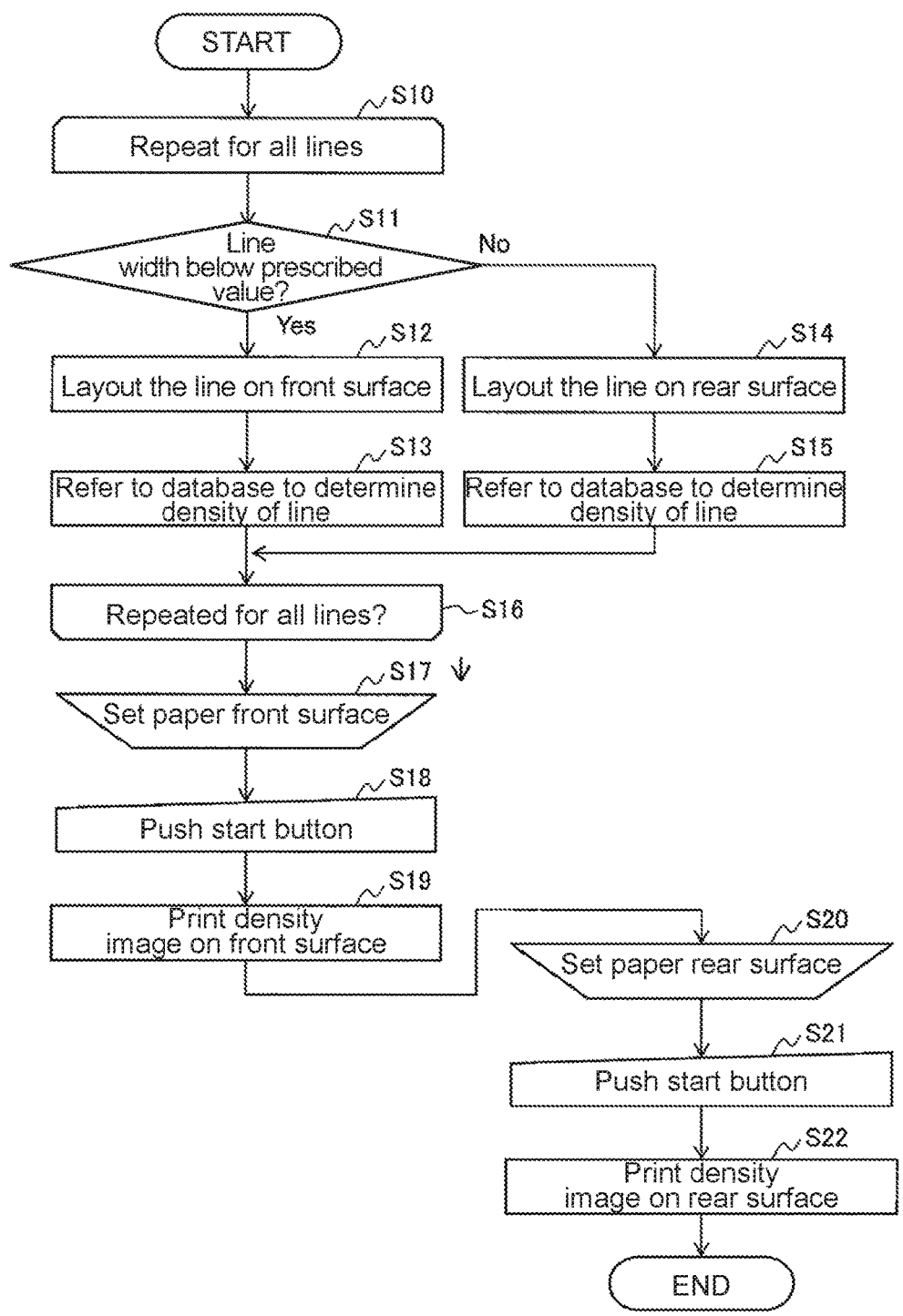
FIG. 6 is a flowchart for explaining line allocation processing.

FIG. 6 is a flowchart for explaining line allocation processing.

The allocation processing is processing executed by the density allocating unit 32 (refer to FIG. 1) upon receiving the three-dimensional image design information (upon acquiring the design information stored in the storage unit from the storage unit).

The three-dimensional image design information is input in advance by the tactile map operator. The term "three-dimensional image design information" refers to data concerning the thicknesses (line widths) and expansion heights of the lines that form the three-dimensional image, for example. In the case of a tactile map, the widths of paths correspond to the thicknesses of lines. The expansion heights of the lines are decided upon by the tactile map operator.

Upon receiving the three-dimensional image design information, the density allocating unit 32 repeats the processing of steps S10 to S16 for all the lines included in the three-dimensional image design information.

In step S11, the density allocating unit 32 determines whether the line width of the line undergoing determination is less than a prescribed value. The "line undergoing determination" refers to the two-dimensional line to be formed by ink on the thermally expandable sheet 6. The "line width" refers to the width of this line.

If the line width of a line undergoing determination is less than a prescribed value (step S11→Yes), the density allocating unit 32 lays out the line on the front surface 6F (step S12) and determines the density of the line by referring to the expansion height database 311 (step S13). When determining the density of the line, the density allocating unit 32 searches the expansion height database 311 and extracts an entry that matches the line width and the height of the line. In addition, if a plurality of entries are found when searching the expansion height database 311, the density allocating unit 32 preferably uses the entry having the smallest density in order to save ink. Thereafter, the density allocating unit 32 proceeds to the process of step S16.

If the line width of the line is equal to or higher than the prescribed value (step S11→No), the density allocating unit 32 lays out the line on the rear surface 6R (step S14) and determines the density of the line by referring to the expansion height database 311 (step S15). Thereafter, the density allocating unit 32 proceeds to the process in step S16.

In other words, the density allocating unit 32 executes a procedure for allocating the lines so that the lines are formed on the front surface of the thermally expandable sheet or are formed on the rear surface of the thermally expandable sheet in accordance with the line widths of the lines forming the three-dimensional image.

In step S16, the density allocating unit 32 determines whether the layouts of all lines included in the design information have been processed. Once all the lines included in the design information have been laid out (step S16), the density allocating unit 32 advances to the processing of step S17.

In step S17, the tactile map operator sets the thermally expandable sheet 6 (sheet) in the printer 4 in order to perform printing on the front surface 6F side of the thermally expandable sheet 6. In addition, the tactile map operator presses (taps) a start button on a guidance screen, which is not illustrated, displayed on the touch panel display 2 (step S18). Thus, the computer 3 prints a density image on the front surface 6F of the thermally expandable sheet 6 using the printer 4 (step S19).

In addition, the tactile map operator sets the thermally expandable sheet 6 in the printer 4 in order to perform printing on the rear surface 6R side of the thermally expandable sheet 6 (step S20). The tactile map operator presses (taps) the start button on the guidance screen, which is not illustrated, displayed on the touch panel display 2 (step S21). Thus, the computer 3 prints a density image on the rear surface 6R of the thermally expandable sheet 6 using the printer 4 (step S22).

Figure 7:
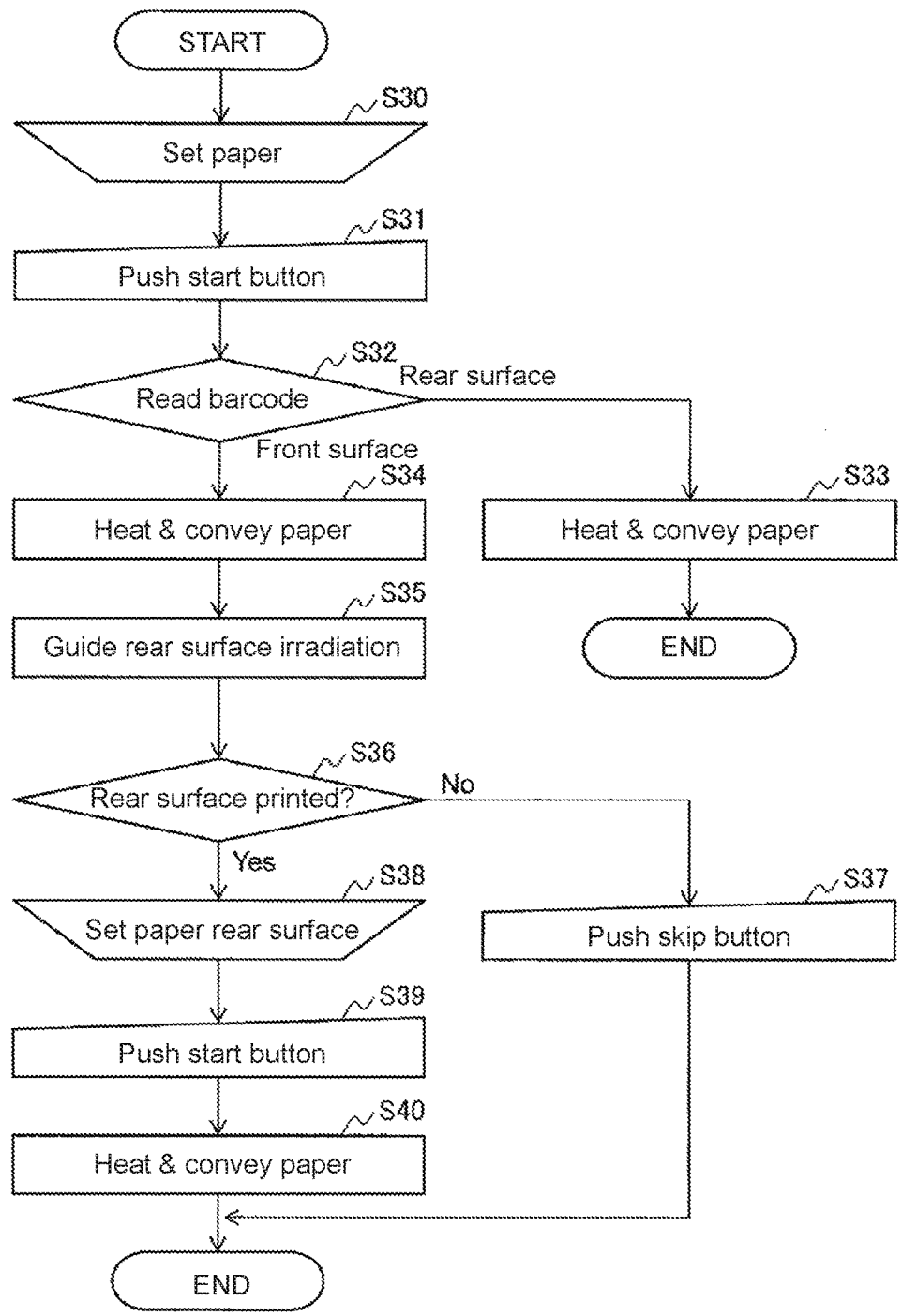
FIG. 7 is a flowchart for explaining processing for irradiating the front surface and the rear surface of a sheet with light.
Figure 8:
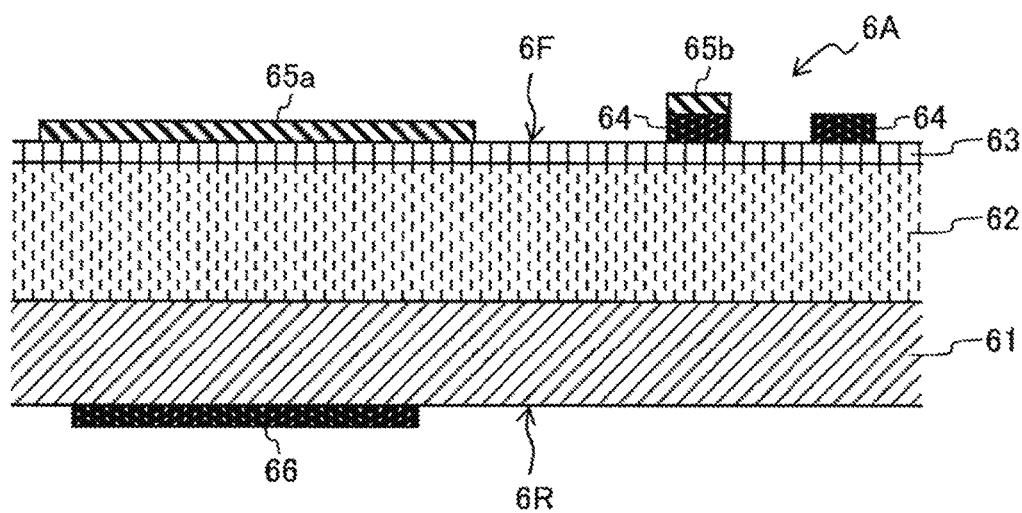
FIG. 8 is a sectional view illustrating a thermally expandable sheet before a conveying operation.

FIG. 7 is a flowchart for explaining processing for irradiating the front surface 6F and the rear surface 6R of the thermally expandable sheet 6 with light. First, the tactile map operator sets the thermally expandable sheet 6 (sheet) in the sheet-feeding unit 50 (step S30), and presses (taps) a start button (not illustrated) displayed on the touch panel display 2 (step S31). Thus, a first conveying operation is initiated. A sectional view of the thermally expandable sheet 6 at this time is illustrated in FIG. 8, which is described later.

The light irradiation control circuit 51 discriminates between the front and back surfaces of the thermally expandable sheet 6 using the barcode reader 54 (step S32). When the rear surface 6R of the thermally expandable sheet 6 is set so as to face upward (step S32 rear side), the light irradiation control circuit 51 irradiates the rear surface 6R of the thermally expandable sheet 6 with light using the lamp heater 53 while conveying the thermally expandable sheet 6, and thereby heats the thermally expandable sheet 6 (step S33). Thus, a three-dimensional image is formed. This processing is performed in the case where a density image is formed on only the rear surface 6R.

Figure 9:
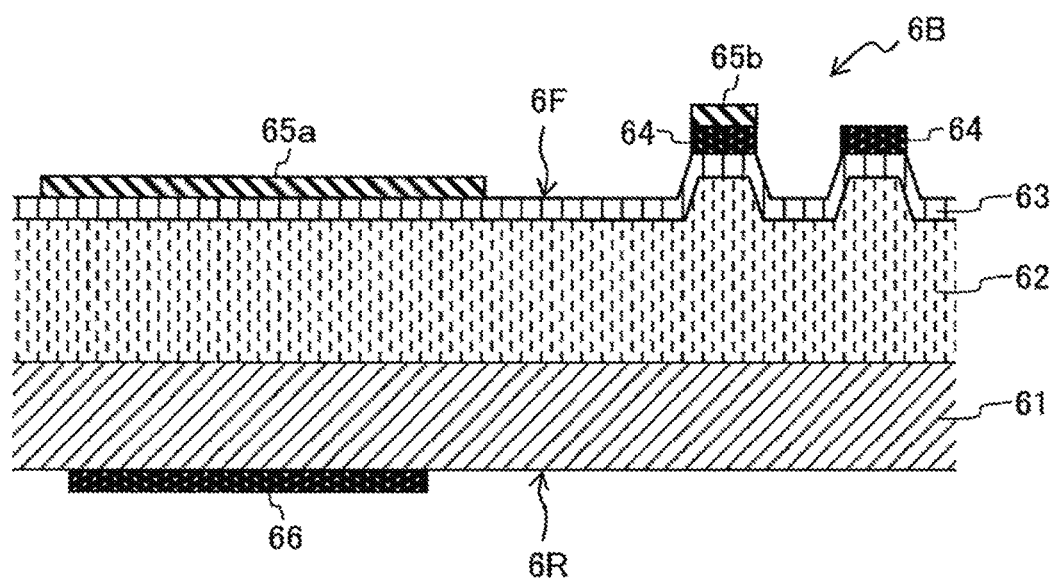
FIG. 9 is a sectional view illustrating a thermally expandable sheet after a first conveying operation.

When the front surface 6F of the thermally expandable sheet 6 is set so as to face upward (step S32 →front surface), the light irradiation control circuit 51 irradiates the front surface 6F of the thermally expandable sheet 6 with light while conveying the thermally expandable sheet 6 at a prescribed speed, and thereby heats the thermally expandable sheet 6 (step S34). Thus, a three-dimensional image constituted by a fine pattern is formed. A sectional view of the thermally expandable sheet 6 at this time is illustrated in FIG. 9, which is described later.

Once the heating and conveying of step S34 are finished, the computer 3 displays a guidance screen (not illustrated) giving guidance on irradiating the rear surface 6R of the thermally expandable sheet 6 with light on the touch panel display 2 (step S35).

The tactile map operator decides whether to print a density image on the rear surface 6R of the thermally expandable sheet 6. When printing is not to be performed on the rear surface 6R of the thermally expandable sheet 6 (step S36→No), the tactile map operator presses (taps) a skip button (not illustrated) on the touch panel display 2 (step S37), and thereby finishes the heating and conveying processing.

When a density image is to be printed on the rear surface 6R of the thermally expandable sheet 6 (step S36→Yes), the tactile map operator sets the thermally expandable sheet 6 (sheet) in the sheet-feeding unit 50 such that the rear surface 6R thereof faces upward (step S38). In addition, the tactile map operator presses (taps) the start button (not illustrated) displayed on the touch panel display 2 (step S39). Thus, a second conveying operation is initiated.

Figure 10:
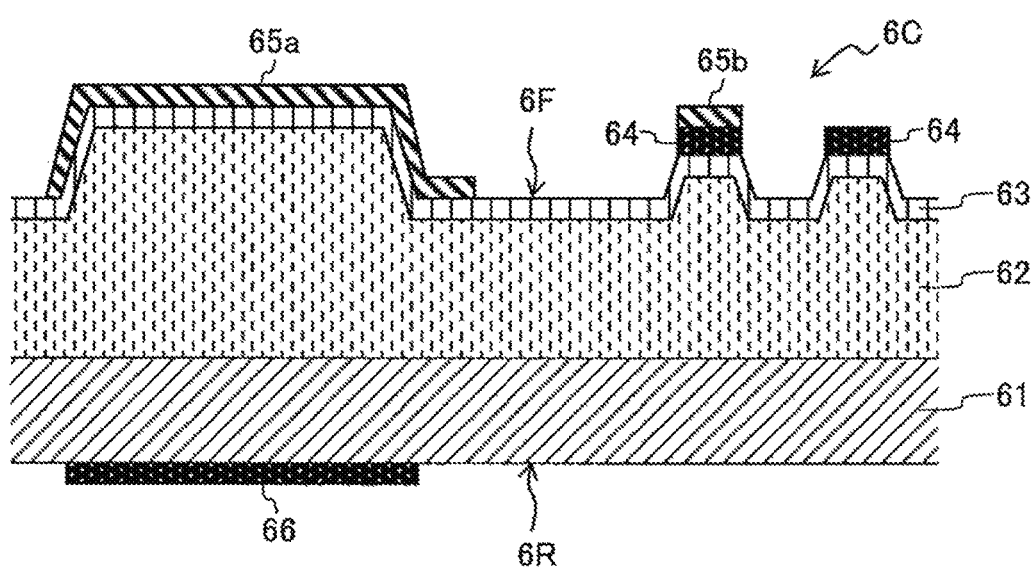
FIG. 10 is a sectional view illustrating a thermally expandable sheet after a second conveying operation.

The light irradiation control circuit 51 irradiates the rear surface 6R of the thermally expandable sheet 6 with light using the lamp heater 53 while conveying the thermally expandable sheet 6, and thereby heats the thermally expandable sheet 6 (step S40). Thus, a coarse pattern that constitutes part of the three-dimensional image is formed. Once the processing of step S40 has finished, the heating and conveying processing of FIG. 7 is finished. A sectional view of the thermally expandable sheet 6 at this time is illustrated in FIG. 10, which is described later.

FIG. 8 is a sectional view illustrating a thermally expandable sheet 6A before a conveying operation.

The thermally expandable sheet 6A illustrated in FIG. 8 is obtained by stacking a base material 61, a foaming resin layer 62 (expandable layer) and an ink-receiving layer 63 in this order.

The base material 61 is composed of planar paper, cloth such as canvas, a panel material such as plastic or the like, and the material of the base material 61 is not especially restricted.

In the foaming resin layer 62, a thermal foaming agent (thermally expandable microcapsules) is arranged so as to be dispersed inside a binder, which is a thermoplastic resin provided on the front surface side of the base material 61. Thus, the foaming resin layer 62 foams and expands in accordance with the amount of heat absorbed thereby. In addition, the rear surface side of the base material 61 is the side of the base material 61 on which the foaming resin layer 62 is not provided.

The ink-receiving layer 63 is formed with a thickness of 10 μm, for example, so as to cover the entire upper surface of the foaming resin layer 62. The ink-receiving layer 63 is formed of a suitable material in order to allow printing materials such as printing ink used in an inkjet printer, printing toner used in a laser printer, ballpoint pen or fountain pen ink, graphite of a pencil and so forth to be received and fixed to the front surface 6F.

In addition, a photothermal conversion layer 64 and color ink layers 65a and 65b are printed on the front surface 6F (ink-receiving layer 63 side) of the thermally expandable sheet 6A, and a photothermal conversion layer 66 is printed on the rear surface 6R (base material 61 side) of the thermally expandable sheet 6A. The photothermal conversion layers 64 and 66 are layers that are printed using ink that includes carbon black (black ink), for example, and convert visible light and near infrared light (electromagnetic waves) into heat. In addition, the color ink layers 65a and 65b are examples of image layers printed using a cyan, magenta or yellow ink, for example.

The thermally expandable sheet 6A is in a state that exists prior to the foaming resin layer 62 being made to expand by being heated, and therefore the thickness of the foaming resin layer 62 is uniform. As illustrated in FIG. 1, the thermally expandable sheet 6A is set in the sheet-feeding unit 50 of the light irradiation unit 5 such that the ink-receiving layer 63 on which the photothermal conversion layer 64 is printed faces upward. After that, the thermally expandable sheet 6A is irradiated with visible light and near infrared light (electromagnetic waves) along the conveyance path 59, and as a result, the foaming resin layer 62 expands due to being heated and a thermally expandable sheet 6B illustrated in FIG. 9 is formed.

FIG. 9 is a sectional view illustrating the thermally expandable sheet 6B after the first conveying operation.

The photothermal conversion layer 64 receives the light radiated from the upper side in the figure and converts the received light into heat during the first conveying operation. The photothermal conversion layer 64 is provided in order to form a fine three-dimensional pattern on the thermally expandable sheet 6. The foaming resin layer 62 immediately below the photothermal conversion layer 64 foams and expands upon receiving heat. The ink-receiving layer 63, the photothermal conversion layer 64 and the color ink layer 65b each exhibit elasticity, and deform in accordance with the foaming expansion of the foaming resin layer 62. The thermally expandable sheet 6B is formed in this way.

There is a risk that the amount of heat that is conducted from the photothermal conversion layer 64 to the foaming resin layer 62 will be reduced if there are gaps between the layers.

In addition, the thermally expandable sheet 6B is set in the sheet-feeding unit 50 of the light irradiation unit 5 such that the base material 61 on which the photothermal conversion layer 66 is printed faces upward. The thermally expandable sheet 6B is then irradiated with visible light and near infrared light (electromagnetic waves) along the conveyance path 59, and as a result, the foaming resin layer 62 expands due to being heated and a thermally expandable sheet 6C illustrated in FIG. 10 is formed.

FIG. 10 is a sectional view illustrating the thermally expandable sheet 6C after the second conveying operation.

The photothermal conversion layer 66 receives the light radiated from the lower side in the figure and converts the received light into heat during the second conveying operation. The photothermal conversion layer 66 is provided in order to form a coarse three-dimensional pattern. The part of the foaming resin layer 62 in the vicinity of the photothermal conversion layer 66 foams and expands upon receiving the heat. The ink-receiving layer 63, the photothermal conversion layer 64 and the color ink layer 65a each exhibit elasticity, and deform in accordance with the foaming expansion of the foaming resin layer 62. The thermally expandable sheet 6C that includes a three-dimensional image is formed in this way.

<Effect of Embodiment 1>

The computer 3 allocates ink densities corresponding to lines to a front side and a rear side in accordance with the line widths of the lines included in design information. Therefore, a density image (photothermal conversion image) that is able to stably form a desired three-dimensional image can be generated without relying on manual work. Thus, the complexity of producing a three-dimensional image is reduced. In addition, since variations that occur due to the individual operator are eliminated, the quality of three-dimensional images is stabilized.

<Embodiment 2>

In Embodiment 1, when thin lines for forming protruding lines included in the three-dimensional image design information are allocated to the front side of a sheet and thick lines included in the three-dimensional image design information are allocated to the rear side of the sheet, the thin lines on the front surface foam and expand when the front side of the sheet is irradiated with light and the thick lines on the rear surface foam and expand when the rear side of the sheet is irradiated with light. Consequently, an intersection between a thin line and a thick line foams and expands twice due to the front side of the sheet being irradiated with light and the rear side of the sheet being irradiated with light. Therefore, a problem occurs in that the intersections between thin lines and thick lines are too high.

Accordingly, in Embodiment 2, the density of an intersection part of a thin line allocated to the front surface and the density of an intersection part of a thick line allocated to the rear surface are adjusted by preparing a database relating to the expansion height of intersections. In addition, it is assumed in Embodiment 2 that the lines and the intersections have the same expansion height.

Figure 11:
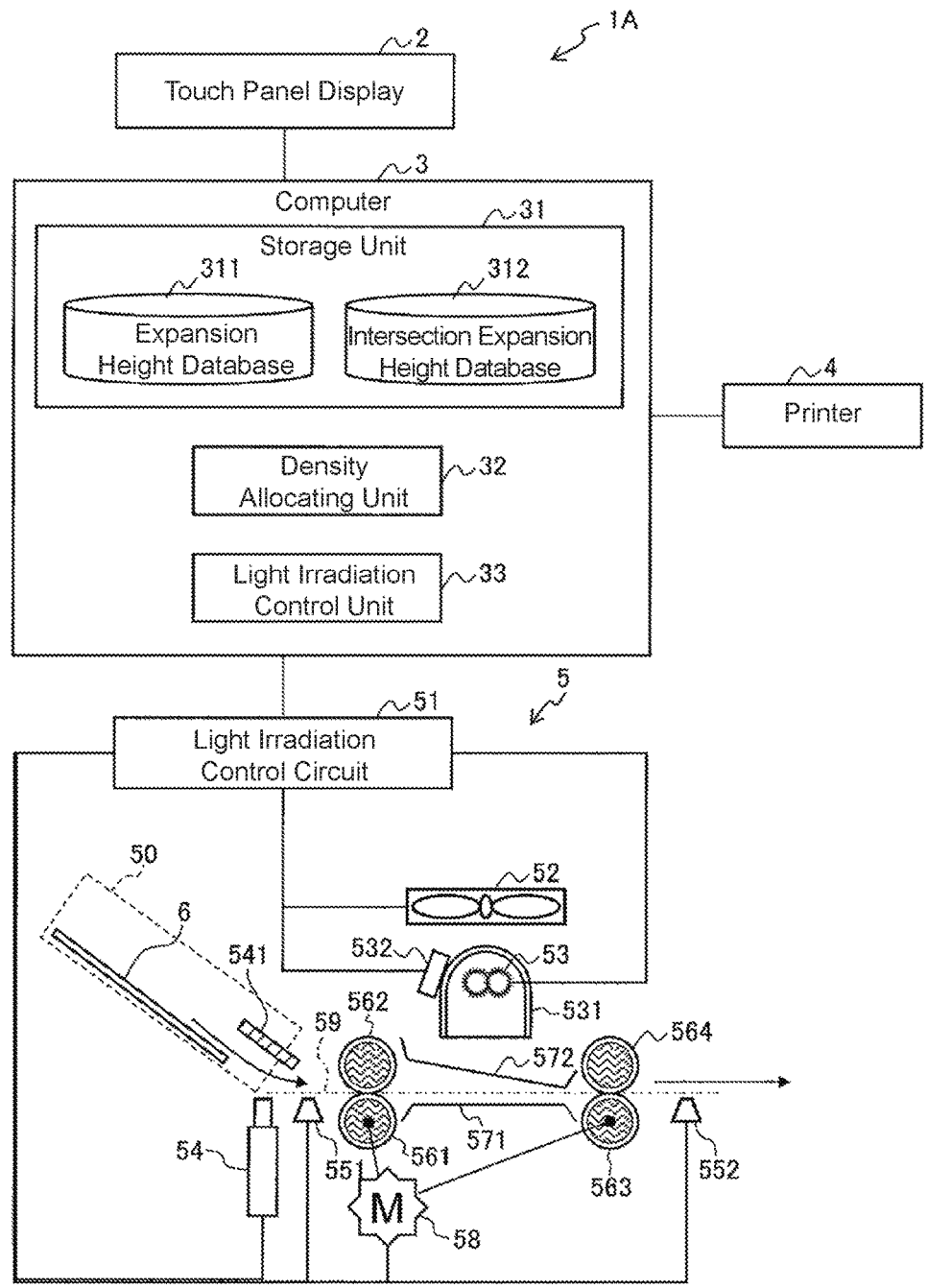
FIG. 11 is a configuration diagram that schematically illustrates a three-dimensional image forming system of Embodiment 2.

FIG. 11 is a configuration diagram that schematically illustrates an outline of a three-dimensional image forming system 1A of Embodiment 2.

In contrast to the three-dimensional image forming system 1 of Embodiment 1 (refer to FIG. 1), the three-dimensional image forming system 1A of Embodiment 2 stores an intersection expansion height database 312 in the storage unit 31. The rest of the configuration is the same as that of the three-dimensional image forming system 1 of Embodiment 1.

The intersection expansion height database 312 is a database that derives density information that is for causing intersection regions to expand on the basis of design information of the intersections. The intersection expansion height database 312 will be described in detail using FIG. 15, which is described later.

FIGS. 12A to 12D illustrate the results of line allocation processing of Embodiment 2. FIGS. 12A to 12D are partial enlarged views on the same scale.

Figure 12A:
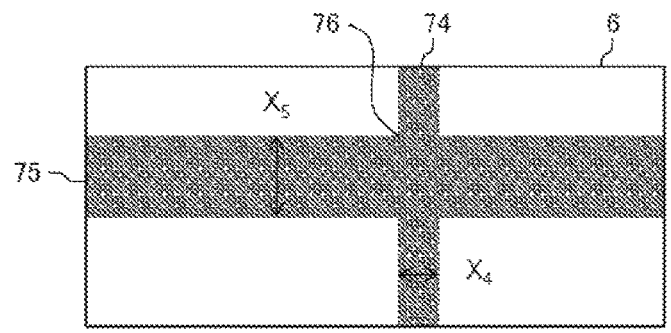
FIG. 12A illustrates width information and height information of protruding lines forming a three-dimensional image in Embodiment 2.

FIG. 12A illustrates width information and height information of the protruding lines that form a three-dimensional image. The information illustrated in FIG. 12A is three-dimensional image design information.

As illustrated in FIG. 12A, a protruding thin line 74 is drawn vertically on the thermally expandable sheet 6, and the line width of the protruding thin line 74 pre-expansion is $X_4$. A protruding thick line 75 is drawn horizontally, and intersects the protruding thin line 74 at a protruding intersection 76, the line width of the protruding thick line 75 pre-expansion being $X_5$.

In FIG. 12A, the height information of the protruding lines is represented using hatching. An expansion height of 0 is represented when there is no hatching and the color is white. The denser the hatching, the higher the region is. The protruding thin line 74, the protruding thick line 75, and the protruding intersection 76 are displayed with the same hatching, and this indicates that the protruding thin line 74, the protruding thick line 75, and the protruding intersection 76 have the same expansion height.

Figure 12B:
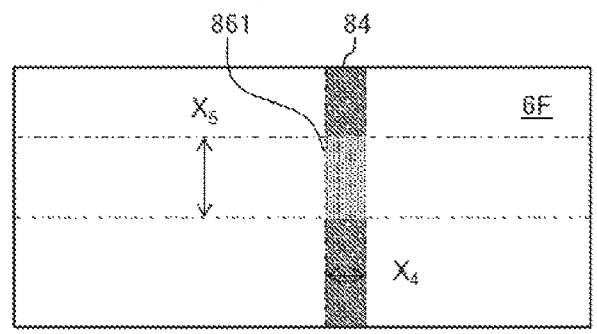
FIG. 12B illustrates a density image on a front surface of a thermally expandable sheet for forming a three-dimensional image.

FIG. 12B illustrates a density image that is for forming a three-dimensional image on the front surface 6F of the thermally expandable sheet 6.

A line 84 that corresponds to the protruding thin line 74 pre-expansion is drawn vertically on the front surface 6F of the thermally expandable sheet 6, and the line width of the line 84 is $X_4$. The line 84 is printed at a prescribed density using black ink, and when irradiated with light, the line 84 converts the light into heat in accordance with the density. The line 84 is a line for causing the protruding thin line 94 shown in FIG. 12D to be formed.

Figure 12C:
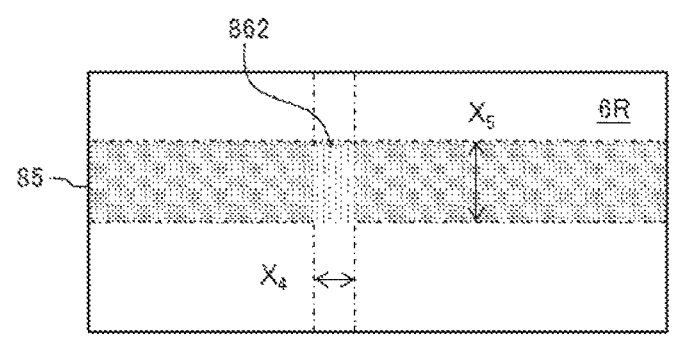
FIG. 12C illustrates a density image on a rear surface of a thermally expandable sheet for forming a three-dimensional image.
Figure 12D:
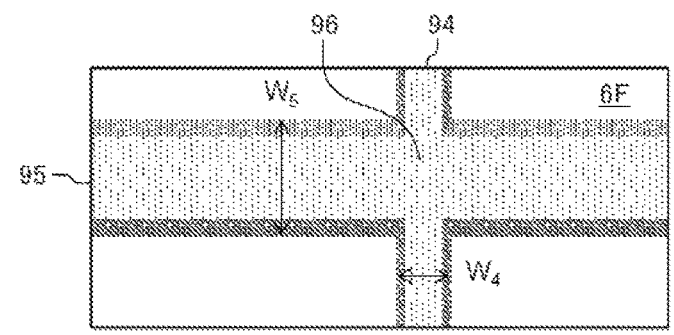
FIG. 12D illustrates a three-dimensional image formed by irradiating a front surface and rear surface of a thermally expandable sheet with light.

As shown in FIG. 12D, an intersection 861 that corresponds to the protruding intersection 76 has a lower density than the parts of the line 84 outside the intersection 861. Therefore, a smaller amount of heat is generated in the region of the intersection 861 with irradiation of light than in the regions of the line 84 outside the intersection 861. In addition, although an image is also formed using color ink on the front surface 6F of the thermally expandable sheet 6, illustration of such an image is omitted here.

FIG. 12C illustrates a density image that is for forming a three-dimensional image on the rear surface 6R of the thermally expandable sheet 6.

A line 85 that corresponds to the protruding thick line 75 pre-expansion is drawn horizontally on the rear surface 6R of the thermally expandable sheet 6, and the line width of the line 85 is $X_5$. The line 85 is printed using black ink, and when irradiated with light, the line 85 converts the light into heat in accordance with the density of the ink. The line 85 is a line for causing the protruding thick line 95 shown in FIG. 12D to be formed.

As shown in FIG. 12D, an intersection 862 that corresponds to the protruding intersection 76 has a lower density than the parts of the line 85 outside the intersection 862. Therefore, a smaller amount of heat is generated in the region of the intersection 862 with irradiation of light than in the regions of the line 85 outside the intersection 862.

FIG. 12D illustrates a three-dimensional image formed by irradiating the front surface 6F and the rear surface 6R of the thermally expandable sheet 6 with light.

A protruding thin line 94 is formed in a vertical direction on the front surface 6F of the thermally expandable sheet 6, and a protruding thick line 95 is additionally formed in a horizontal direction on the front surface 6F of the thermally expandable sheet 6. A protruding intersection 96 is formed in a part where the protruding thin line 94 and the protruding thick line 95 intersect each other.

The protruding thin line 94 is an expanded protruding line formed by irradiating the line 84 printed on the front surface 6F (refer to FIG. 12B) with light and has a line width of $W_4$. The protruding thick line 95 is an expanded protruding line formed by irradiating the line 85 printed on the rear surface 6R (refer to FIG. 12C) with light and has a line width of $W_5$. The protruding intersection 96 is formed by irradiating the intersection 861 printed on the front surface 6F (refer to FIG. 12B) and the intersection 862 printed on the rear surface 6R (refer to FIG. 12C) with light.

The line width $W_4$ of the protruding thin line 94 post-expansion is approximately equal to and slightly wider than the line width $X_4$ of the protruding thin line 74, which is the design information for the protruding thin line 94. The line width $W_5$ of the protruding thick line 95 post-expansion is approximately equal to and slightly wider than the line width $X_5$ of the protruding thick line 75, which is the design information for the protruding thick line 95. In other words, the design information illustrated in FIG. 12A is realized as a three-dimensional image.

Figure 13:
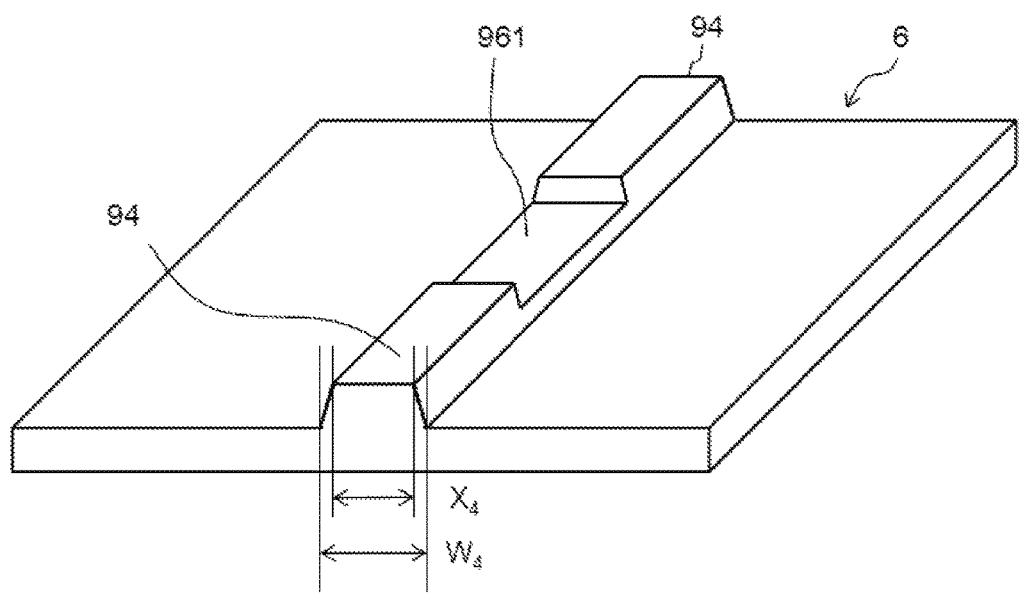
FIG. 13 is a perspective view of a three-dimensional image formed by irradiating a front surface of a thermally expandable sheet with light.

FIG. 13 is a perspective view of the three-dimensional image formed by irradiating the front surface 6F of the thermally expandable sheet 6 with light.

The protruding thin line 94 of line width $W_4$ is formed with a prescribed height on the front surface 6F of the thermally expandable sheet 6 in a vertical direction. In addition, a protruding intersection 961 is formed so as to be lower than the protruding thin line 94. The protruding thin line 94 is formed by irradiating the line 84 printed on the front surface 6F (refer to FIG. 12B) with light. The line width $W_4$ of the protruding thin line 94 is approximately equal to and slightly wider than the line width $X_4$ of the line 84. This is because the heat generated at the line 84 by the light irradiation is transmitted to the area surrounding the line, thus causing the thermally expandable sheet 6 to expand. The top surface of the line 84 and the protruding thin line 94 are schematically shown as being the same.

The protruding intersection 961 is formed by irradiating the intersection 861 (refer to FIG. 12B) with light.

Figure 14:
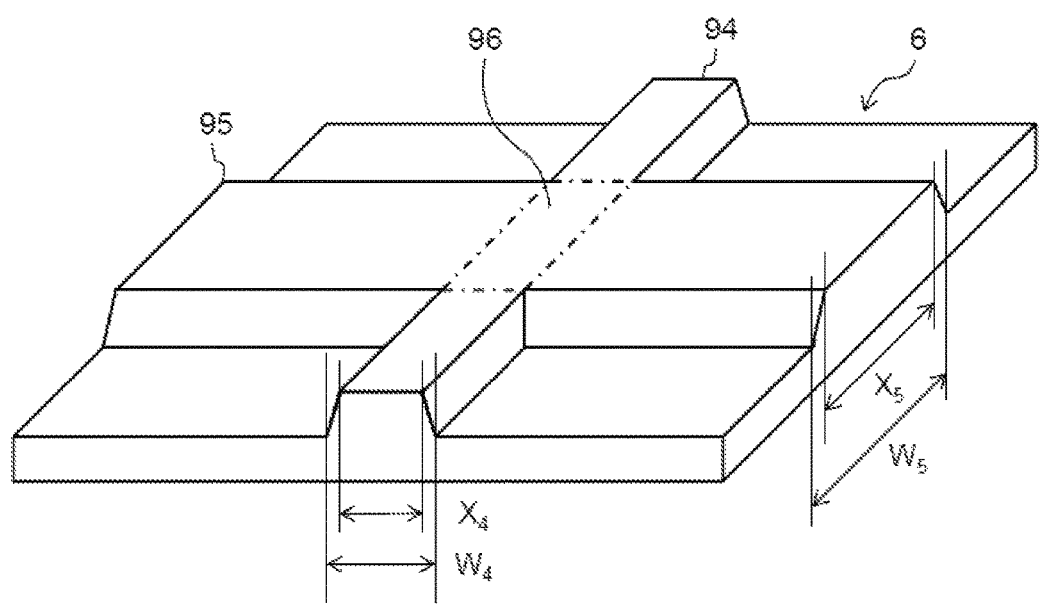
FIG. 14 is a perspective view of a three-dimensional image formed by irradiating a rear surface of a thermally expandable sheet with light after the front surface is irradiated.

FIG. 14 is a perspective view of the three-dimensional image formed by irradiating the rear surface 6R of the thermally expandable sheet 6 with light after the front surface 6F is irradiated. In FIG. 14, the three-dimensional image illustrated in FIG. 12D is seen from a diagonal direction.

The protruding thin line 94 of line width $W_4$ is formed in a vertical direction on the front surface 6F of the thermally expandable sheet 6, and the protruding thick line 95 of line width $W_5$ is additionally formed in a horizontal direction on the front surface 6F of the thermally expandable sheet 6.

The protruding thin line 94 is formed by irradiating the line 84 printed on the front surface 6F (refer to FIG. 12B) with light. The protruding thick line 95 is formed by irradiating the line 85 printed on the rear surface 6R (refer to FIG. 12C) with light. The line width $W_5$ of the protruding thick line 95 is approximately equal to and slightly wider than the line width $X_5$ of the line 85. This is because the heat generated at the line 85 by the light irradiation is transmitted to the area surrounding the line, thus causing the thermally expandable sheet 6 to expand. The top surface of the line 85 and the protruding thick line 95 are schematically shown as sharing plane symmetry.

The protruding intersection 96 is formed by irradiating the intersection 861 printed on the front surface 6F (refer to FIG. 12B) and the intersection 862 printed on the rear surface 6R (refer to FIG. 12C) with light.

FIG. 15 is a diagram for explaining the structure of the intersection expansion height database 312.

The intersection expansion height database 312 includes a front surface line width column, a rear surface line width column, a line and intersection height column, a front surface black ink density column and a rear surface black ink density column.

The front surface line width column is a column that stores line width information of thin lines that form intersections. The rear surface line width column is a column in which line width information of thick lines that form intersections is stored. The height of intersection with line column is a column that stores design height information of the intersections with the lines. The respective line widths here represent the line widths pre-expansion (i.e., the line widths at the time of printing). In addition, it is assumed in Embodiment 2 that the lines and the intersections have the same expansion height.

The front surface black ink density column is a column that stores information regarding the ink density of the intersections on the front surface. The rear surface black ink density column is a column that stores information regarding the ink density of the intersections on the rear surface.

Regarding the ratios at which the densities of the intersections are allocated, the intersection expansion height database 312 can be created by experimentally measuring the expansion heights in the intersection regions with respect to the line widths on the front surface, the line widths on the rear surface, the front surface density and the rear surface density.

The densities of the intersections are automatically allocated to the front side or the rear side and reduced by referring to the intersection expansion height database 312. In this way, it is possible to prevent a phenomenon in which an intersection becomes high and exceeds the design value.

Figure 16:
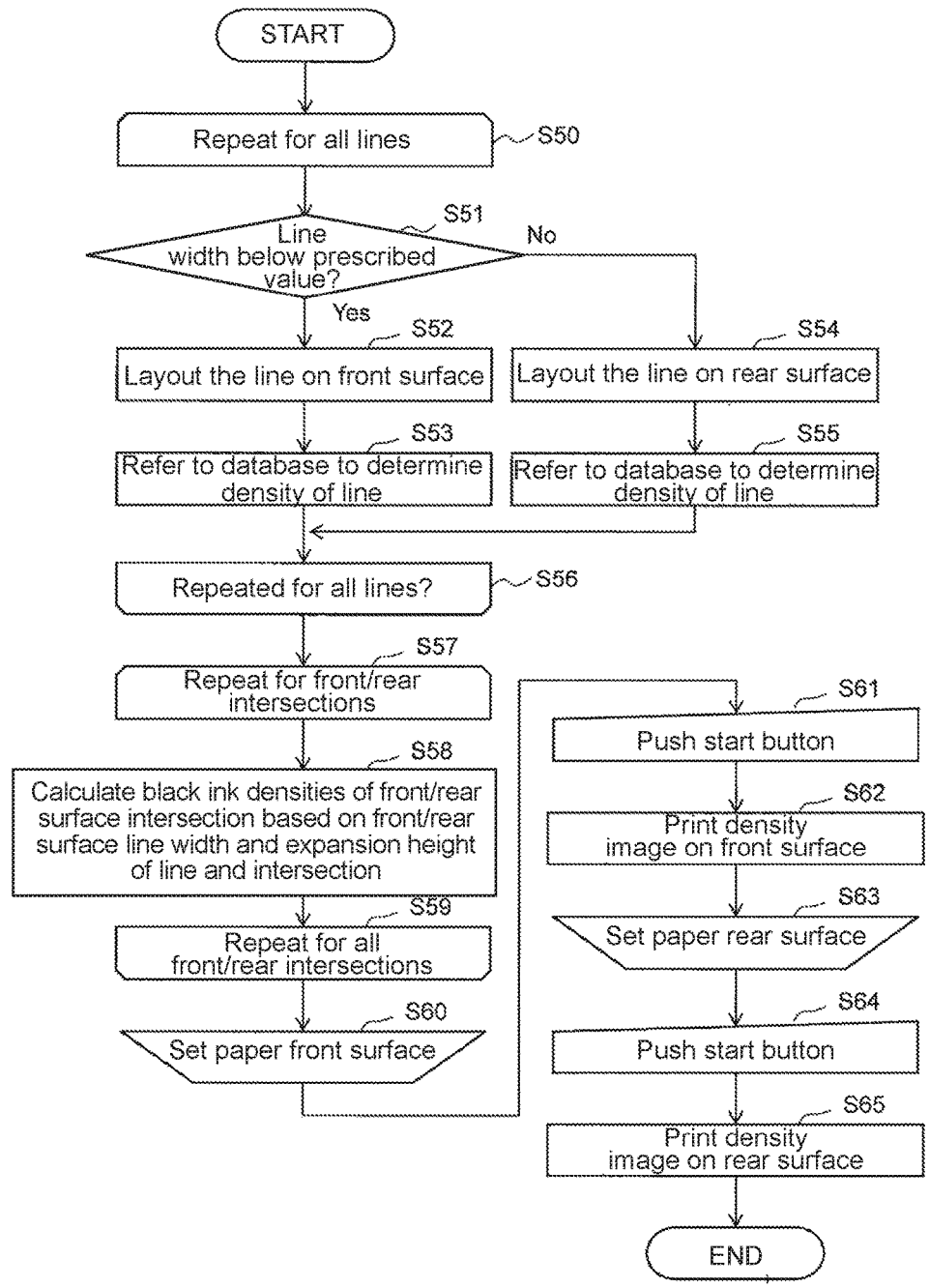
FIG. 16 is a flowchart for explaining line allocation processing.

FIG. 16 is a flowchart for explaining line allocation processing.

The allocation processing is processing executed by the density allocating unit 32 (refer to FIG. 1) upon receiving the three-dimensional image design information.

The three-dimensional image design information is input in advance by the tactile map operator. The term "three-dimensional image design information" refers to the thicknesses (line widths) and expansion heights of the lines forming the three-dimensional image, for example. In the case of a tactile map, the thicknesses of the lines are the widths of the paths. The expansion heights of the lines are decided upon by the tactile map operator.

Upon receiving the three-dimensional image design information, the density allocating unit 32 repeats the processing of steps S50 to S56 for all the lines included in the three-dimensional image design information.

In step S51, the density allocating unit 32 determines whether the line width of the line undergoing determination is less than a prescribed value. The "line undergoing determination" refers to the two-dimensional line formed by ink on the thermally expandable sheet 6. The "line width" refers to the width of this line.

If the line width of a line undergoing determination is less than a prescribed value (step S51→Yes), the density allocating unit 32 lays out the line on the front surface 6F (step S52) and determines the density of the line by referring to the expansion height database 311 (step S53). When determining the density of the line, the density allocating unit 32 searches the expansion height database 311 and extracts an entry that matches the line width and the expansion height of the line. In addition, when searching the expansion height database 311, if a plurality of entries are found, the density allocating unit 32 preferably uses the entry having the smallest density in order to save ink. Thereafter, the density allocating unit 32 proceeds to the process of step S56.

If the line width of the line is equal to or higher than the prescribed value (step S51→No), the density allocating unit 32 lays out the line on the rear surface 6R (step S54) and determines the density of the line by referring to the expansion height database 311 (step S55). Thereafter, the density allocating unit 32 proceeds to the process of step S56.

In step S56, the density allocating unit 32 determines whether the layouts of all lines included have been processed. Once all the lines included in the design information have been laid out, the density allocating unit 32 advances to intersection allocation processing of steps S57 to S59.

In step S57, the density allocating unit 32 specifies a line on the front surface and a line on the rear surface that form an intersection that is to undergo determination and repeats this process for all intersections of lines on the front surface and lines on the rear surface. The density allocating unit 32 searches the intersection expansion height database 312 for the line width on the front surface and the rear surface and the expansion height of the lines and the intersection. Once the corresponding entry has been found through the search, the density allocating unit 32 calculates the front surface density and the rear surface density for the intersection (step S58). In the case where a plurality of entries are found in the intersection expansion height database 312, the density allocating unit 32 uses the entry having the smallest density in order to save ink. The front surface black ink density and the rear surface black ink density for the intersection are determined by the processing of step S58.

In other words, for each intersection between the protruding lines that form a three-dimensional image, the density allocating unit 32 divides the density of the intersection between a front-surface-side density image and a rear-surface-side density image in accordance with the line widths and expansion heights of the lines that form the intersection and in accordance with the expansion height of the intersection. The division ratios are listed in the intersection expansion height database 312.

In step S59, the density allocating unit 32 determines whether all intersections included in the design information have been allocated. Once allocation has been performed for all the intersections included in the design information (step S59), the density allocating unit 32 advances to the processing of step S60.

In step S60, the tactile map operator sets the thermally expandable sheet 6 in the printer 4 in order to perform printing on the front surface 6F of the thermally expandable sheet 6. In addition, the tactile map operator presses (taps) a start button on a guidance screen, which is not illustrated, displayed on the touch panel display 2 (step S61). Thus, the computer 3 prints a density image on the front surface 6F of the thermally expandable sheet 6 using the printer 4 (step S62).

In addition, the tactile map operator sets the thermally expandable sheet 6 in the printer 4 in order to perform printing on the rear surface 6R of the thermally expandable sheet 6 (step S63). The tactile map operator presses (taps) the start button on the guidance screen, which is not illustrated, displayed on the touch panel display 2 (step S64). Thus, the computer 3 prints a density image on the rear surface 6R of the thermally expandable sheet 6 using the printer 4 (step S65), and thus the line allocation processing ends.

<Effect of Embodiment 2 >

An intersection between a line allocated to the front surface 6F of the thermally expandable sheet 6 and a line allocated to the rear surface 6R of the thermally expandable sheet 6 can be prevented from becoming too high. The intersection is an intersection between a highway and an ordinary path on a tactile map, for example.

<Embodiment 3>

In Embodiment 2, the density of an intersection part of a thin line on the front surface and the density of an intersection part of a thick line on the rear surface are adjusted by preparing a database relating to the expansion heights of intersections, and it is assumed that the lines and the intersections have the same expansion heights.

However, a case where the expansion height of a thin line on the front surface and the expansion height of a thick line on the rear surface are different can be considered. The case where the expansion height of an intersection is the same as the expansion height of a thin line, the case where the expansion height of the intersection is the same as the expansion height of a thick line, and the case where the expansion height of the intersection is different from both the expansion height of a thin line and the expansion height of a thick line can also be considered.

In Embodiment 3, the expansion height of a protruding intersection is the same as the expansion height of a protruding thin line or a protruding thick line.

In the case where a protruding thin line is formed with priority over a protruding thick line, the expansion height of the protruding intersection is the same as the expansion height of the protruding thin line. This point will be explained while referring to FIGS. 17 to 22.

Conversely, in the case where a protruding thick line is formed with priority over a protruding thin line, the expansion height of the protruding intersection is the same as the expansion height of the protruding thick line. This point will be explained while referring to FIGS. 23 to 28.

FIGS. 17A to 17D illustrate the results of line allocation processing in the case where a thin line is lower than a thick line, and the expansion height of an intersection and the expansion height of a thin line are equal to each other. FIGS. 17A to 17D are partial enlarged views on the same scale.

Figure 17A:
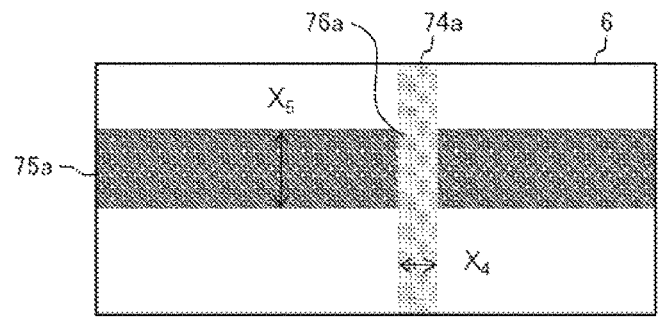
FIG. 17A illustrates width information and height information of protruding lines forming a three-dimensional image in the case where a thin line is lower than a thick line, and the expansion height of an intersection and the expansion height of a thin line are equal to each other.

FIG. 17A illustrates width information and expansion height information of the protruding lines that form a three-dimensional image. The information illustrated in FIG. 17A is three-dimensional image design information.

As illustrated in FIG. 17A, a protruding thin line 74a is drawn vertically with priority on the thermally expandable sheet 6 and has a line width of $X_4$ pre-expansion. A protruding thick line 75a is drawn horizontally, and intersects the protruding thin line 74a at a protruding intersection 76a. The lien width of the protruding thick line 75a pre-expansion is $X_5$.

In FIG. 17A, the expansion height information of the protruding lines is represented using hatching. An expansion height of 0 is represented when there is no hatching and the color is white. The denser the hatching, the higher the region is. The protruding thin line 74a and the protruding intersection 76a are displayed using the same hatching, and this indicates that the protruding thin line 74a and the protruding intersection 76a have the same expansion height. The regions of the protruding thick line 75a that are not included in the protruding intersection 76a are displayed using a darker hatching than the protruding intersection 76a, and this indicates that these regions are higher than the protruding thin line 74a and the protruding intersection 76a.

Figure 17B:
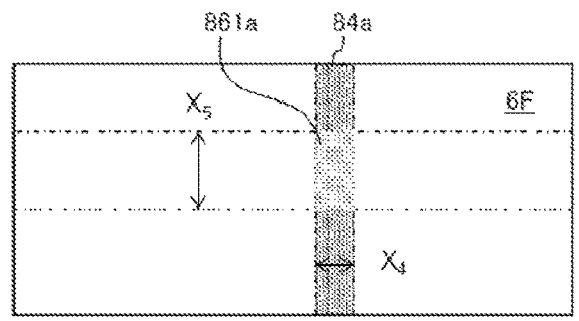
FIG. 17B illustrates a density image on a front surface of a thermally expandable sheet for forming a three-dimensional image.

FIG. 17B illustrates a density image that is for forming a three-dimensional image on the front surface 6F of the thermally expandable sheet 6.

A line 84a that corresponds to the protruding thin line 74a pre-expansion is drawn vertically on the front surface 6F of the thermally expandable sheet 6 and has a line width of $X_4$. The line 84a is printed at a prescribed density using black ink, and when irradiated with light, the line 84a converts the light into heat in accordance with the density. The line 84a is a line for causing the protruding thick line 94a shown in FIG. 17D to be formed.

Figure 17C:
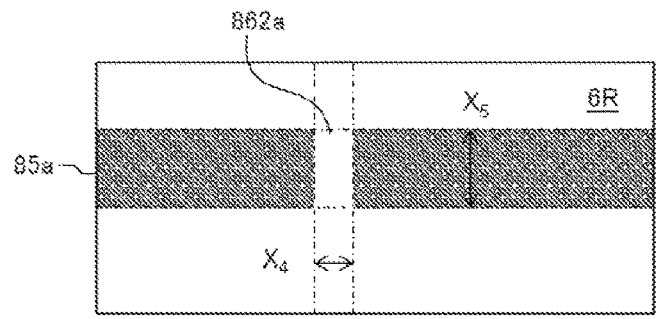
FIG. 17C illustrates a density image on a rear surface of a thermally expandable sheet for forming a three-dimensional image.
Figure 17D:
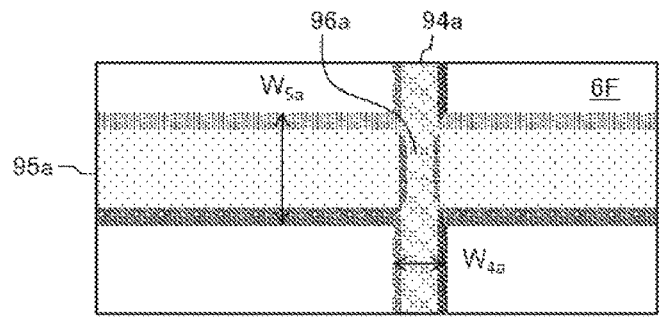
FIG. 17D illustrates a three-dimensional image formed by irradiating a front surface and rear surface of a thermally expandable sheet with light.

As shown in FIG. 17D, an intersection 861a that corresponds to the protruding intersection 76a has a lower density than the parts of the line 84a outside the intersection 861a. Therefore, a smaller amount of heat is generated in the region of the intersection 861a with irradiation of light than in the regions of the line 84a outside the intersection 861a. In addition, although an image is also formed using color ink on the front surface 6F of the thermally expandable sheet 6, illustration of such an image is omitted here.

FIG. 17C illustrates a density image that is for forming a three-dimensional image on the rear surface 6R of the thermally expandable sheet 6.

A line 85a that corresponds to the protruding thick line 75a pre-expansion is drawn horizontally on the rear surface 6R of the thermally expandable sheet 6 and has a line width of $X_5$. The line 85a is printed at a higher density than the line 84a using black ink, and when irradiated with light, the line 85a converts the light into heat in accordance with the density of the ink. The line 85a is a line for causing the protruding thick line 95a shown in FIG. 17D to be formed.

As shown in FIG. 17D, the region of an intersection 862a that corresponds to the protruding intersection 76a is not printed with black ink, and therefore remains white. Therefore, the amount of heat generated in the region of the intersection 862a with irradiation of light is very small.

FIG. 17D illustrates a three-dimensional image formed by irradiating the front surface 6F and the rear surface 6R of the thermally expandable sheet 6 with light.

A protruding thin line 94a of a prescribed height is formed with priority in a vertical direction on the front surface 6F of the thermally expandable sheet 6, and a protruding thick line 95a that is higher than the protruding thin line 94a is formed in a horizontal direction on the front surface 6F of the thermally expandable sheet 6. A protruding intersection 96a having the same expansion height as the protruding thin line 94a is formed in the part where the protruding thin line 94a and the protruding thick line 95a intersect.

The protruding thin line 94a is an expanded protruding line formed by irradiating the line 84a printed on the front surface 6F (refer to FIG. 17B) with light and has a line width of $W_{4a}$. The protruding thick line 95a is formed by irradiating the line 85a printed on the rear surface 6R (refer to FIG. 17C) with light. The protruding intersection 96a is formed by irradiating with light the intersection 861a printed on the front surface 6F (refer to FIG. 17B) and a part of the line 85a printed on the rear surface 6R that is in the vicinity of the intersection 862a. The line width $W_{4a}$ of the protruding thin line 94a post-expansion is approximately equal to and slightly wider than the line width $X_4$ of the protruding thin line 74a, which is the design information for the protruding thin line 94a. The line width $W_{5a}$ of the protruding thick line 95a post-expansion is approximately equal to and slightly wider than the line width $X_5$ of the protruding thick line 75a, which is the design information for the protruding thin line 95a.

In other words, the design information illustrated in FIG. 17A is realized as a three-dimensional image.

Figure 18:
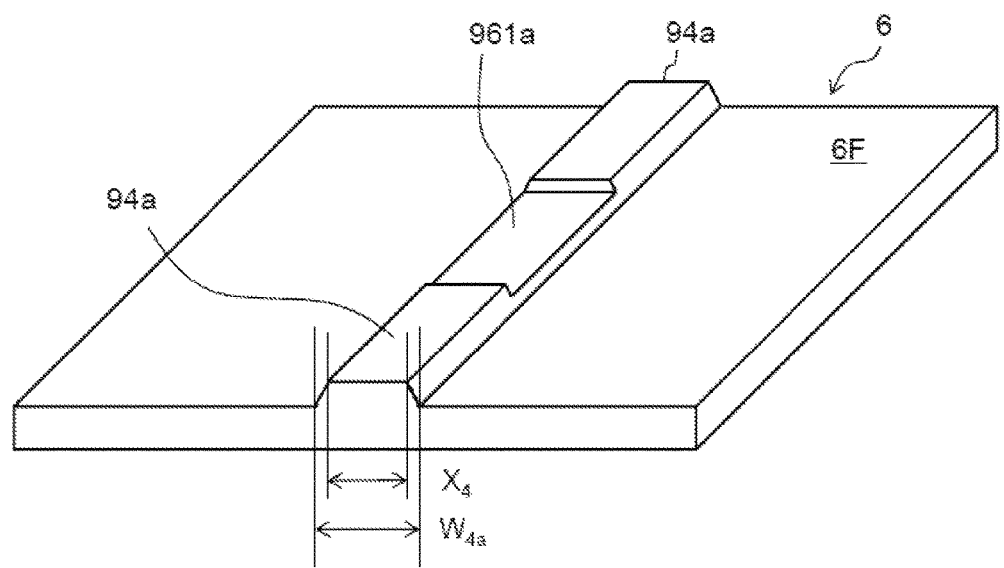
FIG. 18 is a perspective view of a three-dimensional image formed by irradiating a front surface of a thermally expandable sheet with light.

FIG. 18 is a perspective view of the three-dimensional image formed by irradiating the front surface 6F of the thermally expandable sheet 6 with light.

The protruding thin line 94a is formed with a prescribed height on the front surface 6F of the thermally expandable sheet 6 in a vertical direction. In addition, a protruding intersection 961a is formed so as to be lower than the protruding thin line 94a. The protruding thin line 94a is formed by irradiating the line 84a printed on the front surface 6F (refer to FIG. 17B) with light. The line width $W_{4a}$ of the protruding thin line 94a is approximately equal to and slightly wider than the line width $X_4$ of the line 84a. This is because the heat generated at the line 84a by the light irradiation is transmitted to the area surrounding the line, thus causing the thermally expandable sheet 6 to expand. The top surface of the line 84a and the protruding thin line 94a are schematically shown as being the same.

The protruding intersection 961a is formed by irradiating the intersection 861a (refer to FIG. 17B) with light.

Figure 19:
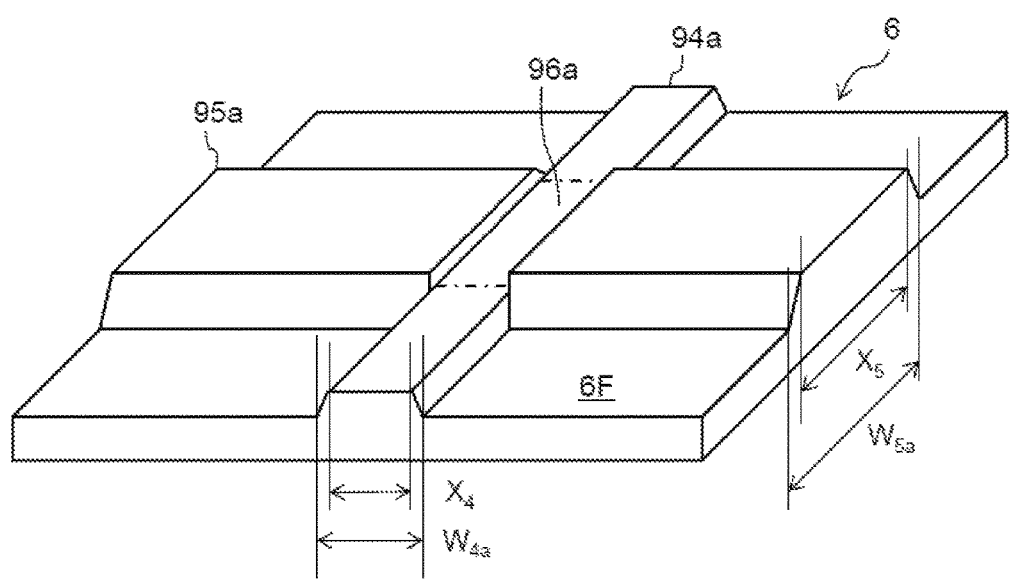
FIG. 19 is a perspective view of a three-dimensional image formed by irradiating a rear surface of a thermally expandable sheet with light after the front surface is irradiated.

FIG. 19 is a perspective view of the three-dimensional image formed by irradiating the rear surface 6R of the thermally expandable sheet 6 with light after the front surface 6F is irradiated. In FIG. 19, the three-dimensional image illustrated in FIG. 17D is seen from a diagonal direction.

The protruding thin line 94a of line width $W_{4a}$ is formed with priority in a vertical direction on the front surface 6F of the thermally expandable sheet 6, and the protruding thick line 95a of line width $W_{5a}$ is additionally formed in a horizontal direction on the front surface 6F of the thermally expandable sheet 6.

The protruding thin line 94a is formed by irradiating the line 84a printed on the front surface 6F (refer to FIG. 17B) with light. The protruding thick line 95a is formed by irradiating the line 85a printed on the rear surface 6R (refer to FIG. 17C) with light. The line width $W_{5a}$ of the protruding thick line 95a is approximately equal to and slightly wider than the line width $X_5$ of the line 85a. This is because the heat generated at the line 85a by the light irradiation is transmitted to the area surrounding the line, thus causing the thermally expandable sheet 6 to expand. The top surface of the protruding thick line 95a is schematically illustrated as having plane symmetry with the line 85a.

The protruding intersection 96a is formed by irradiating with light the intersection 861a printed on the front surface 6F (refer to FIG. 17B) and a part of the line 85a printed on the rear surface 6R that is in the vicinity of the intersection 862a (see FIG. 17D).

FIGS. 20A to 20D illustrate the results of line allocation processing in the case where a thin line is higher than a thick line, and the expansion height of an intersection and the expansion height of the thin line are equal to each other. FIGS. 20A to 20D are partial enlarged views on the same scale.

Figure 20A:
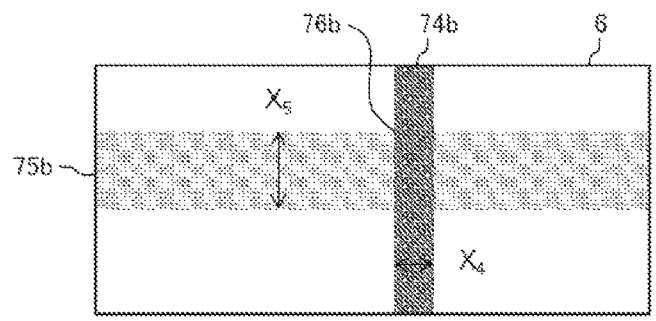
FIG. 20A illustrates width information and height information of protruding lines forming a three-dimensional image in the case where a thin line is higher than a thick line, and the expansion height of an intersection and the expansion height of a thin line are equal to each other.

FIG. 20A illustrates width information and height information of the protruding lines that form a three-dimensional image. The information illustrated in FIG. 20A is three-dimensional image design information.

As illustrated in FIG. 20A, a protruding thin line 74b is drawn vertically with priority on the thermally expandable sheet 6 and has a line width pre-expansion of $X_4$. A protruding thick line 75b is drawn horizontally, and intersects the protruding thin line 74b at a protruding intersection 76b. The line width of the protruding thick line 75b pre-expansion is $X_5$.

In FIG. 20A, the expansion height information of the protruding lines is represented using hatching. An expansion height of 0 is represented when there is no hatching and the color is white. The denser the hatching, the higher the region is. The regions of the protruding thick line 75b that are not included in the protruding intersection 76b are displayed using a lighter hatching than the protruding intersection 76b, and this indicates that these regions are lower than the protruding thin line 74b and the protruding intersection 76b.

Figure 20B:
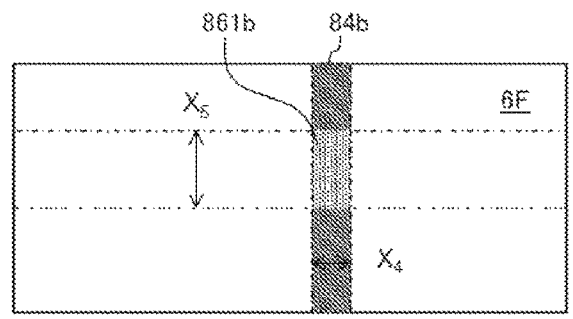
FIG. 20B illustrates a density image on a front surface of a thermally expandable sheet for forming a three-dimensional image.

FIG. 20B illustrates a density image that is for forming a three-dimensional image on the front surface 6F of the thermally expandable sheet 6.

A line 84b that corresponds to the protruding thin line 74b pre-expansion is drawn vertically on the front surface 6F of the thermally expandable sheet 6 and has a line width of $X_4$. The line 84b is printed at a prescribed density using black ink, and when irradiated with light, the line 84b converts the light into heat in accordance with the density. The line 84b is a line for causing the protruding thin line 94b shown in FIG. 20D to be formed.

Figure 20C:
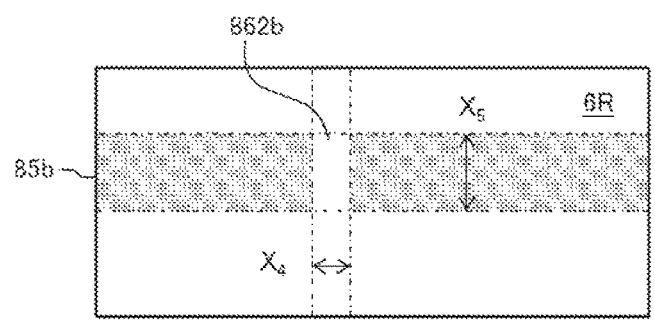
FIG. 20C illustrates a density image on a rear surface of a thermally expandable sheet for forming a three-dimensional image.
Figure 20D:
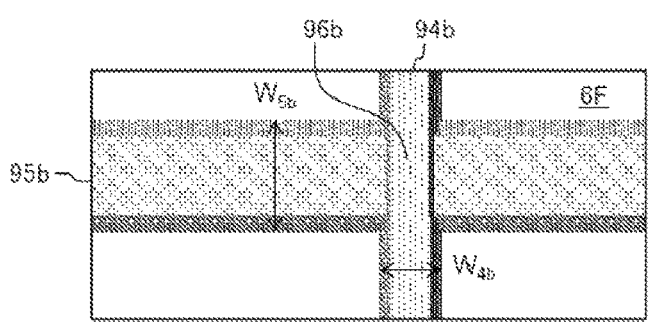
FIG. 20D illustrates a three-dimensional image formed by irradiating a front surface and rear surface of a thermally expandable sheet with light.

As shown in FIG. 20D, an intersection 861b that corresponds to the protruding intersection 76b has a lower density than the parts of the line 84b outside the intersection 861b. Therefore, a smaller amount of heat is generated in the region of the intersection 861b with irradiation of light than in the regions of the line 84b outside the intersection 861b. In addition, although an image is also formed using color ink on the front surface 6F of the thermally expandable sheet 6, illustration of such an image is omitted here.

FIG. 20C illustrates a density image that is for forming a three-dimensional image on the rear surface 6R of the thermally expandable sheet 6.

A line 85b that corresponds to the protruding thick line 75b pre-expansion is drawn horizontally on the rear surface 6R of the thermally expandable sheet 6 and has a line width of $X_5$. The line 85b is printed using black ink, and when irradiated with light, the line 85b converts the light into heat in accordance with the density of the ink. The line 85b is a line for causing the protruding thick line 95b shown in FIG. 20D to be formed.

As shown in FIG. 20D, the region of an intersection 862b that corresponds to the protruding intersection 76b is not printed with black ink, and therefore remains white. Therefore, the amount of heat generated in the region of the intersection 862b with irradiation of light is very small.

FIG. 20D illustrates a three-dimensional image formed by irradiating the front surface 6F and the rear surface 6R of the thermally expandable sheet 6 with light.

A protruding thin line 94b is formed with priority in a vertical direction on the front surface 6F of the thermally expandable sheet 6, and a protruding thick line 95b is additionally formed in a horizontal direction on the front surface 6F of the thermally expandable sheet 6. A protruding intersection 96b is formed in a part where the protruding thin line 94b and the protruding thick line 95b intersect each other.

The protruding thin line 94b is an expanded protruding line formed by irradiating the line 84b printed on the front surface 6F (refer to FIG. 20B) with light and has a line width of $W_{4b}$. The protruding thick line 95b is an expanded protruding line formed by irradiating the line 85b printed on the rear surface 6R (refer to FIG. 20C) with light and has a line width of $W_{5b}$. The protruding intersection 96b is formed by irradiating with light the intersection 861b printed on the front surface 6F (refer to FIG. 20B) and a part of the line 85b printed on the rear surface 6R that is in the vicinity of the intersection 862b. The line width $W_{4b}$ of the protruding thin line 94b is approximately equal to and slightly wider than the line width $X_4$ of the protruding thin line 74b, which is the design information of the protruding thin line 94b. The line width $W_{5b}$ of the protruding thick line 95b is approximately equal to and slightly wider than the line width $X_5$ of the protruding thick line 75b, which is the design information of the protruding thick line 95b.

In other words, the design information illustrated in FIG. 20A is realized as a three-dimensional image.

Figure 21:
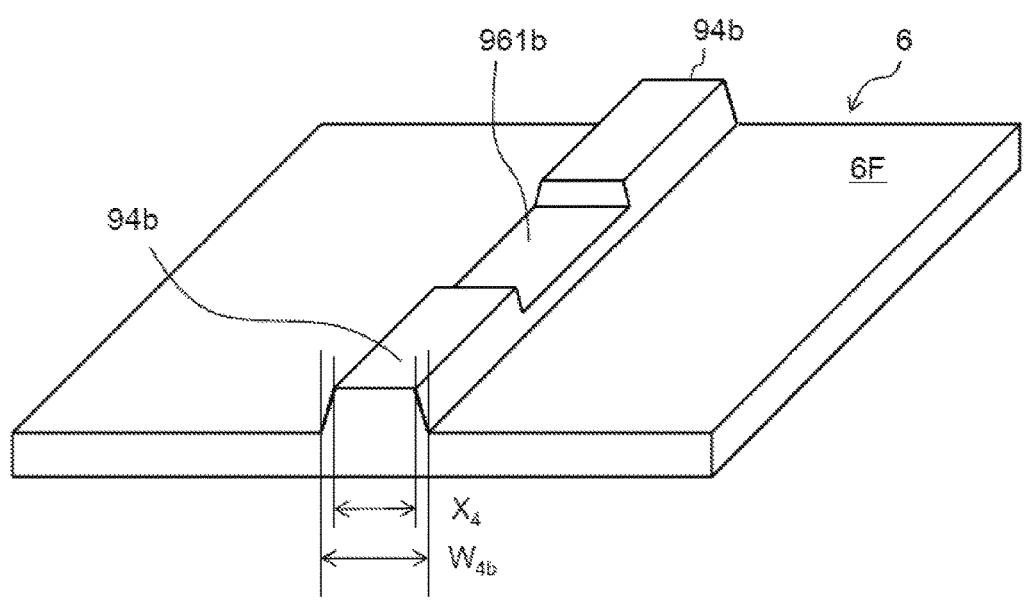
FIG. 21 is a perspective view of a three-dimensional image formed by irradiating a front surface of a thermally expandable sheet with light.

FIG. 21 is a perspective view of the three-dimensional image formed by irradiating the front surface 6F of the thermally expandable sheet 6 with light.

The protruding thin line 94b of line width $W_{4b}$ is formed with a prescribed height on the front surface 6F of the thermally expandable sheet 6 in a vertical direction. In addition, a protruding intersection 961b is formed so as to be lower than the protruding thin line 94b. The protruding thin line 94b is formed by irradiating the line 84b printed on the front surface 6F (refer to FIG. 20B) with light. The line width $W_{4b}$ of the protruding thin line 94b is approximately equal to and slightly wider than the line width $X_4$ of the line 84b. This is because the heat generated at the line 84b by the light irradiation is transmitted to the area surrounding the line, thus causing the thermally expandable sheet 6 to expand. The top surface of the line 84b and the protruding thin line 94b are schematically shown as being the same.

The protruding intersection 961b is formed by irradiating the intersection 861b (refer to FIG. 20B) with light.

Figure 22:
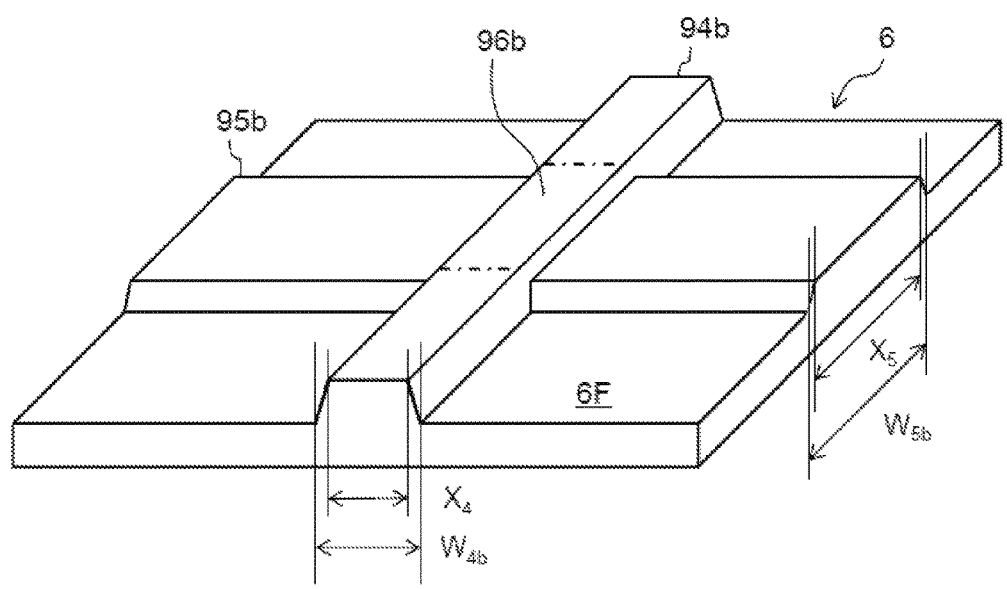
FIG. 22 is a perspective view of a three-dimensional image formed by irradiating a rear surface of a thermally expandable sheet with light after the front surface is irradiated.

FIG. 22 is a perspective view of the three-dimensional image formed by irradiating the rear surface 6R of the thermally expandable sheet 6 with light after the front surface 6F is irradiated. In FIG. 22, the three-dimensional image illustrated in FIG. 20D is seen from a diagonal direction.

The protruding thin line 94b of line width $W_{4b}$ is formed with priority in a vertical direction on the front surface 6F of the thermally expandable sheet 6, and the protruding thick line 95b of line width $W_{5b}$ is additionally formed in a horizontal direction on the front surface 6F of the thermally expandable sheet 6.

The protruding thin line 94b is formed by irradiating the line 84b printed on the front surface 6F (refer to FIG. 20B) with light. The protruding thick line 95b is formed by irradiating the line 85b printed on the rear surface 6R (refer to FIG. 20C) with light. The line width $W_{5b}$ of the protruding thick line 95b is approximately equal to and slightly wider than the line width $X_5$ of the line 85b. The top surface of the line 85b and the protruding thick line 95b are schematically shown as sharing plane symmetry.

The protruding intersection 96b is formed by irradiating with light the intersection 861b printed on the front surface 6F (refer to FIG. 20B) and a part of the line 85b printed on the rear surface 6R that is in the vicinity of the intersection 862b (see FIG. 20C).

FIGS. 23A to 23D illustrate the results of line allocation processing in the case where a thin line is lower than a thick line, and the expansion height of an intersection and the expansion height of a thick line are equal to each other. FIGS. 23A to 23D are partial enlarged views on the same scale.

Figure 23A:
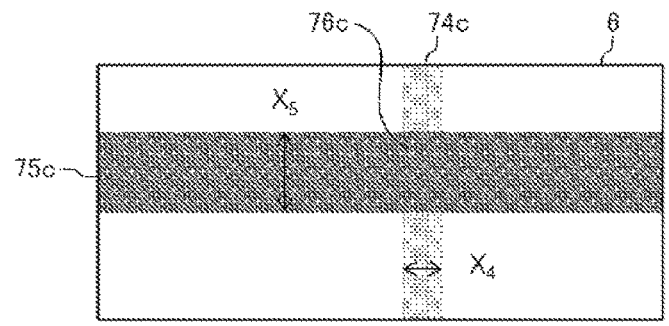
FIG. 23A illustrates width information and height information of protruding lines forming a three-dimensional image in the case where a thin line is lower than a thick line, and the expansion height of an intersection and the expansion height of a thick line are equal to each other.

FIG. 23A illustrates width information and height information of the protruding lines that form a three-dimensional image. The information illustrated in FIG. 23A is three-dimensional image design information.

As illustrated in FIG. 23A, a protruding thick line 75c is drawn horizontally with priority on the thermally expandable sheet 6 and has a line width of $X_5$. A protruding thin line 74c is drawn vertically, and intersects the protruding thick line 75c in a protruding intersection 76c. The line width of the protruding thin line 74c pre-expansion is $X_4$.

In FIG. 23A, the expansion height information of the protruding lines is represented using hatching. An expansion height of 0 is represented when there is no hatching and the color is white. The denser the hatching, the higher the region is. The protruding thick line 75c and the protruding intersection 76c are displayed using the same hatching, and this indicates that the protruding thick line 75c and the protruding intersection 76c have the same expansion height. Regions of the protruding thin line 74c that are not included in the protruding intersection 76c are displayed using a lighter hatching than the protruding intersection 76c, and this indicates that these regions are lower than the protruding thick line 75c.

Figure 23B:
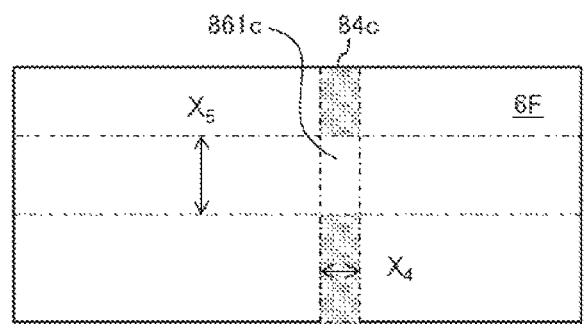
FIG. 23B illustrates a density image on a front surface of a thermally expandable sheet for forming a three-dimensional image.

FIG. 23B illustrates a density image that is for forming a three-dimensional image on the front surface 6F of the thermally expandable sheet 6.

A line 84c that corresponds to the protruding thin line 74c pre-expansion is drawn vertically on the front surface 6F of the thermally expandable sheet 6 and has a line width of $X_4$. The line 84c is printed at a prescribed density using black ink, but the region of an intersection 861c is not subjected to printing and remains white. The region of the intersection 861c corresponds to the protruding intersection 76c.

Upon being irradiated with light, the region of the line 84c printed at the prescribed density converts the light into heat in accordance with the density. The line 84c is a line for causing the protruding thin line 94c shown in FIG. 23D to be formed. The amount of heat generated by irradiation of light in the region of the intersection 861c, which was not subjected to printing, is very small. In addition, although an image is also formed using color ink on the front surface 6F of the thermally expandable sheet 6, illustration of such an image is omitted here.

Figure 23C:
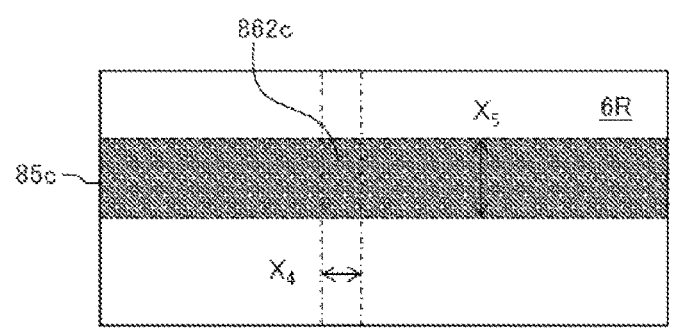
FIG. 23C illustrates a density image on a rear surface of a thermally expandable sheet for forming a three-dimensional image.

FIG. 23C illustrates a density image that is for forming a three-dimensional image on the rear surface 6R of the thermally expandable sheet 6.

A line 85c that corresponds to the protruding thick line 75c pre-expansion is drawn horizontally on the rear surface 6R of the thermally expandable sheet 6 and has a line width of $X_5$. The line 85c and an intersection 862c are printed at the same density using black ink, and upon being irradiated with light, convert the light into heat in accordance with the density of the ink. The line 85c is a line for causing the protruding thick line 95c shown in FIG. 23D to be formed. The region of the intersection 862c corresponds to the protruding intersection 76c shown in FIG. 23D.

Figure 23D:
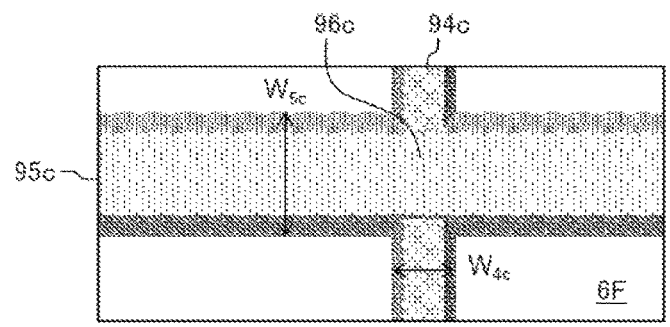
FIG. 23D illustrates a three-dimensional image formed by irradiating a front surface and rear surface of a thermally expandable sheet with light.

FIG. 23D illustrates a three-dimensional image formed by irradiating the front surface 6F and the rear surface 6R of the thermally expandable sheet 6 with light.

A protruding thick line 95c is formed with priority in a horizontal direction on the front surface 6F of the thermally expandable sheet 6, and a protruding thin line 94c that is lower than the protruding thick line 95c is formed in a vertical direction on the front surface 6F of the thermally expandable sheet 6. A protruding intersection 96c having the same expansion height as a protruding thick line 95c is formed in a part where the protruding thin line 94c and the protruding thick line 95c intersect.

The protruding thin line 94c is an expanded protruding line formed by irradiating the line 84c printed on the front surface 6F (refer to FIG. 23B) with light and has a line width of $W_{4c}$. The protruding thick line 95c and the protruding intersection 96c are an expanded protruding line and protruding intersection formed by irradiating the line 85c printed on the rear surface 6R and the intersection 862c (refer to FIG. 23C) with light.

The line width $W_{4c}$ of the protruding thin line 94c post-expansion is approximately equal to and slightly wider than the line width $X_4$ of the protruding thin line 74c, which is the design information for the protruding thin line 94c. The line width $W_{5c}$ of the protruding thick line 95c post-expansion is approximately equal to and slightly wider than the line width $X_5$ of the protruding thick line 75c, which is the design information for the protruding thick line 95c. In other words, the design information illustrated in FIG. 23A is realized as a three-dimensional image.

Figure 24:
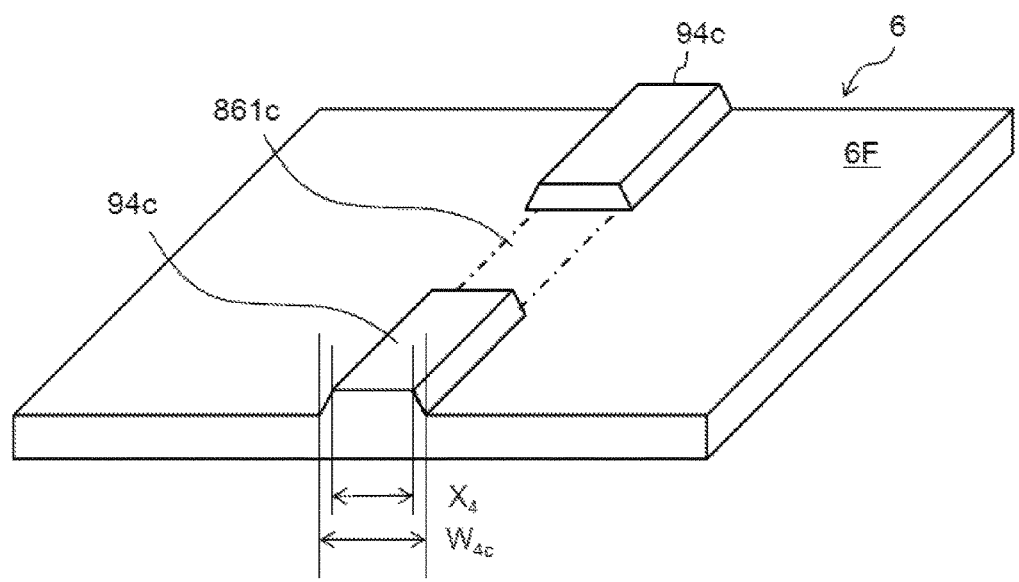
FIG. 24 is a perspective view of a three-dimensional image formed by irradiating a front surface of a thermally expandable sheet with light.

FIG. 24 is a perspective view of the three-dimensional image formed by irradiating the front surface 6F of the thermally expandable sheet 6 with light.

The protruding thin line 94c of line width $W_{4c}$ is formed with a prescribed height on the front surface 6F of the thermally expandable sheet 6 in a vertical direction, whereas the region of the intersection 861c (refer to FIG. 23B) does not expand. The protruding thin line 94c except for the intersection 861c is formed by irradiating the line 84c printed on the front surface 6F (refer to FIG. 23B) with light. The line width $W_{4c}$ of the protruding thin line 94c is approximately equal to and slightly wider than the line width $X_4$ of the line 84c. This is because the heat generated at the line 84c by the light irradiation is transmitted to the area surrounding the line, thus causing the thermally expandable sheet 6 to expand. The top surface of the line 84c and the protruding thin line 94c are schematically shown as being the same.

Figure 25:
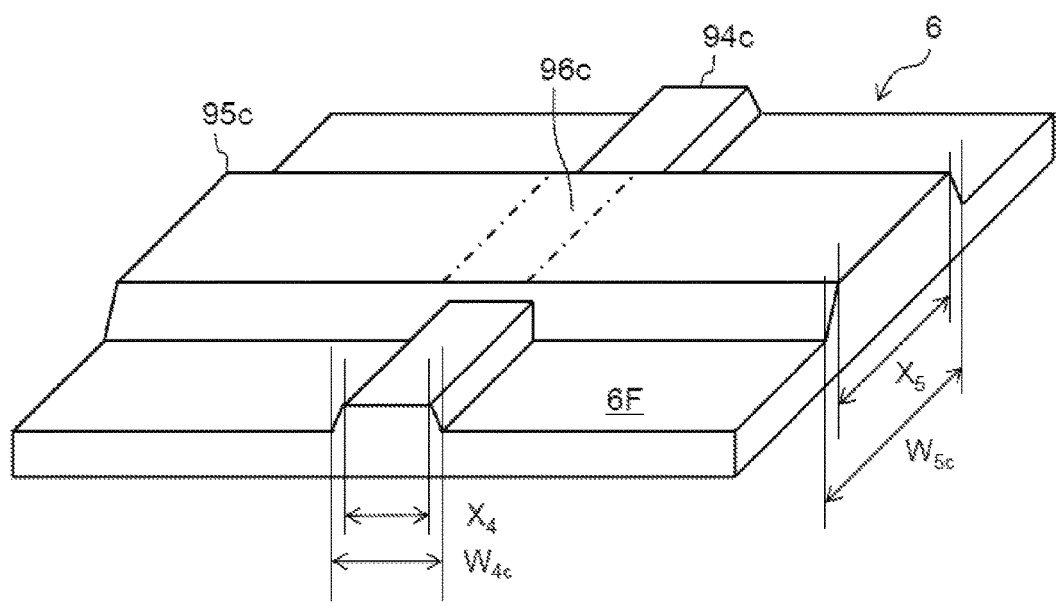
FIG. 25 is a perspective view of a three-dimensional image formed by irradiating a rear surface of a thermally expandable sheet with light after the front surface is irradiated.

FIG. 25 is a perspective view of the three-dimensional image formed by irradiating the rear surface 6R of the thermally expandable sheet 6 with light after the front surface 6F is irradiated. In FIG. 25, the three-dimensional image illustrated in FIG. 23D is seen from a diagonal direction.

The protruding thin line 94c except for the protruding intersection 96c is formed in a vertical direction on the front surface 6F of the thermally expandable sheet 6, and the protruding thick line 95c of line width $W_{5c}$ is formed with priority in a horizontal direction on the front surface 6F of the thermally expandable sheet 6.

The protruding thin line 94c except for the protruding intersection 96c is formed by irradiating the line 84c printed on the front surface 6F (refer to FIG. 23B) with light. The protruding thick line 95c and the protruding intersection 96c are formed by irradiating the line 85c and the intersection 862c printed on the rear surface 6R (refer to FIG. 23C) with light. The line width $W_{5c}$ of the protruding thick line 95c is approximately equal to and slightly wider than the line width $X_5$ of the line 85c. This is because the heat generated at the line 85c by the light irradiation is transmitted to the area surrounding the line, thus causing the thermally expandable sheet 6 to expand. The top surface of the line 85c and the protruding thick line 95c are schematically shown as sharing plane symmetry.

FIGS. 26A to 26D illustrate the results of line allocation processing in the case where a thin line is higher than a thick line, and the expansion height of an intersection and the expansion height of a thick line are equal to each other. FIGS. 26A to 26D are partial enlarged views on the same scale.

Figure 26A:
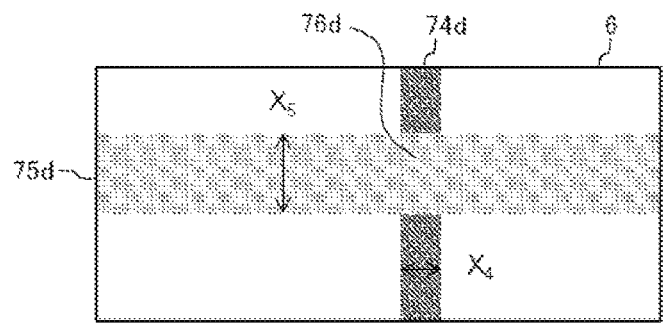
FIG. 26A illustrates width information and height information of protruding lines forming a three-dimensional image in the case where a thin line is higher than a thick line, and the expansion height of an intersection and the expansion height of a thick line are equal to each other.

FIG. 26A illustrates width information and height information of the protruding lines that form a three-dimensional image. The information illustrated in FIG. 26A is three-dimensional image design information.

As illustrated in FIG. 26A, a protruding thick line 75d is drawn horizontally with priority on the thermally expandable sheet 6 and has a line width pre-expansion of $X_5$. A protruding thin line 74d is drawn vertically, and intersects the protruding thick line 75d in a protruding intersection 76d. The line width of the protruding thin line 74d pre-expansion is $X_4$.

In FIG. 26A, the expansion height information of the protruding lines is represented using hatching. An expansion height of 0 is represented when there is no hatching and the color is white. The denser the hatching, the higher the region is. The protruding thick line 75d and the protruding intersection 76d are displayed using the same hatching, and this indicates that the protruding thick line 75d and the protruding intersection 76d have the same expansion height. Regions of the protruding thin line 74d that are not included in the protruding intersection 76d are displayed using a darker hatching than the protruding intersection 76d, and this indicates that these regions are higher than the protruding thick line 75d.

Figure 26B:
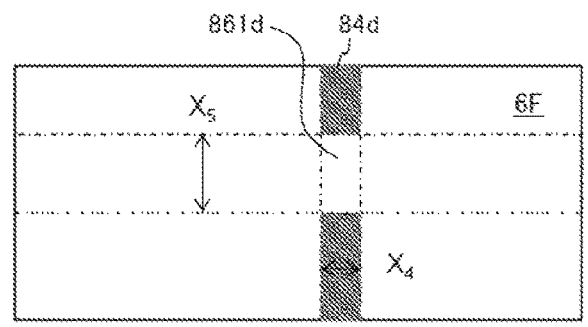
FIG. 26B illustrates a density image on a front surface of a thermally expandable sheet for forming a three-dimensional image.

FIG. 26B illustrates a density image that is for forming a three-dimensional image on the front surface 6F of the thermally expandable sheet 6.

A line 84d that corresponds to the protruding thin line 74d pre-expansion is drawn vertically on the front surface 6F of the thermally expandable sheet 6 and has a line width of $X_4$. The line 84d is printed at a prescribed density using black ink, but the region of an intersection 861d is not subjected to printing and remains white. The region of the intersection 861d corresponds to the protruding intersection 76d.

Upon being irradiated with light, the region of the line 84d printed at the prescribed density converts the light into heat in accordance with the density. The line 84d is a line for causing the protruding thin line 94d shown in FIG. 26D to be formed. The amount of heat generated by irradiation of light in the region of the intersection 861d, which was not subjected to printing, is very small. In addition, although an image is also formed using color ink on the front surface 6F of the thermally expandable sheet 6, illustration of such an image is omitted here.

Figure 26C:
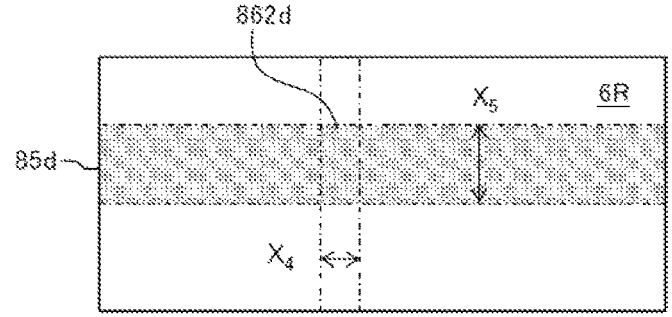
FIG. 26C illustrates a density image on a rear surface of a thermally expandable sheet for forming a three-dimensional image.

FIG. 26C illustrates a density image that is for forming a three-dimensional image on the rear surface 6R of the thermally expandable sheet 6.

A line 85d that corresponds to the protruding thick line 75d pre-expansion is drawn horizontally on the rear surface 6R of the thermally expandable sheet 6 and has a line width of $X_5$. The line 85d and an intersection 862d are printed at the same density using black ink, and upon being irradiated with light, convert the light into heat in accordance with the density of the ink. The line 85d is a line for causing the protruding thick line 95d shown in FIG. 26D to be formed. The region of the intersection 862d corresponds to the protruding intersection 76d shown in FIG. 26D.

Figure 26D:
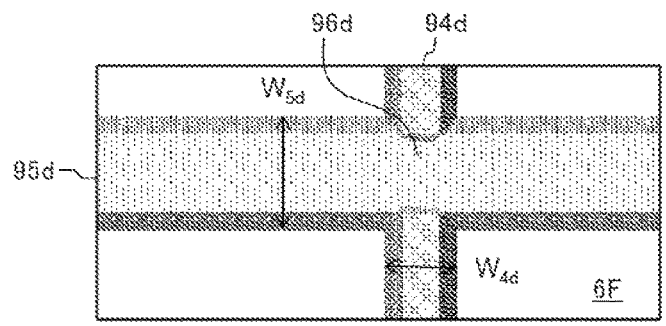
FIG. 26D illustrates a three-dimensional image formed by irradiating a front surface and rear surface of a thermally expandable sheet with light.

FIG. 26D illustrates a three-dimensional image formed by irradiating the front surface 6F and the rear surface 6R of the thermally expandable sheet 6 with light.

A protruding thick line 95d is formed with priority in a horizontal direction on the front surface 6F of the thermally expandable sheet 6, and a protruding thin line 94d that is higher than the protruding thick line 95d is formed in a vertical direction on the front surface 6F of the thermally expandable sheet 6. A protruding intersection 96d having the same expansion height as the protruding thick line 95d is formed in a part where the protruding thin line 94d and the protruding thick line 95d intersect.

The protruding thin line 94d is an expanded protruding line formed by irradiating the line 84d printed on the front surface 6F (refer to FIG. 26B) with light and has a line width of $W_{4d}$. The protruding thick line 95d and the protruding intersection 96d are an expanded protruding line and protruding intersection formed by irradiating the line 85d and the intersection 862d printed on the rear surface 6R (refer to FIG. 26C) with light. The line width of the protruding thick line 95d post-expansion is $W_{5d}$.

The line width $W_{4d}$ of the protruding thin line 94d post-expansion is approximately equal to the line width $X_4$ of the line 84 pre-expansion. The line width $W_{5d}$ of the protruding thick line 95d post-expansion is approximately equal to the line width $X_5$ of the line 85 pre-expansion. In other words, the design information illustrated in FIG. 26A is realized as a three-dimensional image.

Figure 27:
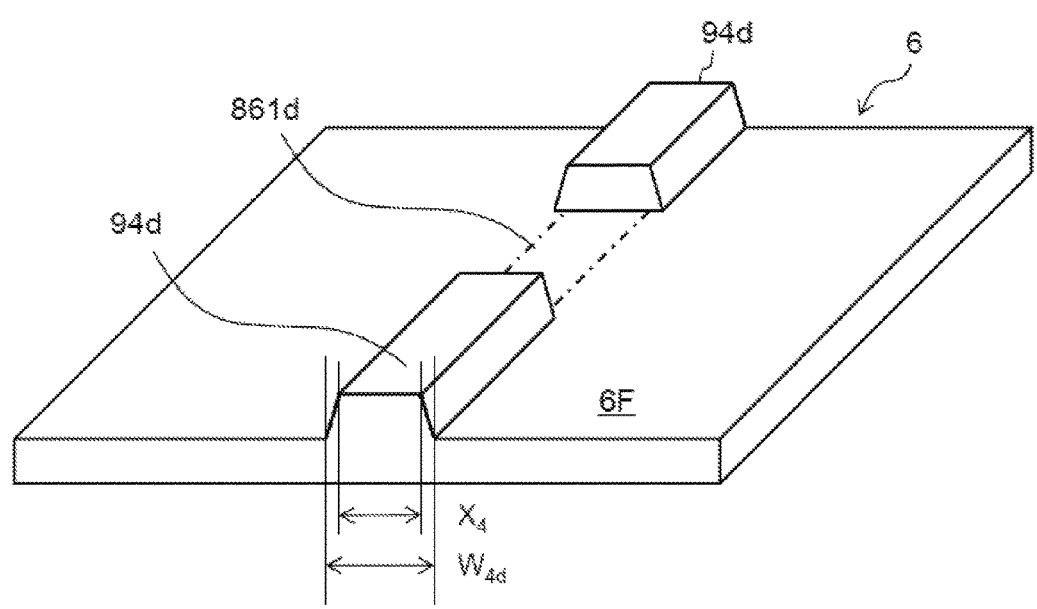
FIG. 27 is a perspective view of a three-dimensional image formed by irradiating a front surface of a thermally expandable sheet with light.

FIG. 27 is a perspective view of the three-dimensional image formed by irradiating the front surface 6F of the thermally expandable sheet 6 with light.

The protruding thin line 94d of line width $W_{4d}$ is formed with a prescribed height on the front surface 6F of the thermally expandable sheet 6 in a vertical direction, whereas the region of the intersection 861d (refer to FIG. 26B) does not expand. The protruding thin line 94d except for the intersection 861d is formed by irradiating the line 84d printed on the front surface 6F (refer to FIG. 26B) with light. The line width $W_{4d}$ of the protruding thin line 94d is approximately equal to and slightly wider than the line width $X_4$ of the line 84d. This is because the heat generated at the line 84d by the light irradiation is transmitted to the area surrounding the line, thus causing the thermally expandable sheet 6 to expand. The top surface of the line 84d and the protruding thin line 94d are schematically shown as being the same.

Figure 28:
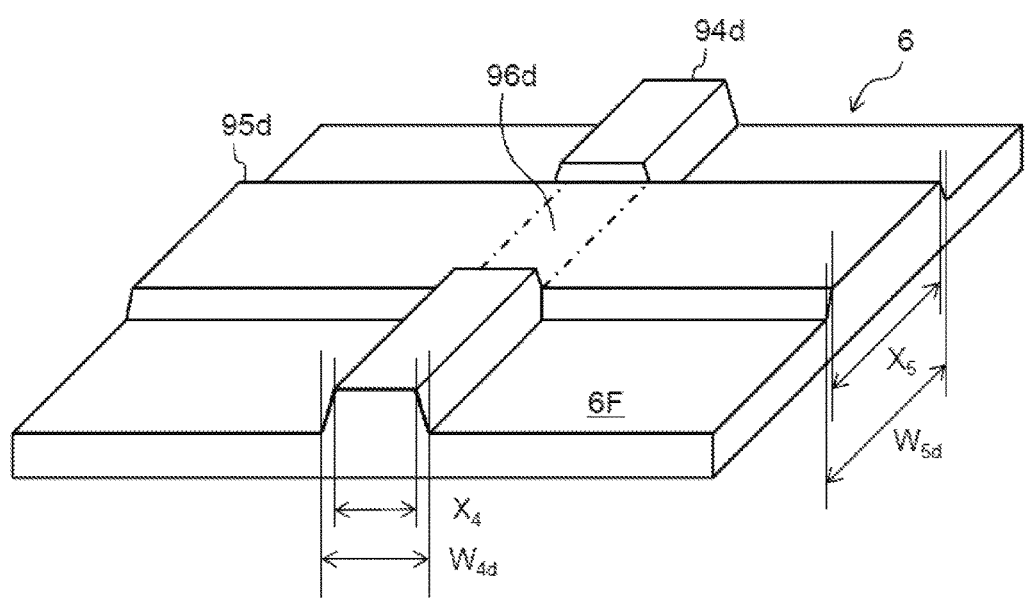
FIG. 28 is a perspective view of a three-dimensional image formed by irradiating a rear surface of a thermally expandable sheet with light after the front surface is irradiated.

FIG. 28 is a perspective view of the three-dimensional image formed by irradiating the rear surface 6R of the thermally expandable sheet 6 with light after the front surface 6F is irradiated. In FIG. 28, the three-dimensional image illustrated in FIG. 26D is seen from a diagonal direction.

The protruding thin line 94d except for the intersection 861d is formed in a vertical direction on the front surface 6F of the thermally expandable sheet 6, and the protruding thick line 95d of line width $W_{5d}$ is formed with priority in a horizontal direction on the front surface 6F of the thermally expandable sheet 6.

The protruding thin line 94d except for the protruding intersection 96d is formed by irradiating the line 84d printed on the front surface 6F (refer to FIG. 26B) with light. The protruding thick line 95d and the protruding intersection 96d are formed by irradiating the line 85d and the intersection 862d printed on the rear surface 6R (refer to FIG. 26C) with light. The line width $W_{5d}$ of the protruding thick line 95d is approximately equal to and slightly wider than the line width $X_5$ of the line 85d. The top surface of the line 85d and the protruding thick line 95d are schematically shown as being the same.

FIG. 29 is a diagram for explaining the structure of an intersection expansion height database 312A of Embodiment 3.

The intersection expansion height database 312A includes a front surface pre-expansion line width column, a front surface line expansion height column, a rear surface pre-expansion line width column, a rear surface line expansion height column, a height setting column, a front surface black ink density column, and a rear surface black ink density column.

The pre-expansion front surface line width column is a column that stores pre-expansion line width information of thin lines that form intersections. The front surface line expansion height column is a column that stores height information of protruding lines formed by thin lines that form intersections.

The pre-expansion rear surface line width column is a column in which pre-expansion line width information of thick lines that form intersections is stored. The rear surface line expansion height column is a column that stores height information of protruding lines formed by thick lines that form intersections.

The height setting column is a column that stores whether intersection design height information matches a protruding line formed by a thin line on the front surface or a protruding line formed by a thick line on the rear surface. In Embodiment 3, it is assumed that the design height information of an intersection matches either a protruding line formed by a thin line on the front surface or a protruding line formed by a thick line on the rear surface.

The front surface black ink density column is a column that stores information regarding the ink density of the intersections on the front surface. The rear surface black ink density column is a column that stores information regarding the ink density of the intersections on the rear surface.

Figure 30:
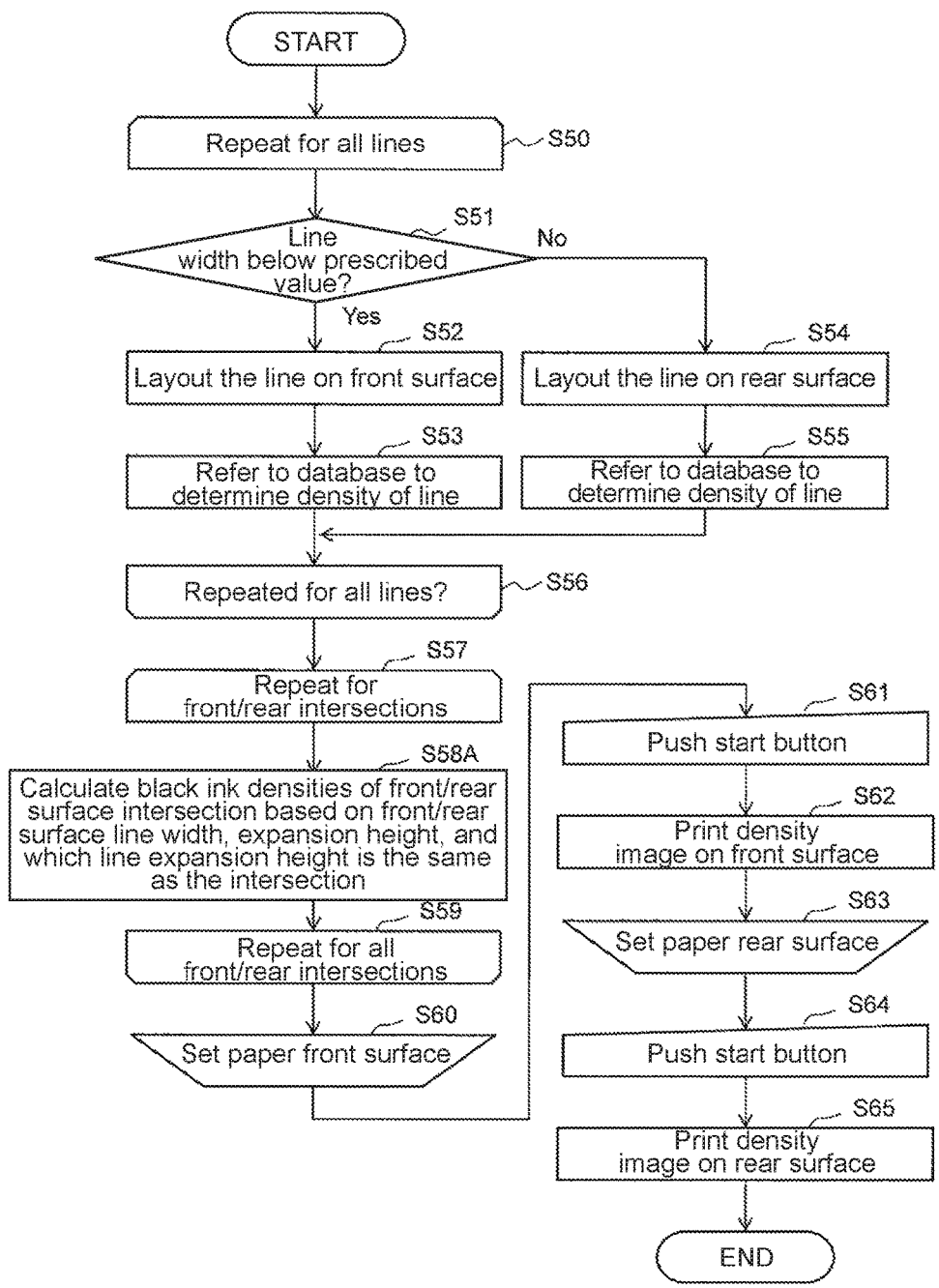
FIG. 30 is a flowchart for explaining line allocation processing.

FIG. 30 is a flowchart for explaining line allocation processing. The allocation processing is processing executed by the density allocating unit 32 (refer to FIG. 1) upon receiving the three-dimensional image design information. Elements that are the same as those in the flowchart of FIG. 16 are denoted by the same symbols.

The processing of steps S50 to S57 and the processing of steps S59 to S65 are the same as in the flowchart of FIG. 16, and only the processing of step S58A is different.

In step S58A, the density allocating unit 32 calculates the black ink density of the intersection on the front surface and the rear surface on the basis of the front surface line width, the front surface expansion height, the rear surface line width, the rear surface expansion height and whichever line expansion height the intersection is equal to.

In other words, for each intersection between the protruding lines that form a three-dimensional image, the density allocating unit 32 divides the density of the intersection between a front-surface-side density image and a rear-surface-side density image in accordance with the line widths and expansion heights of the lines that form the intersection and in accordance with the expansion height of the intersection. The division ratios are listed in the intersection expansion height database 312A.

<Effect of Embodiment 3>

An intersection between a line allocated to the front surface 6F of the thermally expandable sheet 6 and a line allocated to the rear surface 6R of the thermally expandable sheet 6 can be made to have a desired expansion height.

<Embodiment 4>

The three-dimensional image forming system of Embodiment 4 allocates the protruding line for which the post-expansion line width has been received to the rear side and front side of the thermally expandable sheet in accordance with the post-expansion line width of the protruding line. The "post-expansion line width of the protruding line" refers to the width from one rise to the other rise of the protruding line.

Furthermore, the line width of the post-expansion protruding line differs from the line width of the two-dimensional line used to form the protruding line. Therefore, there is a risk that line widths could differ between the line printed with black ink and the protruding line formed by irradiating and expanding the line printed with black ink; this would also lead variations in quality. In Embodiment 4, the line width of the post-expansion protruding line is received, and the line width of the two-dimensional line for forming this protruding line is calculated on the basis of the received line width. This makes it possible to form the protruding line with the desired line width.

The configuration and operation of the present embodiment will be described with reference to FIGS. 31 to 35.

FIG. 31A to 31D are diagrams showing the results of the line allocation process of Embodiment 4. FIGS. 31A to 31D are partial enlarged views on the same scale.

Figure 31A:
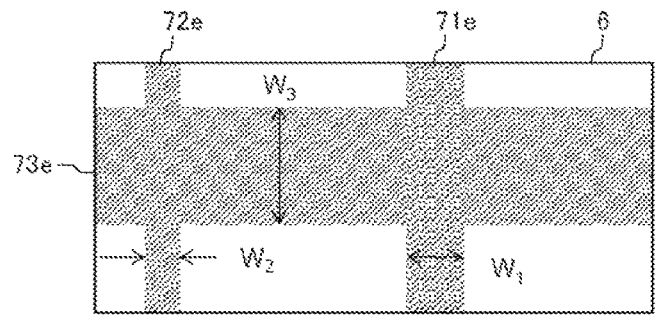
FIG. 31A illustrates width information and height information of protruding lines forming a three-dimensional image in Embodiment 4.

FIG. 31A shows post-expansion width information and height information of the protruding lines forming a three-dimensional image. FIG. 31A shows the design information of the three-dimensional image. This design information of the three-dimensional image is stored in the storage unit 31 of the computer 3, for example, and displayed on the touch panel display 2.

As shown in FIG. 31A, protruding thin lines 71e and 72e are drawn vertically on the thermally expandable sheet 6. The line width of the protruding thin line 71e is $W_1$. The line width of the protruding thin line 72e is $W_2$. A protruding thick line 73e is drawn horizontally, and intersects the protruding thin lines 71e and 72. The line width of the protruding thick line 73e is $W_3$.

In FIG. 31A, the height information of the protruding lines is represented using hatching. An expansion height of 0 is represented when there is no hatching and the color is white. The denser the hatching, the higher the region is. The protruding thin lines 71e and 72e and the protruding thick line 73e are displayed using the same hatching, and this indicates that the protruding thin lines 71 and 72 and the protruding thick line 73 have the same expansion height.

Figure 31B:
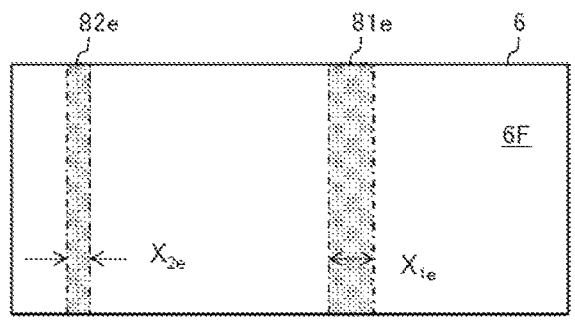
FIG. 31B illustrates a density image on a front surface of a thermally expandable sheet for forming a three-dimensional image.

FIG. 31B illustrates a density image that is for forming a three-dimensional image on the front surface 6F of the thermally expandable sheet 6.

A line 81e that corresponds to the protruding thin line 71e before expansion and a line 82e that corresponds to the protruding thin line 72e before expansion are drawn vertically on the front surface 6F of the thermally expandable sheet 6. The line width of the line 81e is $X_{1e}$ and is slightly narrower than the line width $W_1$ of the protruding thin line 71e. The line width of the line 82e is $X_{2e}$ and is slightly narrower than the line width $W_2$ of the protruding thin line 72e. The lines 81e and 82e are printed at a prescribed density using black ink, and when irradiated with light, the lines 81e and 82e convert the light into heat in accordance with the density. Thus, the regions of the lines 81e and 82e expand and form protruding lines. The lines 81e and 82e are lines for causing the protruding thin lines 91e and 92e shown in FIG. 31D to be formed.

In addition, although an image is also formed using color ink on the front surface 6F of the thermally expandable sheet 6, illustration of such an image is omitted here. When irradiated with light, a smaller amount of heat is converted from the light in the region printed using color ink compared with the region printed using black ink, and therefore the thermally expandable sheet 6 does not expand in the region printed using color ink.

Figure 31C:
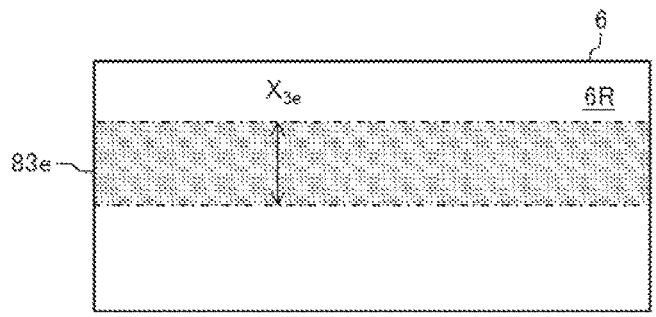
FIG. 31C illustrates a density image on a rear surface of a thermally expandable sheet for forming a three-dimensional image.

FIG. 31C illustrates a density image that is for forming a three-dimensional image on the rear surface 6R of the thermally expandable sheet 6.

A line 83e that corresponds to the protruding thick line 73e before expansion is drawn horizontally on the rear surface 6R of the thermally expandable sheet 6. The line width of the line 83e is $X_{3e}$ and is slightly narrower than the line width $W_3$ of the protruding thick line 73e. The line 83e is printed at a prescribed density using black ink, and when irradiated with light, the line 83e converts the light into heat in accordance with the density. Thus, a region of the front surface corresponding to the region of the line 83e expands and forms a protruding line. The line 83e is a line for causing the protruding thick line 93e in FIG. 31D to be formed.

Figure 31D:
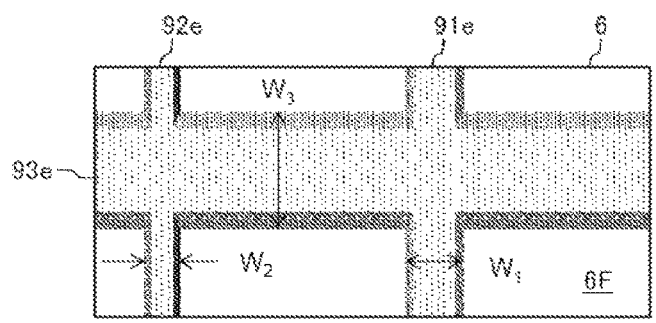
FIG. 31D illustrates a three-dimensional image formed by irradiating a front surface and rear surface of a thermally expandable sheet with light.

FIG. 31D illustrates a three-dimensional image formed by irradiating the front surface 6F and the rear surface 6R of the thermally expandable sheet 6 with light. Here, a shadow cast by the three-dimensional image is illustrated with hatching.

Protruding thin lines 91e and 92e are formed in a vertical direction on the front surface 6F of the thermally expandable sheet 6, and a protruding thick line 93e is additionally formed in a horizontal direction on the front surface 6F of the thermally expandable sheet 6. The protruding thin lines 91e and 92e are expanded protruding lines formed by irradiating the lines 81e and 82e printed on the front surface 6F (refer to FIG. 31B) with light. The line width of the protruding thin line 91e after expansion is $W_1$. The line width of the protruding thin line 92e after expansion is $W_2$. The protruding thick line 93e is an expanded protruding line formed by irradiating the line 83e printed on the rear surface 6R (refer to FIG. 31C) with light, and the line width of the protruding thick line 93e is $W_3$.

The line width $W_1$ of the protruding thin line 91e is approximately equal to the line width $W_1$ of the protruding thin line 71e, which is the design information for the protruding thin line 91e. The line width $W_2$ of the protruding thin line 92e is approximately equal to the line width $W_2$ of the protruding thin line 72e, which is the design information for the protruding thin line 92e. The line width $W_3$ of the protruding thick line 93e is approximately equal to the line width $W_3$ of the protruding thick line 73e, which is the design information for the protruding thick line 93e. In other words, the design information illustrated in FIG. 31A is realized as a three-dimensional image.

Figure 32:
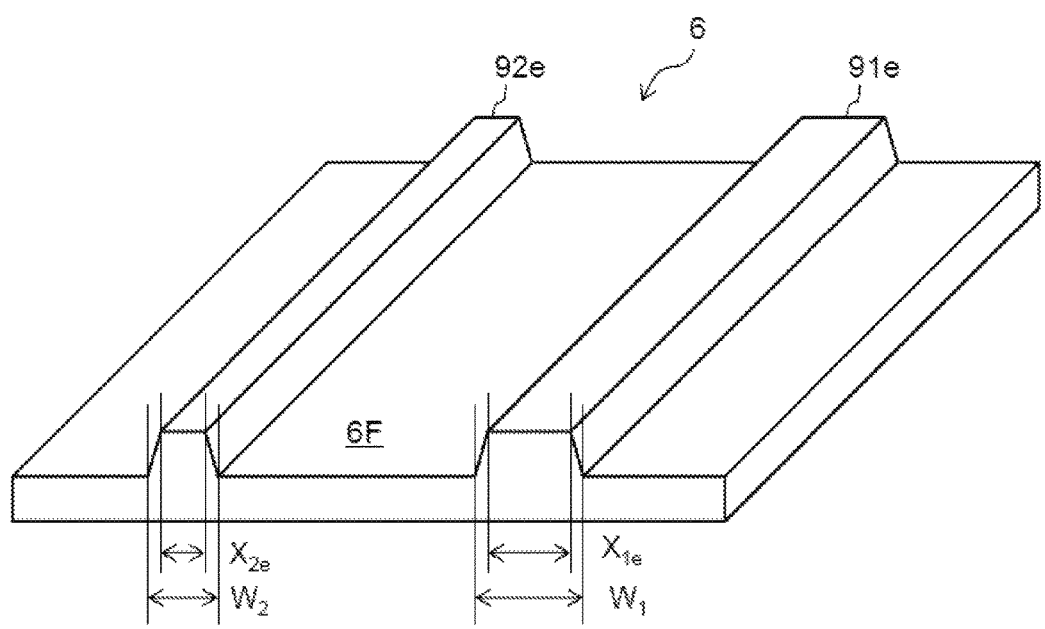
FIG. 32 is a perspective view of a three-dimensional image formed by irradiating a front surface of a thermally expandable sheet with light.

FIG. 32 is a perspective view of the three-dimensional image formed by irradiating the front surface 6F of the thermally expandable sheet 6 with light.

The protruding thin lines 91e and 92e are formed in a vertical direction on the front surface 6F of the thermally expandable sheet 6. The protruding thin lines 91e and 92e are formed by irradiating the lines 81e and 82e printed on the front surface 6F (refer to FIG. 31B) with light. The line width of the protruding thin line 91e is $W_1$ and is slightly greater than the line width $X_{1e}$ of the line 81e. This is because the heat generated at the line 81e by the light irradiation is transmitted to the area surrounding the line, thus causing the thermally expandable sheet 6 to expand. Similarly, the line width of the protruding thin line 92e is $W_2$ and is slightly wider than the line width $X_{2e}$ of the line 82e. The top surface of the line 81e and the protruding thin line 91e are schematically shown as being the same, and the top surface of the line 8e2 and the protruding thin line 92e are schematically shown as being the same.

Figure 33:
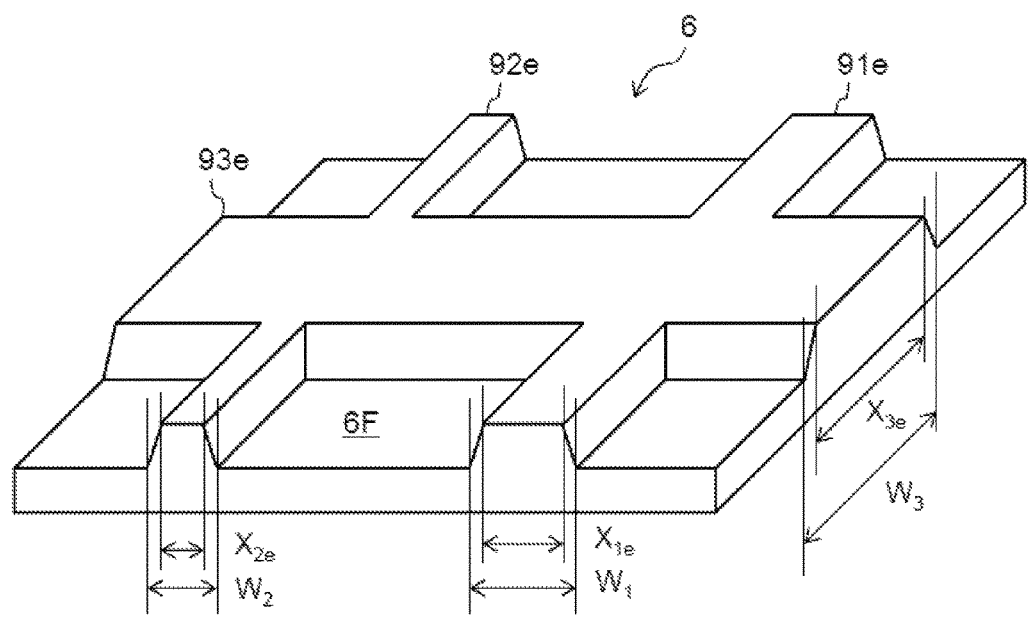
FIG. 33 is a perspective view of a three-dimensional image formed by irradiating a rear surface of a thermally expandable sheet with light after the front surface is irradiated.

FIG. 33 is a perspective view of the three-dimensional image formed by irradiating the rear surface 6R of the thermally expandable sheet 6 with light after the front surface 6F has been irradiated. In FIG. 33, the three-dimensional image illustrated in FIG. 31D is seen from a diagonal direction.

Protruding thin lines 91e and 92e are formed in a vertical direction on the front surface 6F of the thermally expandable sheet 6, and a protruding thick line 93e is additionally formed in a horizontal direction on the front surface 6F of the thermally expandable sheet 6. The line width of the protruding thick line 93e is $W_3$. The protruding thin lines 91e and 92e are formed by irradiating the lines 81e and 82e printed on the front surface 6F (refer to FIG. 31B) with light. The protruding thick line 93e is formed by irradiating the line 83e printed on the rear surface 6R (refer to FIG. 31C) with light. The line width $W_3$ of the protruding thick line 93e is slightly wider than the line width $X_{3e}$ of the line 83e. This is because the heat generated at the line 83e by the light irradiation is transmitted to the area surrounding the line, thus causing the thermally expandable sheet 6 to expand. The top surface of the protruding thick line 93e is schematically illustrated as having plane symmetry with the line 83e.

FIG. 34 is a diagram for explaining the structure of the expansion height database 311A.

The expansion height database 311A includes a height column, a post-expansion line width column, a pre-expansion line width column, a drawing surface column, and a black ink density column.

The height column is a column that stores expansion height information of the protruding lines. The post-expansion line width column is a column that stores line width (thickness) information of the protruding lines. The pre-expansion line width column is a column that stores line width (thickness) information of the two-dimensional lines printed in black ink for forming the protruding lines. The drawing surface column is a column that stores whether the lines are to be drawn on the front surface 6F or the rear surface 6R of the thermally expandable sheet 6. The black ink density column is a column that stores the densities of black ink required when the protruding lines listed in the height column and the line width column are formed on the surfaces listed in the drawing surface column.

The protruding lines that form a three-dimensional image are preferably formed in accordance with the three-dimensional image design information. Accordingly, in the present embodiment, in regard to the black ink densities and pre-expansion line widths, which affect the expansion heights and post-expansion line widths of the lines, the expansion heights and pre-expansion line widths are measured in experiments and stored in a database in advance. In the experiments, lines of various thicknesses and densities are drawn on the front side and the rear side of the thermally expandable sheet 6, and then the front side and the rear side of the thermally expandable sheet 6 are irradiated with light and the expansion heights of the lines are measured. Thus, the expansion height database 311A illustrated in FIG. 34 can be created.

A desired three-dimensional image can be formed by referring to the expansion height database 311A and generating a density image for the front surface and a density image for the rear surface.

Figure 35:
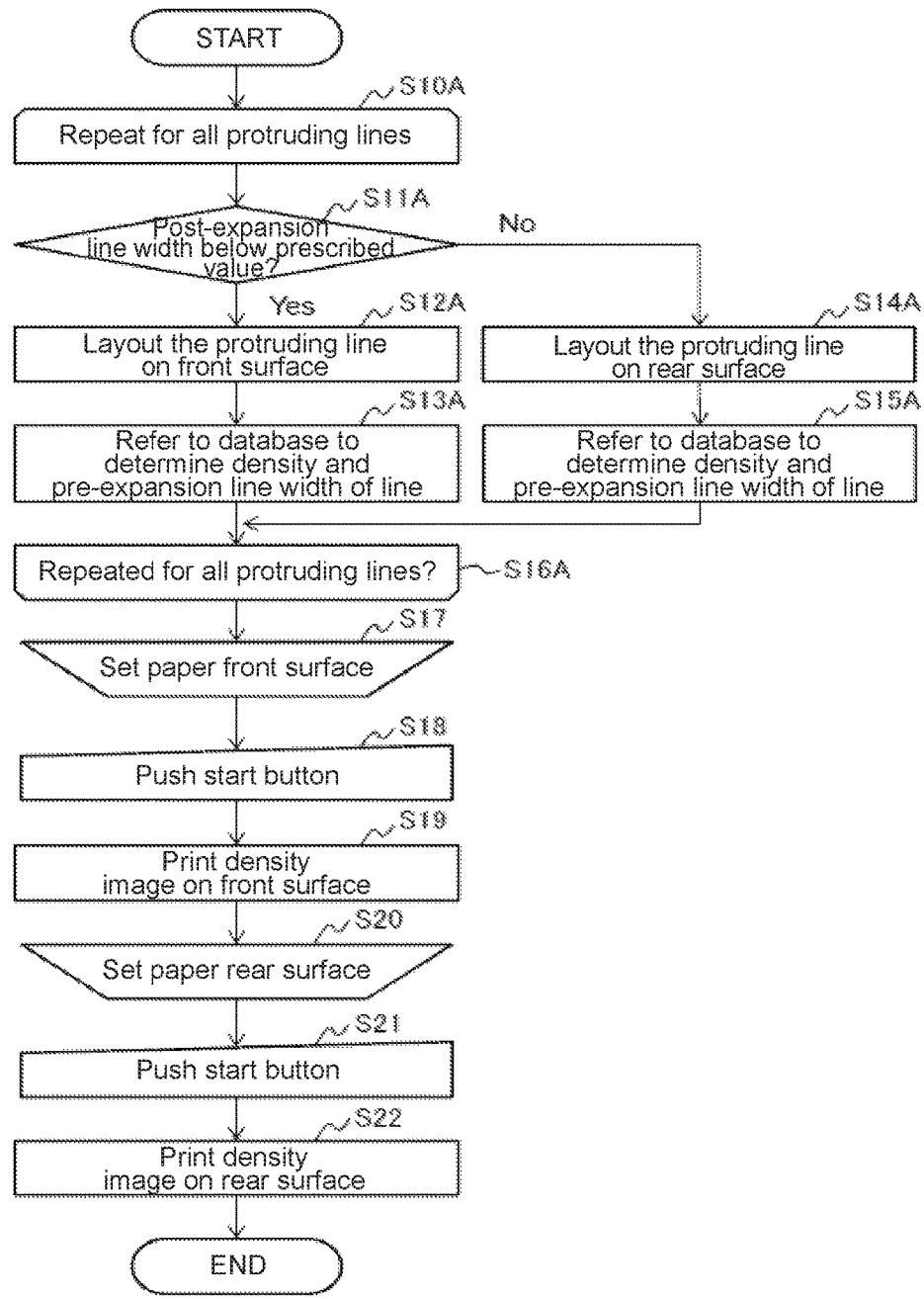
FIG. 35 is a flowchart for explaining line allocation processing.

FIG. 35 is a flowchart for explaining line allocation processing.

The allocation processing is processing executed by the density allocating unit 32 (refer to FIG. 1) upon receiving the three-dimensional image design information.

The three-dimensional image design information is input in advance by the tactile map operator. The term "three-dimensional image design information" refers to data concerning the thicknesses (line widths) and expansion heights of the protruding lines that form the three-dimensional image, for example. In the case of a tactile map, the widths of paths correspond to the thicknesses of protruding lines. The expansion heights of the protruding lines are decided upon by the tactile map operator.

Upon receiving the three-dimensional image design information, the density allocating unit 32 repeats the processing of steps S10A to S16A for all the protruding lines included in the three-dimensional image design information.

In step S11A, the density allocating unit 32 determines whether the post-expansion line width of the line undergoing determination is less than a prescribed value. The "line undergoing determination" refers to the protruding line formed by the expansion of the thermally expanding sheet 6. The "line width" refers to line width of the post-expansion protruding line.

If the line width of a line undergoing determination is less than a prescribed value (step S11A→Yes), the density allocating unit 32 lays out the line for forming the protruding line on the front surface 6F (step S12A) and determines the density and pre-expansion line width of the line by referring to the expansion height database 311A (step S13A). When determining the density of the line, the density allocating unit 32 searches the expansion height database 311A and extracts an entry that matches the line width and the height of the protruding line formed by the line. In addition, if a plurality of entries are found when searching the expansion height database 311A, the density allocating unit 32 preferably uses the entry having the smallest density in order to save ink. Thereafter, the density allocating unit 32 proceeds to the process of step S16A.

If the line width of the protruding line is equal to or higher than the prescribed value (step S11A→No), the density allocating unit 32 lays out the line for forming the protruding line on the rear surface 6R (step S14A) and determines the density and pre-expansion line width of the line by referring to the expansion height database 311A (step S15A). Thereafter, the density allocating unit 32 proceeds to the process of step S16A.

In other words, the density allocating unit 32 executes a procedure for allocating the lines for forming the protruding lines so that the lines are formed on the front surface of the thermally expandable sheet or are formed on the rear surface of the thermally expandable sheet in accordance with the line widths of the protruding lines forming the three-dimensional image.

In step S16A, the density allocating unit 32 determines whether the layouts of all lines included in the design information have been processed. Once all the protruding lines included in the design information have been laid out (step S16A), the density allocating unit 32 advances to the processing of step S17.

In step S17, the tactile map operator sets the thermally expandable sheet 6 (sheet) in the printer 4 in order to perform printing on the front surface 6F side of the thermally expandable sheet 6. In addition, the tactile map operator presses (taps) a start button on a guidance screen, which is not illustrated, displayed on the touch panel display 2 (step S18). Thus, the computer 3 prints a density image on the front surface 6F of the thermally expandable sheet 6 using the printer 4 (step S19).

In addition, the tactile map operator sets the thermally expandable sheet 6 in the printer 4 in order to perform printing on the rear surface 6R side of the thermally expandable sheet 6 (step S20). The tactile map operator presses (taps) the start button on the guidance screen, which is not illustrated, displayed on the touch panel display 2 (step S21). Thus, the computer 3 prints a density image on the rear surface 6R of the thermally expandable sheet 6 using the printer 4 (step S22).

Hereafter, the tactile map (one example of a three-dimensional image) is formed by performing the light irradiating process shown in FIG. 7.

<Effect of Embodiment 4>

The computer 3 allocates ink densities corresponding to lines for forming the protruding lines to a front side and a rear side in accordance with the post-expansion line widths of the protruding lines included in the design information. Therefore, a density image (photothermal conversion image) that is able to stably form a desired three-dimensional image can be generated without relying on manual work. Thus, the complexity of producing a three-dimensional image is reduced. In addition, since variations that occur due to the individual operator are eliminated, the quality of three-dimensional images is stabilized.

Moreover, the computer 3 receives the post-expansion line widths of the protruding lines and determines the line widths of the lines for forming the protruding lines. This makes it possible to form desired protruding lines and to have more uniform three-dimensional image quality even if the operator of the tactile map has no knowledge of the relationship between the two-dimensional lines formed by ink and the protruding lines formed by these lines.

<Embodiment 5>

In Embodiment 4, when thin lines for forming protruding lines included in the three-dimensional image design information are allocated to the front side of a sheet and thick lines included in the three-dimensional image design information are allocated to the rear side of the sheet, the thin lines on the front surface foam and expand when the front side of the sheet is irradiated with light and the thick lines on the rear surface foam and expand when the rear side of the sheet is irradiated with light. Consequently, an intersection between a thin line and a thick line foams and expands twice due to the front side of the sheet being irradiated with light and the rear side of the sheet being irradiated with light. Therefore, a problem occurs in that the intersections between thin lines and thick lines are too high.

Accordingly, in Embodiment 5, the density of an intersection part of a thin line allocated to the front surface and the density of an intersection part of a thick line allocated to the rear surface are adjusted by preparing a database relating to the expansion height of the intersections. In addition, it is assumed in Embodiment 5 that the protruding lines and the intersections have the same expansion height.

Embodiment 5 includes a similar configuration to the three-dimensional image forming system 1A shown in FIG. 11.

FIG. 36A to 36D are diagrams showing the results of the line allocation process of Embodiment 5. FIGS. 36A to 36D are partial enlarged views on the same scale.

Figure 36A:
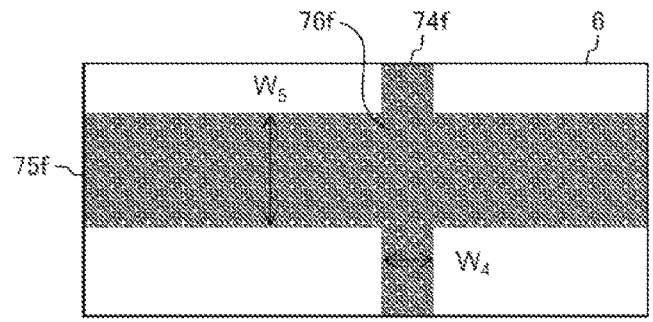
FIG. 36A illustrates width information and height information of protruding lines forming a three-dimensional image in Embodiment 5.

FIG. 36A shows post-expansion width information and height information of the protruding lines forming a three-dimensional image. FIG. 36A shows the design information of the three-dimensional image.

As shown in FIG. 36A, a protruding thin line 74f is drawn vertically on the thermally expandable sheet 6. The line width of the protruding thin line 74f is $W_4$. A protruding thick line 75f is drawn horizontally, and intersects the protruding thin line 74f at the protruding intersection 76f. The line width of the protruding thick line 75f is $W_5$.

In FIG. 36A, the height information of the protruding lines is represented using hatching. An expansion height of 0 is represented when there is no hatching and the color is white. The denser the hatching, the higher the region is. The protruding thin line 74f, protruding thick line 75f, and protruding intersection 76f are displayed using the same hatching, and this indicates that the protruding thin lines 74f, protruding thick line 75f, and protruding intersection 76f have the same expansion height.

Figure 36B:
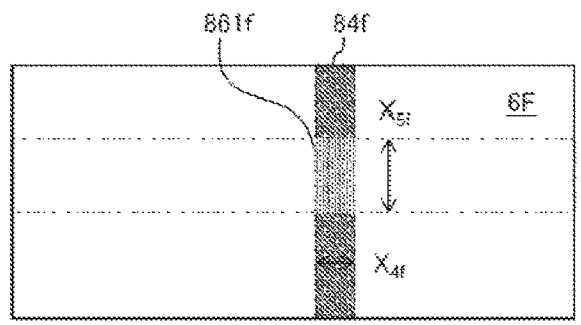
FIG. 36B illustrates a density image on a front surface of a thermally expandable sheet for forming a three-dimensional image.

FIG. 36B illustrates a density image that is for forming a three-dimensional image on the front surface 6F of the thermally expandable sheet 6.

A line 84f that corresponds to the protruding thin line 74f before expansion is drawn vertically on the front surface 6F of the thermally expandable sheet 6. The line width of the line 84f is $X_{4f}$ and is slightly less than the line width $W_4$ of the protruding thin line 74f. The line 84f is printed at a prescribed density using black ink, and when irradiated with light, the line 84f converts the light into heat in accordance with the density. The line 84f is a line for causing the protruding thin line 94f in FIG. 36 to be formed.

Figure 36C:
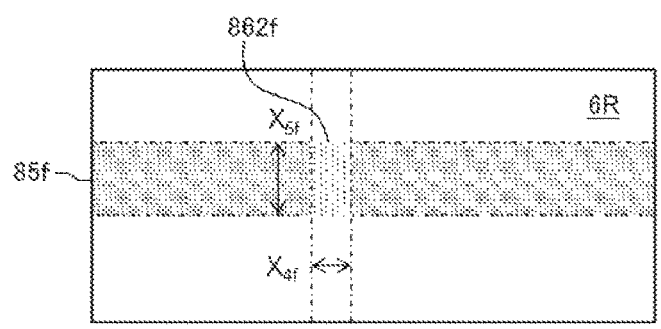
FIG. 36C illustrates a density image on a rear surface of a thermally expandable sheet for forming a three-dimensional image.
Figure 36D:
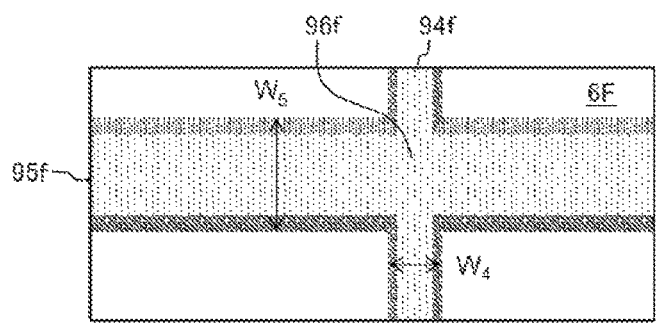
FIG. 36D illustrates a three-dimensional image formed by irradiating a front surface and rear surface of a thermally expandable sheet with light.

As shown in FIG. 36D, an intersection 861f that corresponds to the protruding intersection 76f has a lower density than the parts of the line 84f outside the intersection 861f. Therefore, a smaller amount of heat is generated in the region of the intersection 861f with irradiation of light than in the regions of the line 84f outside the intersection 861f.

In addition, although an image is also formed using color ink on the front surface 6F of the thermally expandable sheet 6, illustration of such an image is omitted here.

FIG. 36C illustrates a density image that is for forming a three-dimensional image on the rear surface 6R of the thermally expandable sheet 6.

A line 85f that corresponds to the protruding thick line 75f before expansion is drawn horizontally on the rear surface 6R of the thermally expandable sheet 6. The line width of the line 85f is $X_{5f}$ and is slightly less than the line width $W_5$ of the protruding thick line 75f. The line 85f is printed using black ink, and when irradiated with light, the line 85f converts the light into heat in accordance with the density of the ink. The line 85f is a line for causing the protruding thick line 95f in FIG. 36D to be formed.

As shown in FIG. 36D, an intersection 862f that corresponds to the protruding intersection 76f has a lower density than the parts of the line 85f outside the intersection 862f. Therefore, a smaller amount of heat is generated in the region of the intersection 862f with irradiation of light than in the regions of the line 85f outside the intersection 862f.

FIG. 36D illustrates a three-dimensional image formed by irradiating the front surface 6F and the rear surface 6R of the thermally expandable sheet 6 with light.

A protruding thin line 94f is formed in a vertical direction on the front surface 6F of the thermally expandable sheet 6, and a protruding thick line 95f is additionally formed in a horizontal direction on the front surface 6F of the thermally expandable sheet 6. A protruding intersection 96f is formed in a part where the protruding thin line 94f and the protruding thick line 95f intersect each other.

The protruding thin line 94f is an expanded protruding line formed by irradiating the line 84f printed on the front surface 6F (refer to FIG. 36B) with light and has a line width of $W_4$. The protruding thick line 95f is an expanded protruding line formed by irradiating the line 85f printed on the rear surface 6R (refer to FIG. 36C) with light and has a line width of $W_5$. The protruding intersection 96f is formed by irradiating the intersection 861f printed on the front surface 6F (refer to FIG. 36B) and the intersection 862f printed on the rear surface 6R (refer to FIG. 36C) with light.

The line width $W_4$ of the protruding thin line 94f is approximately equal to the line width $W_4$ of the protruding thin line 74f, which is the design information for the protruding thin line 94f. The line width $W_5$ of the protruding thick line 95f is approximately equal to the line width $X_5$ of the protruding thick line 75f, which is the design information for the protruding thick line 95f. In other words, the design information illustrated in FIG. 36A is realized as a three-dimensional image.

Figure 37:
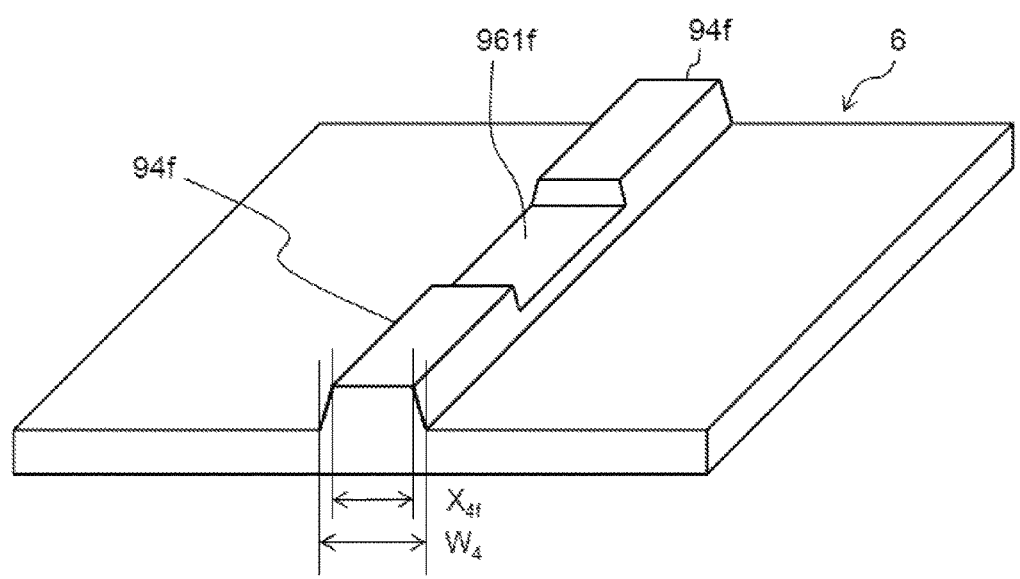
FIG. 37 is a perspective view of a three-dimensional image formed by irradiating a front surface of a thermally expandable sheet with light.

FIG. 37 is a perspective view of the three-dimensional image formed by irradiating the front surface 6F of the thermally expandable sheet 6 with light.

The protruding thin line 94f is formed with a prescribed height on the front surface 6F of the thermally expandable sheet 6 in the vertical direction and has a line width of $W_4$. In addition, a protruding intersection 961 is formed so as to be lower than the protruding thin line 94f. The protruding thin line 94f is formed by irradiating the line 84f printed on the front surface 6F (refer to FIG. 36B) with light. The line width $W_4$ of the protruding thin line 94f is slightly wider than the line width $X_{4f}$ of the line 84f. This is because the heat generated at the line 84f by the light irradiation is transmitted to the area surrounding the line, thus causing the thermally expandable sheet 6 to expand. The top surface of the line 84f and the protruding thin line 94f are schematically shown as being the same.

The protruding intersection 961f is formed by irradiating the intersection 861f (refer to FIG. 36B) with light.

Figure 38:
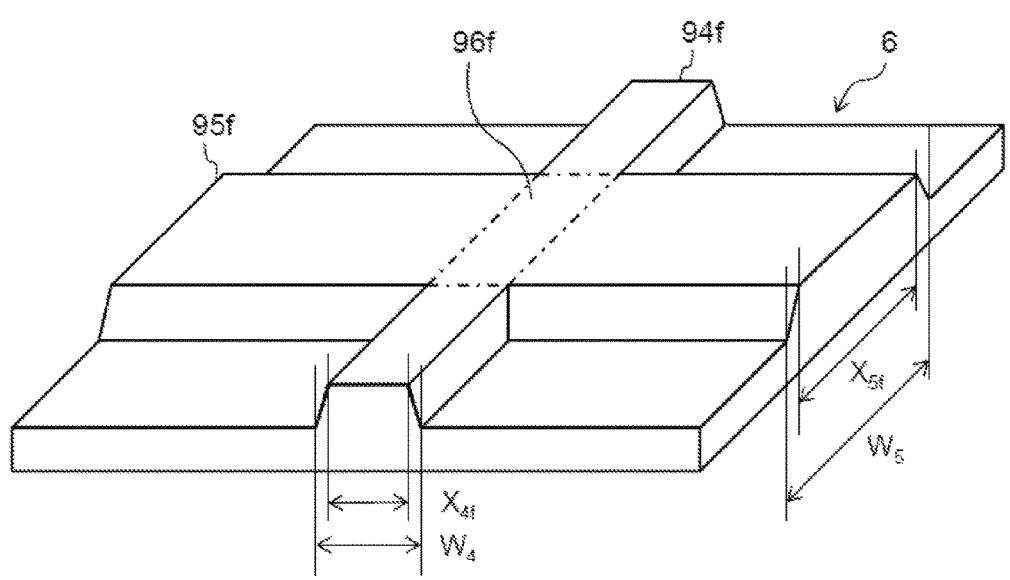
FIG. 38 is a perspective view of a three-dimensional image formed by irradiating a rear surface of a thermally expandable sheet with light after the front surface is irradiated.

FIG. 38 is a perspective view of the three-dimensional image formed by irradiating the rear surface 6R of the thermally expandable sheet 6 with light after the front surface 6F has been irradiated. In FIG. 38, the three-dimensional image illustrated in FIG. 36D is seen from a diagonal direction.

A protruding thin line 94*f* is formed in a vertical direction on the front surface 6F of the thermally expandable sheet 6, and a protruding thick line 95*f* is additionally formed in a horizontal direction on the front surface 6F of the thermally expandable sheet 6. The line width of the protruding thick line 95*f* is $W_5$.

The protruding thin line 94*f* is formed by irradiating the line 84*f* printed on the front surface 6F (refer to FIG. 36B) with light. The protruding thick line 95*f* is formed by irradiating the line 85*f* printed on the rear surface 6R (refer to FIG. 36C) with light. The line width $W_5$ of the protruding thick line 95*f* is slightly wider than the line width $X_{5f}$ of the line 85*f*. The top surface of the protruding thick line 95*f* is schematically illustrated as having plane symmetry with the line 85*f*.

The protruding intersection 96*f* is formed by irradiating the intersection 861*f* printed on the front surface 6F (refer to FIG. 36B) and the intersection 862*f* printed on the rear surface 6R (refer to FIG. 36C) with light.

FIG. 39 is a diagram for explaining the structure of an intersection expansion height database 312B.

The intersection expansion height database 312B includes a front surface pre-expansion line width column, a rear surface pre-expansion line width column, a height of intersection with line column, a front surface black ink density column, and a rear surface black ink density column.

The front surface pre-expansion line width column is a column that stores line width information of thin lines that form intersections. The rear surface pre-expansion line width column is a column in which line width information of the pre-expansion line widths of thick lines that form intersections is stored. The height of intersection with line column is a column that stores design height information of the lines and intersections. In addition, it is assumed in Embodiment 5 that the lines and the intersections have the same expansion height.

The front surface black ink density column is a column that stores information regarding the ink density of the intersections on the front surface. The rear surface black ink density column is a column that stores information regarding the ink density of the intersections on the rear surface.

Regarding the ratios at which the densities of the intersections are allocated, the intersection expansion height database 312B can be created by experimentally measuring the expansion heights in the intersection regions with respect to the pre-expansion line widths on the front surface, the pre-expansion line widths on the rear surface, the front surface density, and the rear surface density.

The densities of the intersections are automatically allocated to the front side or the rear side and reduced by referring to the intersection expansion height database 312B. In this way it is possible to prevent a phenomenon in which an intersection becomes high and exceeds the design value.

Figure 40:
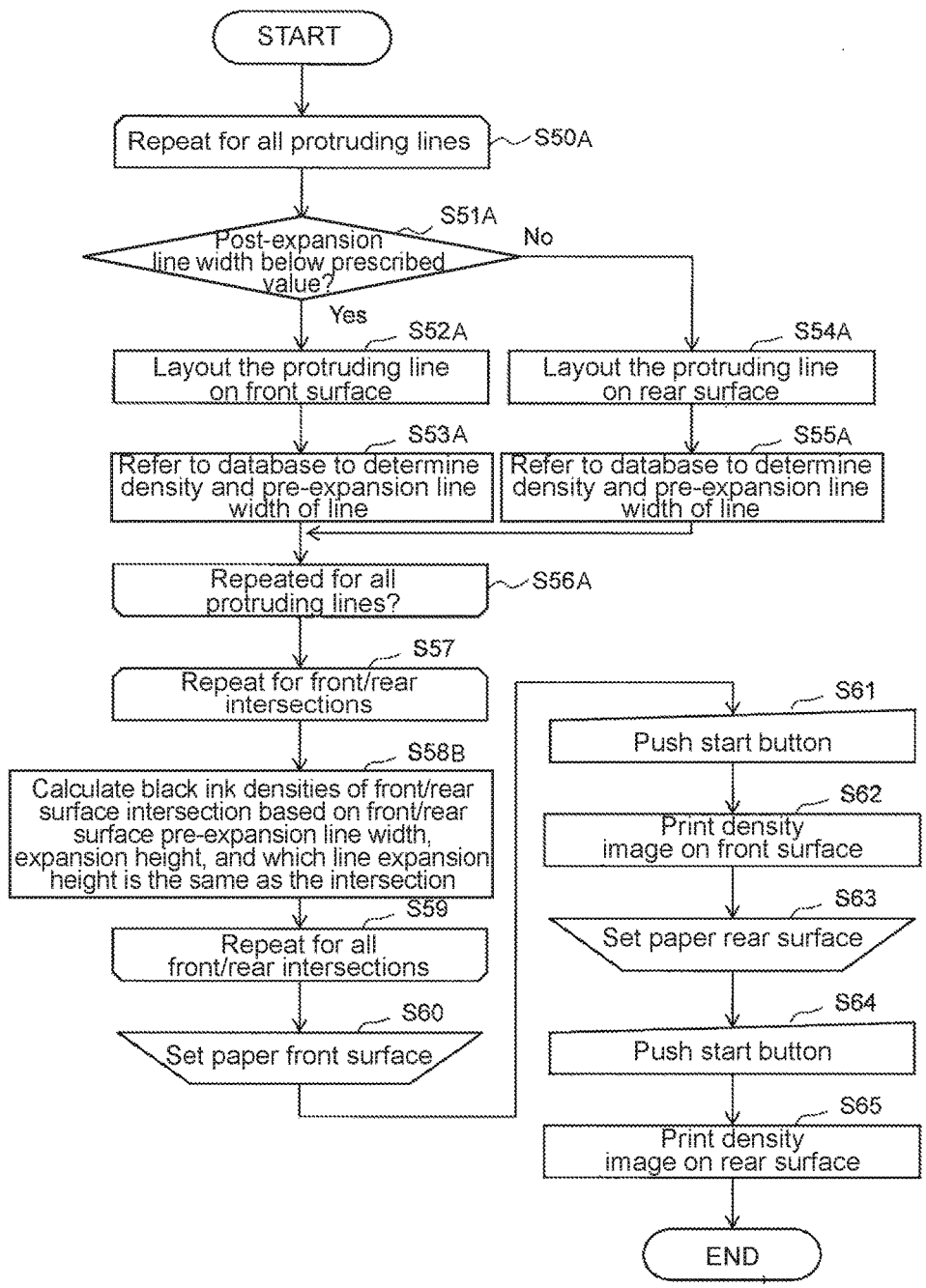
FIG. 40 is a flowchart for explaining line allocation processing.

FIG. 40 is a flowchart for explaining line allocation processing.

The allocation processing is processing executed by the density allocating unit 32 (refer to FIG. 11) upon receiving the three-dimensional image design information.

The three-dimensional image design information is input in advance by the tactile map operator. The term "three-dimensional image design information" refers to data concerning the thicknesses (line widths) and expansion heights of the protruding lines that form the three-dimensional image, for example. In the case of a tactile map, the widths of paths correspond to the thicknesses of protruding lines. The expansion heights of the protruding lines are decided upon by the tactile map operator.

Upon receiving the three-dimensional image design information, the density allocating unit 32 repeats the processing of steps S50A to S56A for all the protruding lines included in the three-dimensional image design information.

In step S51A, the density allocating unit 32 determines whether the post-expansion line width of the protruding line undergoing determination is less than a prescribed value. The "protruding line undergoing determination" refers to the protruding line formed by the expansion of the thermally expanding sheet 6. The "line width" refers to line width of the post-expansion protruding line.

If the line width of the protruding line undergoing determination is less than a prescribed value (step S51A→Yes), the density allocating unit 32 lays out the line for forming the protruding line on the front surface 6F (step S52A) and determines the density and pre-expansion line width of the line by referring to the expansion height database 311A (step S53A). When determining the density of the line, the density allocating unit 32 searches the expansion height database 311A and extracts an entry that matches the post-expansion line width and the expansion height of the protruding line formed by the line. In addition, if a plurality of entries are found when searching the expansion height database 311A, the density allocating unit 32 preferably uses the entry having the smallest density in order to save ink. Thereafter, the density allocating unit 32 proceeds to the process of step S56A.

If the line width of the protruding line is equal to or higher than the prescribed value (step S11A→No), the density allocating unit 32 lays out the line for forming the protruding line on the rear surface 6R (step S54A) and determines the density and pre-expansion line width of the line by referring to the expansion height database 311A (step S55A). Thereafter, the density allocating unit 32 proceeds to the process of step S56A.

In step S56A, the density allocating unit 32 determines whether the layouts of all protruding lines included in the design information have been processed. Once all the protruding lines included in the design information have been laid out, the density allocating unit 32 proceeds to the intersection allocation process of steps S57 to S59.

In step S57, the density allocating unit 32 specifies a line on the front surface and a line on the rear surface that form an intersection that is to undergo determination and repeats this process for all intersections of lines on the front surface and lines on the rear surface. The density allocating unit 32 searches the intersection expansion height database 312B for the pre-expansion line width on the front surface and the rear surface and the expansion height of the line and the intersection. Once the corresponding entry has been found through the search, the density allocating unit 32 calculates the front surface density and the rear surface density for the intersection (step S58B). In the case where a plurality of entries are found in the intersection expansion height database 312B, the density allocating unit 32 uses the entry having the smallest density in order to save ink. The front surface black ink density and the rear surface black ink density for the intersection are determined by the processing of step S58B.

In other words, for each intersection between the protruding lines that form a three-dimensional image, the density allocating unit 32 divides the density of the intersection between a front-surface-side density image and a rear-surface-side density image in accordance with the pre-expansion line widths and expansion heights of the lines that form the intersection and in accordance with the expansion height of the intersection. The division ratios are listed in an intersection expansion height database 312B.

Once allocation has been performed for all the intersections included in the design information (step S59), the density allocating unit 32 advances to the processing of step S60.

In step S60, the tactile map operator sets the thermally expandable sheet 6 in the printer 4 in order to perform printing on the front surface 6F side of the thermally expandable sheet 6. In addition, the tactile map operator presses (taps) a start button on a guidance screen, which is not illustrated, displayed on the touch panel display 2 (step S61). Thus, the computer 3 prints a density image on the front surface 6F of the thermally expandable sheet 6 using the printer 4 (step S62).

In addition, the tactile map operator sets the thermally expandable sheet 6 in the printer 4 in order to perform printing on the rear surface 6R side of the thermally expandable sheet 6 (step S63). The tactile map operator presses (taps) the start button on the guidance screen, which is not illustrated, displayed on the touch panel display 2 (step S64). Thus, the computer 3 prints a density image on the front surface 6F of the thermally expandable sheet 6 using the printer 4 (step S65), and line allocation processing ends.

Hereafter, the tactile map (one example of a three-dimensional image) is formed by performing the light irradiating process shown in FIG. 7.

<Effect of Embodiment 5>

An intersection between a line allocated to the front surface 6F of the thermally expandable sheet 6 and a line allocated to the rear surface 6R of the thermally expandable sheet 6 can be prevented from becoming too high. The intersection is an intersection between a highway and an ordinary path on a tactile map, for example.

Moreover, the computer 3 receives the post-expansion line widths of the protruding lines and determines the line widths of the lines for forming the protruding lines. This makes it possible to form desired protruding lines and to have more uniform three-dimensional image quality even if the operator of the tactile map has no knowledge of the relationship between the two-dimensional lines formed by ink and the protruding lines formed by these lines.

<Embodiment 6>

In Embodiment 5, the density of an intersection part of a thin line on the front surface and the density of an intersection part of a thick line on the rear surface are adjusted by preparing a database relating to the expansion heights of intersections, and it is assumed that the lines and the intersections have the same expansion heights.

However, a case where the expansion height of a thin line on the front surface and the expansion height of a thick line on the rear surface are different can be considered. The case where the expansion height of an intersection is the same as the expansion height of a thin line, the case where the expansion height of the intersection is the same as the expansion height of a thick line, and the case where the expansion height of the intersection is different from both the expansion height of a thin line and the expansion height of a thick line can also be considered.

In Embodiment 6, the expansion height of a protruding intersection is the same as the expansion height of a protruding thin line or a protruding thick line.

In the case where a protruding thin line is formed with priority over a protruding thick line, the expansion height of the protruding intersection is the same as the expansion height of the protruding thin line. This point will be explained while referring to FIGS. 41 to 46.

Conversely, in the case where a protruding thick line is formed with priority over a protruding thin line, the expansion height of the protruding intersection is the same as the expansion height of the protruding thick line. This point will be explained while referring to FIGS. 47 to 52.

FIGS. 41A to 41D illustrate the results of line allocation processing in the case where a thin line is lower than a thick line, and the expansion height of an intersection and the expansion height of a thin line are equal to each other. FIGS. 41A to 41D are partial enlarged views on the same scale.

Figure 41A:
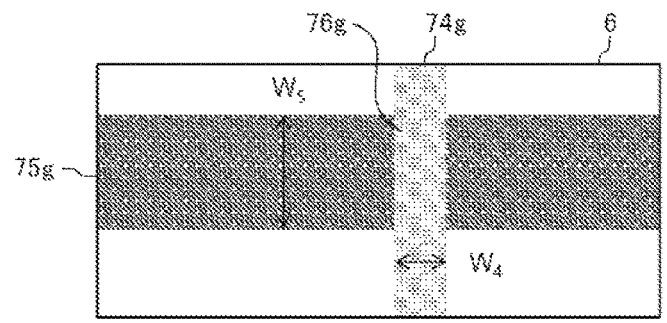
FIG. 41A illustrates width information and height information of protruding lines forming a three-dimensional image in the case where a thin line is lower than a thick line, and the expansion height of an intersection and the expansion height of a thin line are equal to each other.

FIG. 41A shows post-expansion width information and height information of the protruding lines forming a three-dimensional image. FIG. 41A shows the design information of the three-dimensional image.

As shown in FIG. 41A, a protruding thin line 74g is drawn vertically with priority on the thermally expandable sheet 6. The line width of the protruding thin line 74g is $W_4$. A protruding thick line 75g is drawn horizontally, and intersects the protruding thin line 74g at the protruding intersection 76g. The line width of the protruding thick line 75g is $W_5$.

In FIG. 41A, the height information of the protruding lines is represented using hatching. An expansion height of 0 is represented when there is no hatching and the color is white. The denser the hatching, the higher the region is. The protruding thin line 74g and the protruding intersection 76g are displayed using the same hatching, and this indicates that the protruding thin line 74g and the protruding intersection 76g have the same height. The regions of the protruding thick line 75g that are not included in the protruding intersection 76g are displayed using a darker hatching than the protruding intersection 76g, and this indicates that these regions are higher than the protruding thin line 74g and the protruding intersection 76g.

Figure 41B:
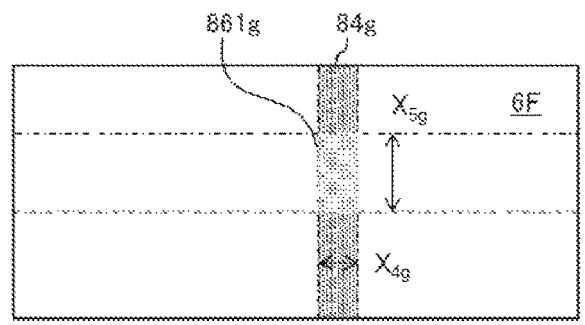
FIG. 41B illustrates a density image on a front surface of a thermally expandable sheet for forming a three-dimensional image.

FIG. 41B illustrates a density image that is for forming a three-dimensional image on the front surface 6F of the thermally expandable sheet 6.

A line 84g that corresponds to the protruding thin line 74g before expansion is drawn vertically on the front surface 6F of the thermally expandable sheet 6. The line width of the line 84g is $X_{4g}$ and is slightly narrower than the line width $W_4$ of the protruding thin line 74g. The line 84g is printed at a prescribed density using black ink, and when irradiated with light, the line 84g converts the light into heat in accordance with the density. The line 84g is a line for causing the protruding thin line 94g in FIG. 41D to be formed.

Figure 41C:
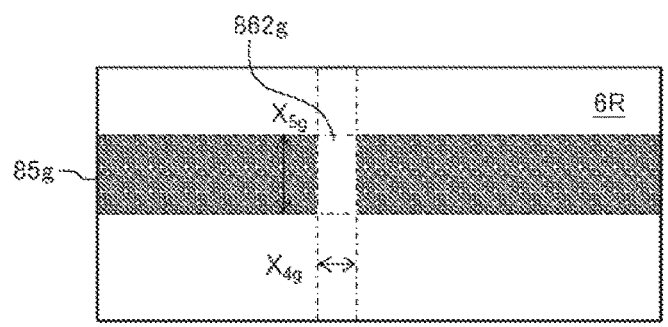
FIG. 41C illustrates a density image on a rear surface of a thermally expandable sheet for forming a three-dimensional image.
Figure 41D:
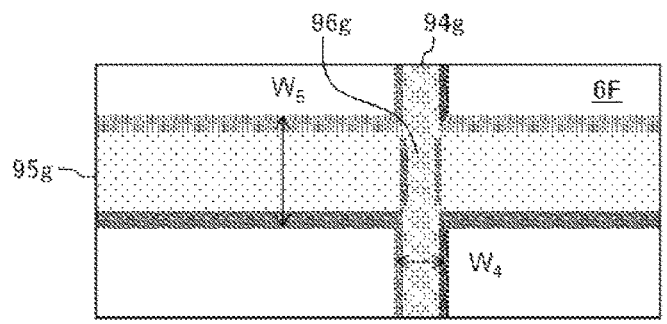
FIG. 41D illustrates a three-dimensional image formed by irradiating a front surface and rear surface of a thermally expandable sheet with light.

As shown in FIG. 41D, an intersection 861g that corresponds to the protruding intersection 76g has a lower density than the parts of the line 84g outside the intersection 861g. Therefore, a smaller amount of heat is generated in the region of the intersection 861g with irradiation of light than in the regions of the line 84g outside the intersection 861g.

In addition, although an image is also formed using color ink on the front surface 6F of the thermally expandable sheet 6, illustration of such an image is omitted here.

FIG. 41C illustrates a density image that is for forming a three-dimensional image on the rear surface 6R of the thermally expandable sheet 6.

A line 85g that corresponds to the protruding thick line 75g before expansion is drawn horizontally on the rear surface 6R of the thermally expandable sheet 6. The line width of the line 85g is $X_{5g}$ and is slightly narrower than the line width $W_5$ of the protruding thick line 75g. The line 85g is printed at a higher density than the line 84g using black ink, and when irradiated with light, the line 85g converts the light into heat in accordance with the density of the ink. The line 85g is a line for causing the protruding thick line 95g in FIG. 41D to be formed.

As shown in FIG. 41D, the region of an intersection 862g that corresponds to the protruding intersection 76g is not printed with black ink, and therefore remains white. Therefore, the amount of heat generated in the region of the intersection 862g with irradiation of light is very small.

FIG. 41D illustrates a three-dimensional image formed by irradiating the front surface 6F and the rear surface 6R of the thermally expandable sheet 6 with light.

A protruding thin line 94g of a prescribed height is formed with priority in a vertical direction on the front surface 6F of the thermally expandable sheet 6, and a protruding thick line 95g that is higher than the protruding thin line 94g is formed in a horizontal direction on the front surface 6F of the thermally expandable sheet 6. A protruding intersection 96g having the same expansion height as the protruding thin line 94g is formed in the part where the protruding thin line 94g and the protruding thick line 95g intersect.

The protruding thin line 94g is an expanded protruding line formed by irradiating the line 84g printed on the front surface 6F (refer to FIG. 41B) with light and has a line width of $W_4$. The protruding thick line 95g is an expanded protruding line formed by irradiating the line 85g printed on the rear surface 6R (refer to FIG. 41C) with light and has a line width of $W_5$. The protruding intersection 96g is formed by irradiating with light the intersection 861g printed on the front surface 6F (refer to FIG. 41B) and a part of the line 85g printed on the rear surface 6R that is in the vicinity of the intersection 862g (refer to FIG. 41C).

The line width $W_4$ of the protruding thin line 94g is approximately equal to the line width $W_4$ of the protruding thin line 74g, which is the design information for the protruding thin line 94g. The post-expansion line width $W_5$ of the protruding thick line 95g is approximately equal to the line width $W_5$ of the protruding thick line 75g, which is the design information for the protruding thick line 95g. In other words, the design information illustrated in FIG. 41A is realized as a three-dimensional image.

Figure 42:
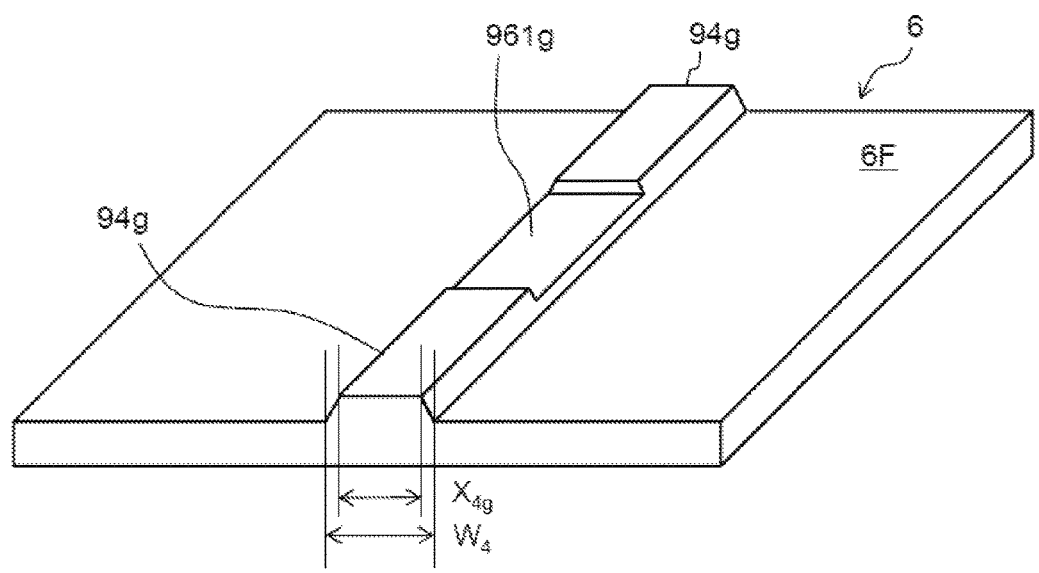
FIG. 42 is a perspective view of a three-dimensional image formed by irradiating a front surface of a thermally expandable sheet with light.

FIG. 42 is a perspective view of the three-dimensional image formed by irradiating the front surface 6F of the thermally expandable sheet 6 with light.

The protruding thin line 94g of line width $W_4$ is formed with a prescribed height on the front surface 6F of the thermally expandable sheet 6 in a vertical direction. In addition, a protruding intersection 961g is formed so as to be lower than the protruding thin line 94g. The protruding thin line 94g is formed by irradiating the line 84g printed on the front surface 6F (refer to FIG. 41B) with light. The line width $W_4$ of the protruding thin line 94g is approximately equal to and slightly wider than the line width $X_{4g}$ of the line 84g. This is because the heat generated at the line 84g by the light irradiation is transmitted to the area surrounding the line, thus causing the thermally expandable sheet 6 to expand. The top surface of the line 84g and the protruding thin line 94g are schematically shown as being the same.

The protruding intersection 961g is formed by irradiating the intersection 861g (refer to FIG. 41B) with light.

Figure 43:
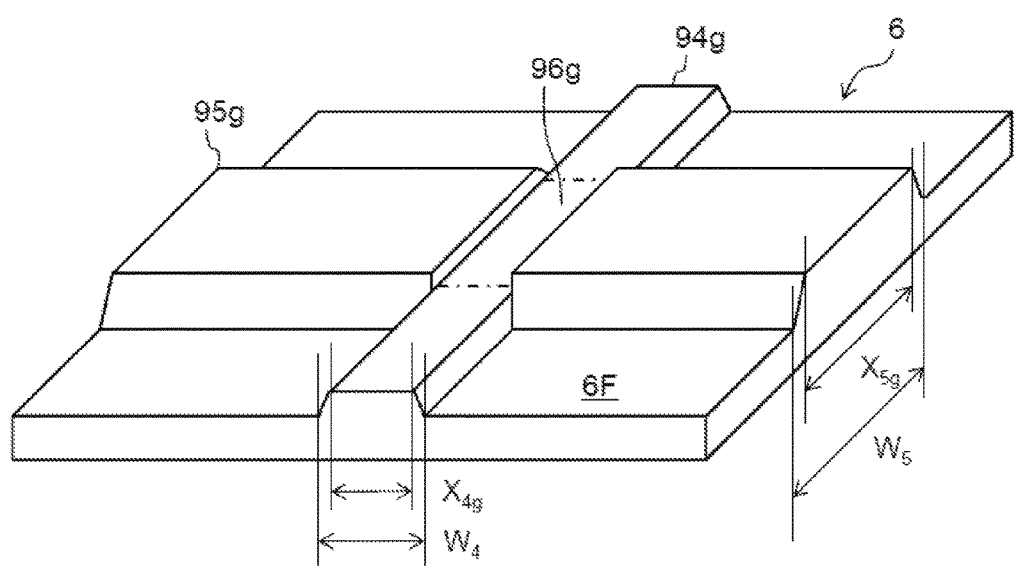
FIG. 43 is a perspective view of a three-dimensional image formed by irradiating a rear surface of a thermally expandable sheet with light after the front surface is irradiated.

FIG. 43 is a perspective view of the three-dimensional image formed by irradiating the rear surface 6R of the thermally expandable sheet 6 with light after the front surface 6F has been irradiated. In FIG. 43, the three-dimensional image illustrated in FIG. 41D is seen from a diagonal direction.

A protruding thin line 94g is formed with priority in a vertical direction on the front surface 6F of the thermally expandable sheet 6, and a protruding thick line 95g is additionally formed in a horizontal direction on the front surface 6F of the thermally expandable sheet 6. The post-expansion line width of the protruding thick line 95g is $W_5$.

The protruding thin line 94g is formed by irradiating the line 84g printed on the front surface 6F (refer to FIG. 41B) with light. The protruding thick line 95g is formed by irradiating the line 85g printed on the rear surface 6R (refer to FIG. 41C) with light. The line width $W_5$ of the protruding thick line 95g is approximately equal to and slightly wider than the line width $X_{5g}$ of the line 85g. This is because the heat generated at the line 85g by the light irradiation is transmitted to the area surrounding the line, thus causing the thermally expandable sheet 6 to expand. The top surface of the protruding thick line 95g is schematically illustrated as having plane symmetry with the line 85g.

The protruding intersection 96g is formed by irradiating with light the intersection 861g printed on the front surface 6F (refer to FIG. 41B) and a part of the line 85g printed on the rear surface 6R that is in the vicinity of the intersection 862g (refer to FIG. 41C).

FIGS. 41A to 44D illustrate the results of line allocation processing in the case where a thin line is higher than a thick line, and the expansion height of an intersection and the expansion height of a thin line are equal to each other. FIGS. 44A to 44D are partial enlarged views on the same scale.

Figure 44A:
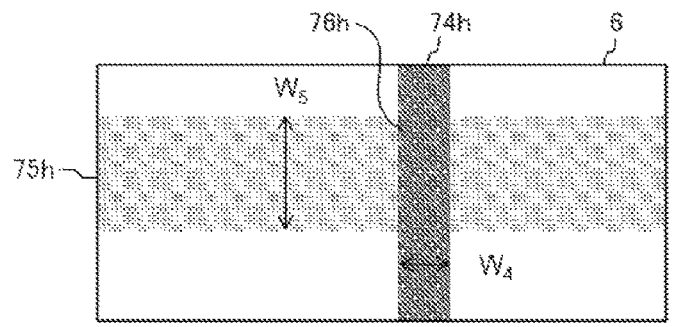
FIG. 44A illustrates width information and height information of protruding lines forming a three-dimensional image in the case where a thin line is higher than a thick line, and the expansion height of an intersection and the expansion height of a thin line are equal to each other.

FIG. 44A shows post-expansion width information and height information of the protruding lines forming a three-dimensional image. FIG. 44A shows the design information of the three-dimensional image.

As shown in FIG. 44A, a protruding thin line 74h is drawn vertically with priority on the thermally expandable sheet 6. The line width of the protruding thin line 74h is $W_4$. A protruding thick line 75h is drawn horizontally, and intersects the protruding thin line 74h at the protruding intersection 76h. The line width of the protruding thick line 75h is $W_5$.

In FIG. 44A, the expansion height information of the protruding lines is represented using hatching. An expansion height of 0 is represented when there is no hatching and the color is white. The denser the hatching, the higher the region is. The regions of the protruding thick line 75h that are not included in the protruding intersection 76h are displayed using a lighter hatching than the protruding intersection 76h, and this indicates that these regions are lower than the protruding thin line 74h and the protruding intersection 76h.

Figure 44B:
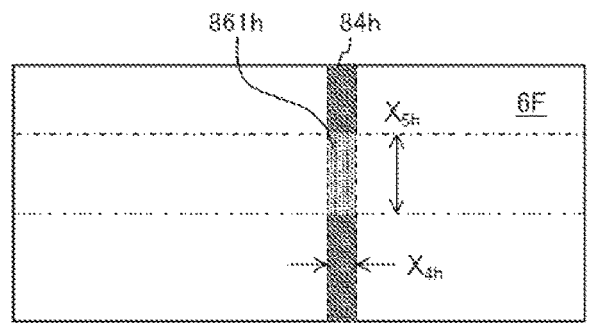
FIG. 44B illustrates a density image on a front surface of a thermally expandable sheet for forming a three-dimensional image.

FIG. 44B illustrates a density image that is for forming a three-dimensional image on the front surface 6F of the thermally expandable sheet 6.

A line 84h that corresponds to the protruding thin line 74h before expansion is drawn vertically on the front surface 6F of the thermally expandable sheet 6. The line width of the line 84h is $X_{4h}$ and is slightly narrower than the line width $W_4$ of the protruding thin line 74h. The line 84h is printed at a prescribed density using black ink, and when irradiated with light, the line 84h converts the light into heat in accordance with the density. The line 84h is a line for causing the protruding thin line 94h in FIG. 44D to be formed.

Figure 44C:
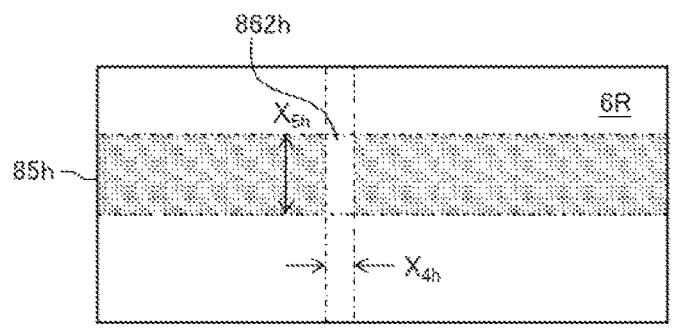
FIG. 44C illustrates a density image on a rear surface of a thermally expandable sheet for forming a three-dimensional image.
Figure 44D:
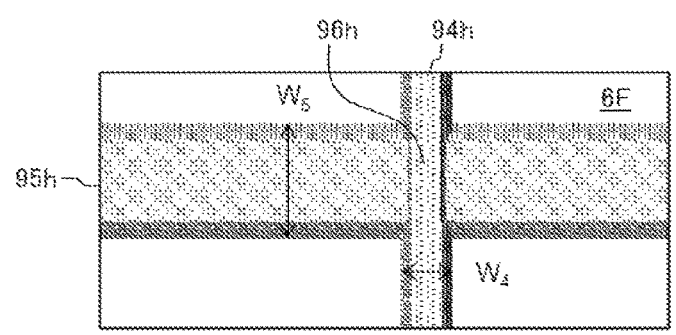
FIG. 44D illustrates a three-dimensional image formed by irradiating a front surface and rear surface of a thermally expandable sheet with light.

As shown in FIG. 44D, an intersection 861h that corresponds to the protruding intersection 76h has a lower density than the parts of the line 84h outside the intersection 861h. Therefore, a smaller amount of heat is generated in the region of the intersection 861h with irradiation of light than in the regions of the line 84h outside the intersection 861h.

In addition, although an image is also formed using color ink on the front surface 6F of the thermally expandable sheet 6, illustration of such an image is omitted here.

FIG. 44C illustrates a density image that is for forming a three-dimensional image on the rear surface 6R of the thermally expandable sheet 6.

A line 85h that corresponds to the protruding thick line 75h before expansion is drawn horizontally on the rear surface 6R of the thermally expandable sheet 6. The line width of the line 85h is $X_{5h}$ and is slightly narrower than the line width $W_5$ of the protruding thick line 75h. The line 85h is printed using black ink, and when irradiated with light, the line 85h converts the light into heat in accordance with the density of the ink. The line 85h is a line for causing the protruding thick line 95h in FIG. 44D to be formed.

As shown in FIG. 44D, the region of an intersection 862h that corresponds to the protruding intersection 76h is not printed with black ink, and therefore remains white. Therefore, the amount of heat generated in the region of the intersection 862h with irradiation of light is very small.

FIG. 44D illustrates a three-dimensional image formed by irradiating the front surface 6F and the rear surface 6R of the thermally expandable sheet 6 with light.

A protruding thin line 94h is formed with priority in a vertical direction on the front surface 6F of the thermally expandable sheet 6, and a protruding thick line 95h is additionally formed in a horizontal direction on the front surface 6F of the thermally expandable sheet 6. A protruding intersection 96h is formed in a part where the protruding thin line 94h and the protruding thick line 95h intersect each other.

The protruding thin line 94h is an expanded protruding line formed by irradiating the line 84h printed on the front surface 6F (refer to FIG. 44B) with light and has a line width of $W_4$. The protruding thick line 95h is an expanded protruding line formed by irradiating the line 85h printed on the rear surface 6R (refer to FIG. 44C) with light and has a line width of $W_5$. The protruding intersection 96h is formed by irradiating with light the intersection 861h printed on the front surface 6F (refer to FIG. 44B) and a part of the line 85h printed on the rear surface 6R that is in the vicinity of the intersection 862h (refer to FIG. 44C).

The line width $W_4$ of the protruding thin line 94h is approximately equal to the line width $W_4$ of the protruding thin line 74h, which is the design information for the protruding thin line 94h. The line width $W_5$ of the protruding thick line 95h is approximately equal to the line width $W_5$ of the protruding thick line 75h, which is the design information for the protruding thin line 95h. In other words, the design information illustrated in FIG. 44A is realized as a three-dimensional image.

Figure 45:
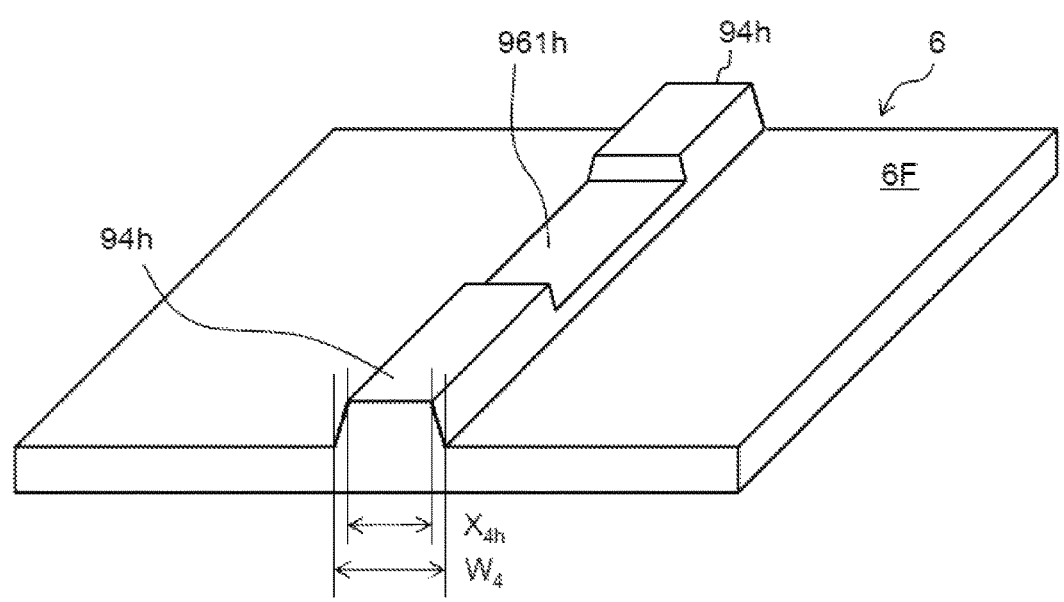
FIG. 45 is a perspective view of a three-dimensional image formed by irradiating a front surface of a thermally expandable sheet with light.

FIG. 45 is a perspective view of the three-dimensional image formed by irradiating the front surface 6F of the thermally expandable sheet 6 with light.

The protruding thin line 94h of line width $W_4$ is formed with a prescribed height on the front surface 6F of the thermally expandable sheet 6 in a vertical direction. In addition, a protruding intersection 961h is formed so as to be lower than the protruding thin line 94h. The protruding thin line 94h is formed by irradiating the line 84h printed on the front surface 6F (refer to FIG. 44B) with light. The line width $W_4$ of the protruding thin line 94h is approximately equal to and slightly wider than the line width $X_{4h}$ of the line 84h. This is because the heat generated at the line 84h by the light irradiation is transmitted to the area surrounding the line, thus causing the thermally expandable sheet 6 to expand. The top surface of the line 84h and the protruding thin line 94h are schematically shown as being the same.

The protruding intersection 961h is formed by irradiating the intersection 861h (refer to FIG. 44B) with light.

Figure 46:
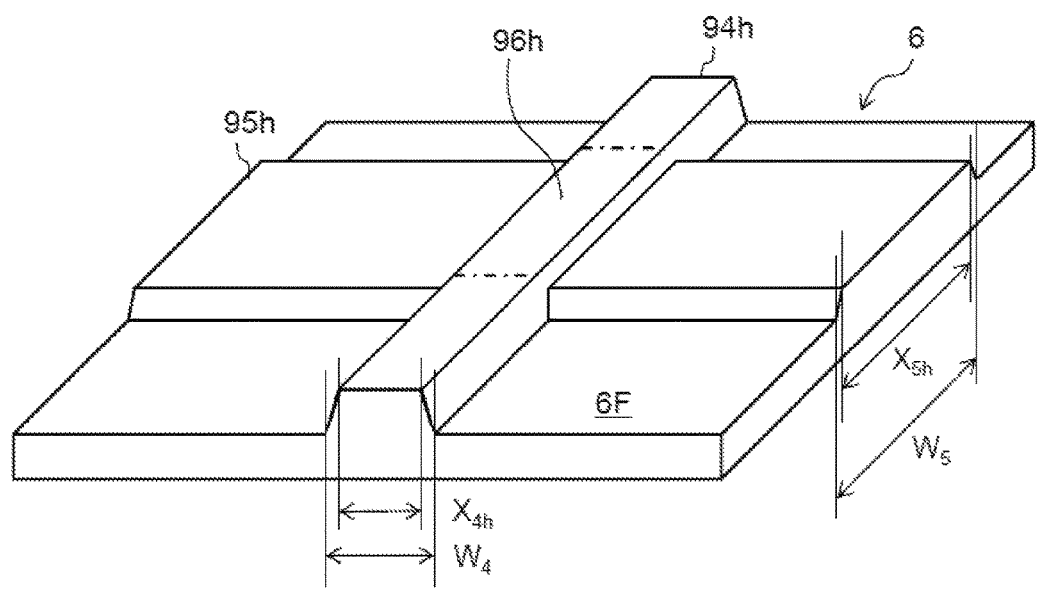
FIG. 46 is a perspective view of a three-dimensional image formed by irradiating a rear surface of a thermally expandable sheet with light after the front surface is irradiated.

FIG. 46 is a perspective view of the three-dimensional image formed by irradiating the rear surface 6R of the thermally expandable sheet 6 with light after the front surface 6F has been irradiated. In FIG. 46, the three-dimensional image illustrated in FIG. 44D is seen from a diagonal direction.

A protruding thin line 94h is formed with priority in a vertical direction on the front surface 6F of the thermally expandable sheet 6, and a protruding thick line 95h of line width $W_5$ is additionally formed in a horizontal direction on the front surface 6F of the thermally expandable sheet 6.

The protruding thin line 94h is formed by irradiating the line 84h printed on the front surface 6F (refer to FIG. 44B) with light. The protruding thick line 95h is formed by irradiating the line 85h printed on the rear surface 6R (refer to FIG. 44C) with light. The line width $W_5$ of the protruding thin line 95h is approximately equal to and slightly wider than the line width $X_{5h}$ of the line 85h. This is because the heat generated at the line 85h by the light irradiation is transmitted to the area surrounding the line, thus causing the thermally expandable sheet 6 to expand. The top surface of the protruding thick line 95h is schematically illustrated as having plane symmetry with the line 85h.

The protruding intersection 96h is formed by irradiating with light the intersection 861h printed on the front surface 6F (refer to FIG. 44B) and a part of the line 85h printed on the rear surface 6R that is in the vicinity of the intersection 862h (refer to FIG. 44C).

FIGS. 47A to 47D illustrate the results of line allocation processing in the case where a thin line is lower than a thick line, and the expansion height of an intersection and the expansion height of a thick line are equal to each other. FIGS. 47A to 47D are partial enlarged views on the same scale.

Figure 47A:
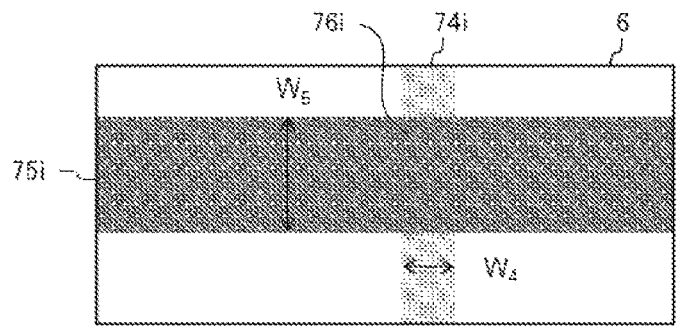
FIG. 47A illustrates width information and height information of protruding lines forming a three-dimensional image in the case where a thin line is lower than a thick line, and the expansion height of an intersection and the expansion height of a thick line are equal to each other.

FIG. 47A shows post-expansion width information and height information of the protruding lines forming a three-dimensional image. FIG. 47A shows the design information of the three-dimensional image.

As shown in FIG. 47A, a protruding thick line 74i is drawn vertically with priority on the thermally expandable sheet 6. The line width of the protruding thick line 75i is $W_5$. A protruding thick line 74i is drawn vertically, and intersects the protruding thick line 75i at the protruding intersection 76i. The line width of the protruding thin line 74i is $W_4$.

In FIG. 47A, the expansion height information of the protruding lines is represented using hatching. An expansion height of 0 is represented when there is no hatching and the color is white. The denser the hatching, the higher the region is. The protruding thick line 75i and the protruding intersection 76i are displayed using the same hatching, and this indicates that the protruding thick line 75i and the protruding intersection 76i have the same height. Regions of the protruding thin line 74i that are not included in the protruding intersection 76i are displayed using a lighter hatching than the protruding intersection 76i, and this indicates that these regions are lower than the protruding thick line 75i.

Figure 47B:
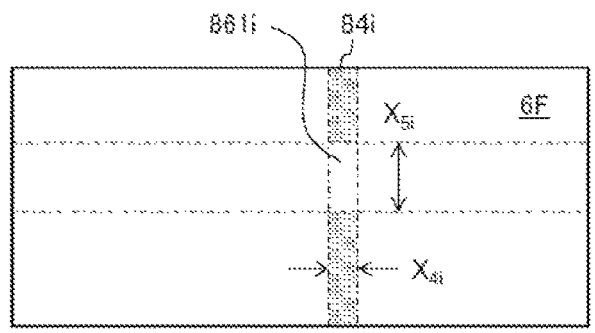
FIG. 47B illustrates a density image on a front surface of a thermally expandable sheet for forming a three-dimensional image.

FIG. 47B illustrates a density image that is for forming a three-dimensional image on the front surface 6F of the thermally expandable sheet 6.

A line 84i that corresponds to the protruding thin line 74i before expansion is drawn vertically on the front surface 6F of the thermally expandable sheet 6. The line width of the line 84i is $X_4$, and is slightly narrower than the line width $W_4$ of the protruding thin line 74*i*. The line 84*i* is printed at a prescribed density using black ink, but the region of an intersection 861*i* is not subjected to printing and remains white. The region of the intersection 861*i* corresponds to the protruding intersection 76*i*.

Upon being irradiated with light, the region of the line 84*i* printed at the prescribed density converts the light into heat in accordance with the density. The line 84*i* is a line for causing the protruding thin line 94*i* in FIG. 47D to be formed. The amount of heat generated by irradiation of light in the region of the intersection 861*i*, which was not subjected to printing, is very small. In addition, although an image is also formed using color ink on the front surface 6F of the thermally expandable sheet 6, illustration of such an image is omitted here.

Figure 47C:
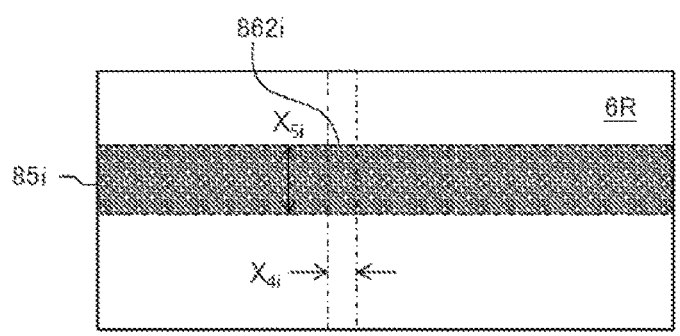
FIG. 47C illustrates a density image on a rear surface of a thermally expandable sheet for forming a three-dimensional image.

FIG. 47C illustrates a density image that is for forming a three-dimensional image on the rear surface 6R of the thermally expandable sheet 6.

A line 85*i* that corresponds to the protruding thick line 75*i* before expansion is drawn horizontally on the rear surface 6R of the thermally expandable sheet 6. The line width of the line 85*i* is $X_5$ and is slightly narrower than the line width $W_5$ of the protruding thick line 75*i*. The line 85*i* and an intersection 862*i* are printed at the same density using black ink, and upon being irradiated with light, convert the light into heat in accordance with the density of the ink. The line 85*i* is a line for causing the protruding thick line 95*i* in FIG. 47D to be formed. The region of the intersection 862*i* corresponds to the protruding intersection 76*i* shown in FIG. 47D.

Figure 47D:
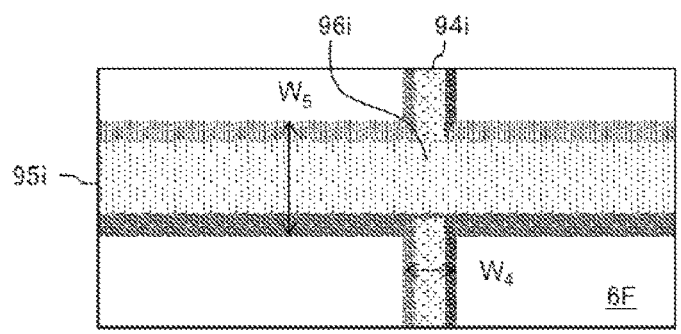
FIG. 47D illustrates a three-dimensional image formed by irradiating a front surface and rear surface of a thermally expandable sheet with light.

FIG. 47D illustrates a three-dimensional image formed by irradiating the front surface 6F and the rear surface 6R of the thermally expandable sheet 6 with light.

A protruding thick line 95*i* is formed with priority in a horizontal direction on the front surface 6F of the thermally expandable sheet 6, and a protruding thin line 94*i* that is lower than the protruding thick line 95*i* is formed in a vertical direction on the front surface 6F of the thermally expandable sheet 6. A protruding intersection 96*i* having the same expansion height as a protruding thick line 95*i* is formed in a part where the protruding thin line 94*i* and the protruding thick line 95*i* intersect.

The protruding thin line 94*i* is an expanded protruding line formed by irradiating the line 84*i* printed on the front surface 6F (refer to FIG. 47B) with light and has a line width of $W_4$. The protruding thick line 95*i* and the protruding intersection 96*i* are an expanded protruding line and protruding intersection formed by irradiating the line 85*i* printed on the rear surface 6R and the intersection 862*i* (refer to FIG. 47C) with light. The post-expansion line width of the protruding thick line 95*i* is $W_5$.

The post-expansion line width $W_4$ of the protruding thin line 94*i* is approximately equal to the line width $W_4$ of the protruding thin line 74*i*, which is the design information for the protruding thin line 94*i*. The post-expansion line width $W_5$ of the protruding thick line 95*i* is approximately equal to the line width $W_5$ of the protruding thick line 75*i*, which is the design information for the protruding thick line 95*i*. In other words, the design information illustrated in FIG. 47A is realized as a three-dimensional image.

Figure 48:
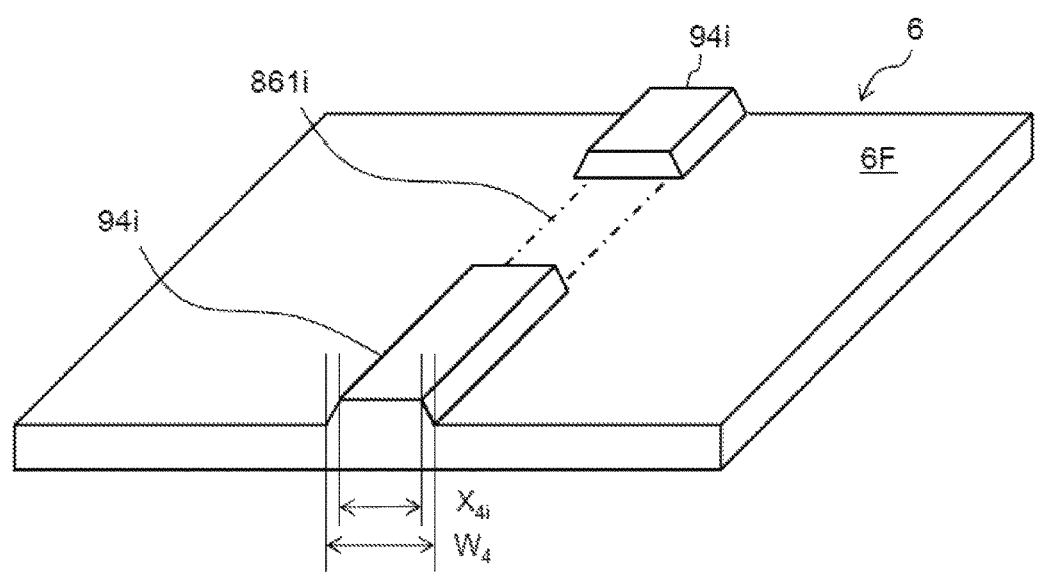
FIG. 48 is a perspective view of a three-dimensional image formed by irradiating a front surface of a thermally expandable sheet with light.

FIG. 48 is a perspective view of the three-dimensional image formed by irradiating the front surface 6F of the thermally expandable sheet 6 with light.

The protruding thin line 94*i* of line width $W_4$ is formed with a prescribed height on the front surface 6F of the thermally expandable sheet 6 in a vertical direction, whereas the region of the intersection 861*i* (refer to FIG. 47B) does not expand. The protruding thin line 94*i* except for the intersection 861*i* is formed by irradiating the line 84*i* printed on the front surface 6F (refer to FIG. 47B) with light. The line width $W_4$ of the protruding thin line 94*i* is approximately equal to and slightly wider than the line width $X_{4i}$ of the line 84*i*. This is because the heat generated at the line 84*i* by the light irradiation is transmitted to the area surrounding the line, thus causing the thermally expandable sheet 6 to expand. The top surface of the line 84*i* and the protruding thin line 94*i* are schematically shown as being the same.

Figure 49:
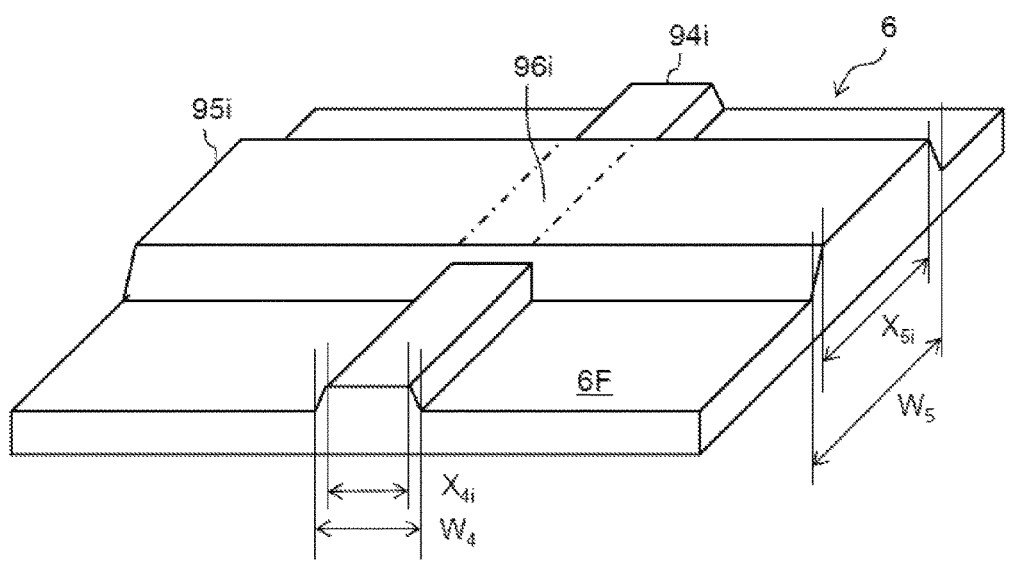
FIG. 49 is a perspective view of a three-dimensional image formed by irradiating a rear surface of a thermally expandable sheet with light after the front surface is irradiated.

FIG. 49 is a perspective view of the three-dimensional image formed by irradiating the rear surface 6R of the thermally expandable sheet 6 with light after the front surface 6F has been irradiated. In FIG. 49, the three-dimensional image illustrated in FIG. 47D is seen from a diagonal direction.

The protruding thin line 94*i* except for the protruding intersection 96*i* is formed in a vertical direction on the front surface 6F of the thermally expandable sheet 6, and the protruding thick line 95*i* of line width $W_5$ is formed with priority in a horizontal direction on the front surface 6F of the thermally expandable sheet 6.

The protruding thin line 94*i* except for the protruding intersection 961*i* is formed by irradiating the line 84*i* printed on the front surface 6F (refer to FIG. 47B) with light. The protruding thick line 95*i* and the protruding intersection 96*i* are formed by irradiating the line 85*i* and the intersection 862*i* printed on the rear surface 6R (refer to FIG. 47C) with light. The line width $W_5$ of the protruding thick line 95*i* is approximately equal to and slightly wider than the line width $X_5$ of the line 85*i*. This is because the heat generated at the line 85*i* by the light irradiation is transmitted to the area surrounding the line, thus causing the thermally expandable sheet 6 to expand. The top surface of the protruding thick line 95*i* is schematically illustrated as having plane symmetry with the line 85*i*.

FIGS. 50A to 50D illustrate the results of line allocation processing in the case where a thin line is higher than a thick line, and the expansion height of an intersection and the expansion height of a thick line are equal to each other. FIGS. 50A to 50D are partial enlarged views on the same scale.

Figure 50A:
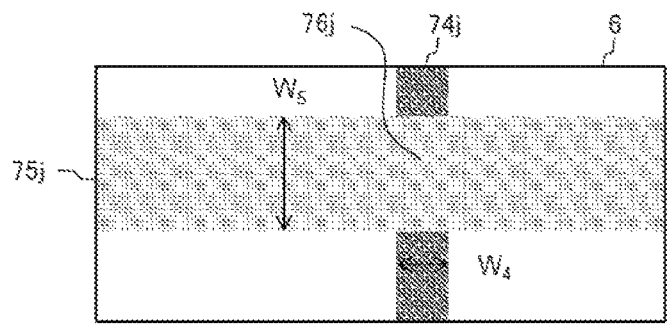
FIG. 50A illustrates width information and height information of protruding lines forming a three-dimensional image in the case where a thin line is higher than a thick line, and the expansion height of an intersection and the expansion height of a thick line are equal to each other.

FIG. 50A shows post-expansion width information and height information of the protruding lines forming a three-dimensional image. FIG. 50A shows the design information of the three-dimensional image.

As shown in FIG. 50A, a protruding thick line 75*j* is drawn horizontally with priority on the thermally expandable sheet 6. The line width of the protruding thick line 75*j* is $W_5$. A protruding thin line 74*j* is drawn vertically, and intersects the protruding thick line 75*j* in a protruding intersection 76*j*. The line width of the protruding thin line 74*j* is $W_4$.

In FIG. 50A, the height information of the protruding lines is represented using hatching. An expansion height of 0 is represented when there is no hatching and the color is white. The denser the hatching, the higher the region is. The protruding thick line 75*j* and the protruding intersection 76*j* are displayed using the same hatching, and this indicates that the protruding thick line 75*j* and the protruding intersection 76*j* have the same height. Regions of the protruding thin line 74*j* that are not included in the protruding intersection 76*j* are displayed using a darker hatching than the protruding intersection 76*j*, and this indicates that these regions are higher than the protruding thick line 75*j*.

Figure 50B:
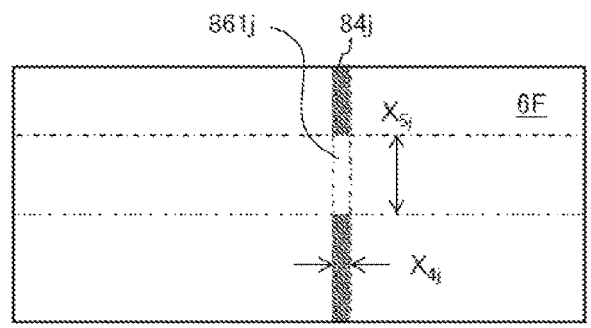
FIG. 50B illustrates a density image on a front surface of a thermally expandable sheet for forming a three-dimensional image.
Figure 50C:
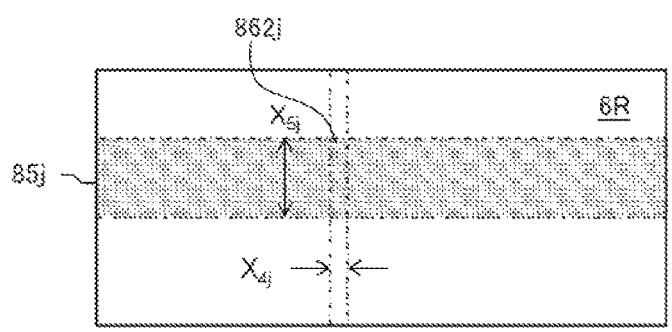
FIG. 50C illustrates a density image on a rear surface of a thermally expandable sheet for forming a three-dimensional image.

FIG. 50B illustrates a density image that is for forming a three-dimensional image on the front surface 6F of the thermally expandable sheet 6.

A line 84*j* that corresponds to the protruding thin line 74*j* before expansion is drawn vertically on the front surface 6F of the thermally expandable sheet 6. The line width of the line 84*j* is $X_{4j}$ and is slightly narrower than the line width $W_4$ of the protruding thin line 74*j*. The line 84*j* is printed at a prescribed density using black ink, but the region of an intersection 861*j* is not subjected to printing and remains white. The region of the intersection 861*j* corresponds to the protruding intersection 76*j*.

Upon being irradiated with light, the region of the line 84*j* printed at the prescribed density converts the light into heat in accordance with the density. The line 84*j* is a line for causing the protruding thin line 94*j* in FIG. 50D to be formed. The amount of heat generated by irradiation of light in the region of the intersection 861*j*, which was not subjected to printing, is very small. In addition, although an image is also formed using color ink on the front surface 6F of the thermally expandable sheet 6, illustration of such an image is omitted here.

FIG. 50 illustrates a density image that is for forming a three-dimensional image on the rear surface 6R of the thermally expandable sheet 6.

A line 85*j* that corresponds to the protruding thick line 75*j* before expansion is drawn horizontally on the rear surface 6R of the thermally expandable sheet 6. The line width of the line 85*j* is $X_{5j}$ and is slightly narrower than the line width $W_5$ of the protruding thick line 75*j*. The line 85*j* and an intersection 862*j* are printed at the same density using black ink, and upon being irradiated with light, convert the light into heat in accordance with the density of the ink. The line 85*j* is a line for causing the protruding thick line 95*j* in FIG. 50D to be formed. The region of the intersection 862*j* corresponds to the protruding intersection 76*j* shown in FIG. 50D.

Figure 50D:
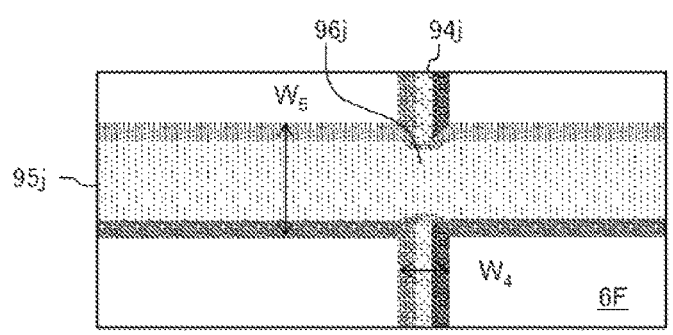
FIG. 50D illustrates a three-dimensional image formed by irradiating a front surface and rear surface of a thermally expandable sheet with light.

FIG. 50D illustrates a three-dimensional image formed by irradiating the front surface 6F and the rear surface 6R of the thermally expandable sheet 6 with light.

A protruding thick line 95*j* is formed with priority in a horizontal direction on the front surface 6F of the thermally expandable sheet 6, and a protruding thin line 94*j* that is higher than the protruding thick line 95*j* is formed in a vertical direction on the front surface 6F of the thermally expandable sheet 6. A protruding intersection 96*j* having the same expansion height as a protruding thick line 95*j* is formed in a part where the protruding thin line 94*j* and the protruding thick line 95*j* intersect.

The protruding thin line 94*j* is an expanded protruding line formed by irradiating the line 84*j* printed on the front surface 6F (refer to FIG. 50B) with light and has a line width of $W_4$. The protruding thick line 95*j* and the protruding intersection 96*j* are an expanded protruding line and protruding intersection formed by irradiating the line 85*j* printed on the rear surface 6R and the intersection 862*j* (refer to FIG. 50C) with light. The post-expansion line width of the protruding thick line 95*j* is $W_5$.

The line width $W_4$ of the protruding thin line 94*j* is approximately equal to the line width $W_4$ of the protruding thin line 74*j*, which is the design information for the protruding thin line 94*j*. The post-expansion line width $W_{5d}$ of the protruding thick line 95*j* is approximately equal to the line width $W_5$ of the protruding thick line 75*j*, which is the design information for the protruding thick line 95*j*. In other words, the design information illustrated in FIG. 50A is realized as a three-dimensional image.

Figure 51:
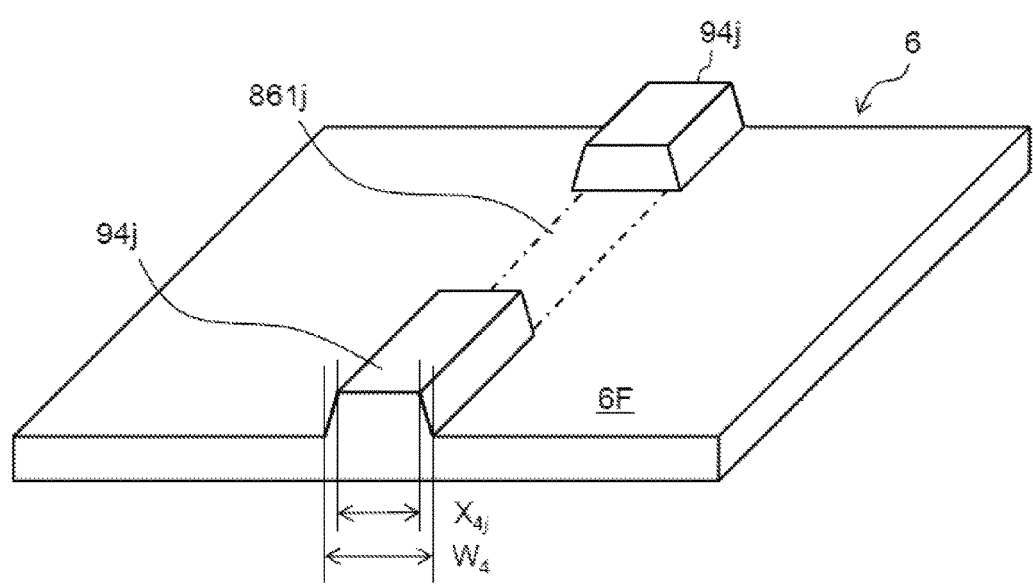
FIG. 51 is a perspective view of a three-dimensional image formed by irradiating a front surface of a thermally expandable sheet with light.

FIG. 51 is a perspective view of the three-dimensional image formed by irradiating the front surface 6F of the thermally expandable sheet 6 with light.

The protruding thin line 94*j* of line width $W_4$ is formed with a prescribed height on the front surface 6F of the thermally expandable sheet 6 in a vertical direction. However, the region of the intersection 861*j* (refer to FIG. 50B) does not expand. The protruding thin line 94*j* except for the intersection 861*j* is formed by irradiating the line 84*j* printed on the front surface 6F (refer to FIG. 50B) with light. The line width $W_4$ of the protruding thin line 94*j* is approximately equal to and slightly wider than the line width $X_{4j}$ of the line 84*j*. This is because the heat generated at the line 84*j* by the light irradiation is transmitted to the area surrounding the line, thus causing the thermally expandable sheet 6 to expand. The top surface of the line 84*j* and the protruding thin line 94*j* are schematically shown as being the same.

Figure 52:
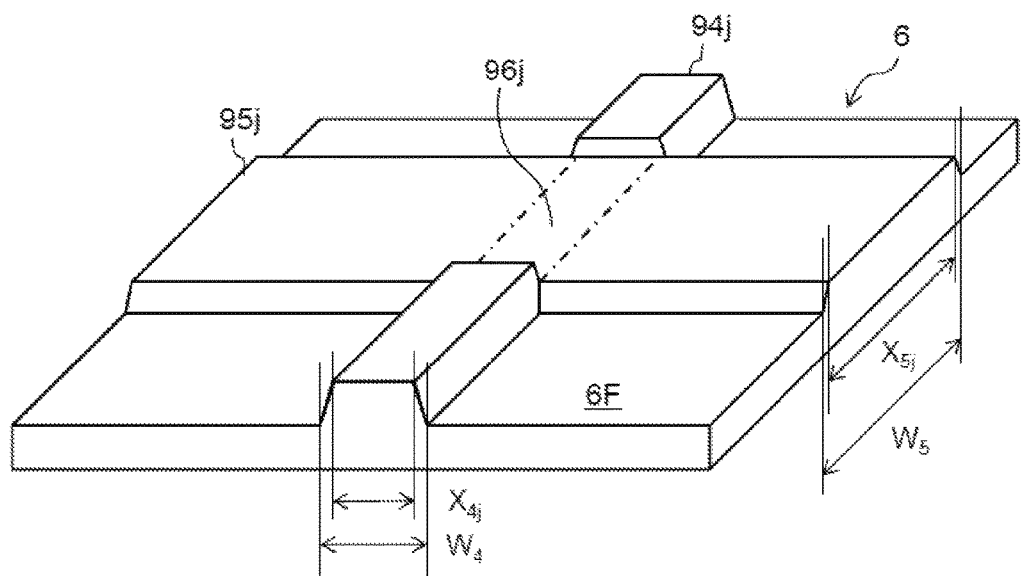
FIG. 52 is a perspective view of a three-dimensional image formed by irradiating a rear surface of a thermally expandable sheet with light after the front surface is irradiated.

FIG. 52 is a perspective view of the three-dimensional image formed by irradiating the rear surface 6R of the thermally expandable sheet 6 with light after the front surface 6F has been irradiated. In FIG. 52, the three-dimensional image illustrated in FIG. 50D is seen from a diagonal direction.

The protruding thin line 94*j* except for the protruding intersection 861*j* is formed in a vertical direction on the front surface 6F of the thermally expandable sheet 6, and the protruding thick line 95*j* of line width $W_5$ is formed with priority in a horizontal direction on the front surface 6F of the thermally expandable sheet 6.

The protruding thin line 94*j* except for the protruding intersection 961*j* is formed by irradiating the line 84*j* printed on the front surface 6F (refer to FIG. 50B) with light. The protruding thick line 95*j* and the protruding intersection 96*j* are formed by irradiating the line 85*j* printed on the rear surface 6R and the intersection 862*j* (refer to FIG. 50C) with light. The line width $W_5$ of the protruding thick line 95*j* is approximately equal to and slightly wider than the line width $X_{5j}$ of the line 85*j*. This is because the heat generated at the line 85*j* by the light irradiation is transmitted to the area surrounding the line, thus causing the thermally expandable sheet 6 to expand. The top surface of the protruding thick line 95*j* is schematically illustrated as having plane symmetry with the line 85*j*.

FIG. 53 is a diagram for explaining the structure of an intersection expansion height database 312C of Embodiment 6. The intersection expansion height database 312C includes front surface pre-expansion line width column, a front surface line expansion height column, a rear surface pre-expansion line width column, a rear surface line expansion height column, a height setting column, a front surface black ink density column, and a rear surface black ink density column.

The intersection expansion height database 312C includes front surface pre-expansion line width column, a front surface line expansion height column, a rear surface pre-expansion line width column, a rear surface line expansion height column, a height setting column, a front surface black ink density column, and a rear surface black ink density column.

The front surface pre-expansion line width column is a column that stores pre-expansion line width information of thin lines that form intersections. The front surface line expansion height column is a column that stores height information of protruding lines formed by thin lines that form intersections.

The rear surface pre-expansion line width column is a column in which line width information of the pre-expansion line widths of thick lines that form intersections is stored. The rear surface line expansion height column is a column that stores height information of protruding lines formed by thick lines that form intersections.

The height setting column is a column that stores whether intersection design height information matches height information of a protruding line formed by a thin line on the front surface or a protruding line formed by a thick line on the rear surface. In Embodiment 6, it is assumed that the design height information of an intersection matches either the height information of a protruding line formed by a thin line on the front surface or a protruding line formed by a thick line on the rear surface.

The front surface black ink density column is a column that stores information regarding the ink density of the intersections on the front surface. The rear surface black ink density column is a column that stores information regarding the ink density of the intersections on the rear surface.

Figure 54:
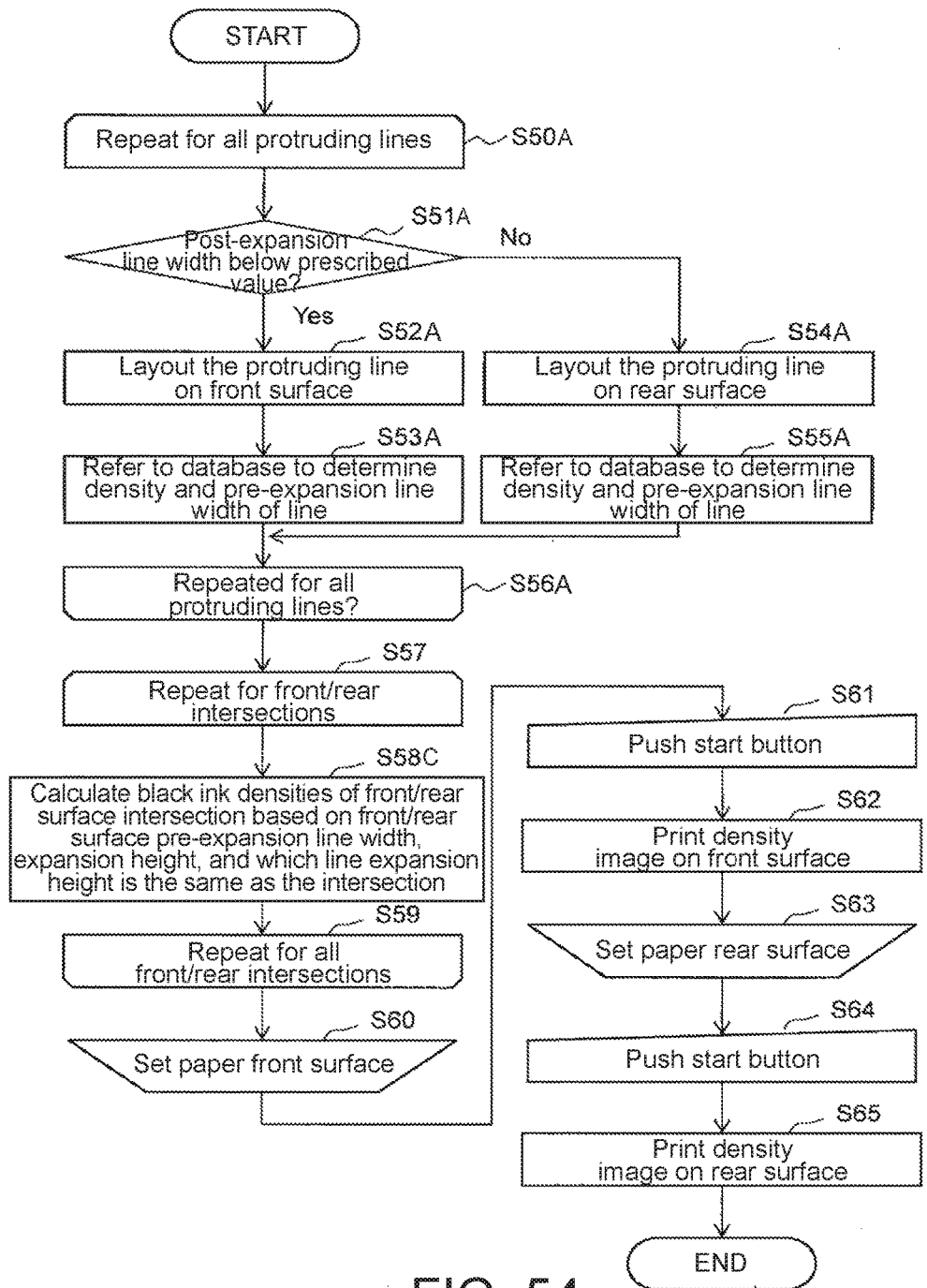
FIG. 54 is a flowchart for explaining line allocation processing.

FIG. 54 is a flowchart for explaining line allocation processing. The allocation processing is processing executed by the density allocating unit 32 (refer to FIG. 1) upon receiving the three-dimensional image design information. Elements that are the same as those in the flowchart of FIG. 40 are denoted by the same symbols.

The processing of steps S50 to S57 and the processing of steps S59 to S65 are the same as in the flowchart of FIG. 40, and only the processing of step S58C is different.

In step S58C, the density allocating unit 32 calculates the black ink density of the intersection on the front surface and the rear surface on the basis of the front surface and rear surface pre-expansion line width, expansion height, and which line expansion height the intersection is equal to.

In other words, for each intersection between the protruding lines that form a three-dimensional image, the density allocating unit 32 divides the density of the intersection between a front-surface-side density image and a rear-surface-side density image in accordance with the pre-expansion line widths and expansion heights of the lines that form the intersection and in accordance with the expansion height of the intersection. The division ratios are listed in an intersection expansion height database 312C.

<Effect of Embodiment 6>

An intersection between a line allocated to the front surface 6F of the thermally expandable sheet 6 and a line allocated to the rear surface 6R of the thermally expandable sheet 6 can be set to a desired expansion height.

Moreover, the computer 3 receives the post-expansion line widths of the protruding lines and determines the line widths of the lines for forming the protruding lines. This makes it possible to form desired protruding lines and to have more uniform three-dimensional image quality even if the operator of the tactile map has no knowledge of the relationship between the two-dimensional lines formed by ink and the protruding lines formed by these lines.

<Embodiment 7>

In Embodiments 1 to 6, one type of black ink is stored in a database. This assumes that that only a specific inkjet printer is to be used, but there are also cases where a plurality of inkjet printers could be used. In such a case, there is a risk that the printing density could change due to the type of blank ink printed on the thermally expandable sheet 6, or the maker, manufacturer number, lot, etc., for example. Even if the printers are the same, a plurality of different types of black ink are used when using compatible ink cartridges.

In order to handle a plurality of types of ink, it is possible to create an expansion height database 311 and intersection expansion height database 312 for each ink and store these in the storage unit 31. However, if there are too many types of ink, the size of the database will be large and thus require a mass storage device. Such a constraint is particularly disadvantageous for embedded devices.

In Embodiment 7, a method is described for controlling the data amount while handling a plurality of types of ink. This makes it possible to have uniform post-expansion line heights and line widths even if there are a plurality of types of ink being used.

Figure 55:
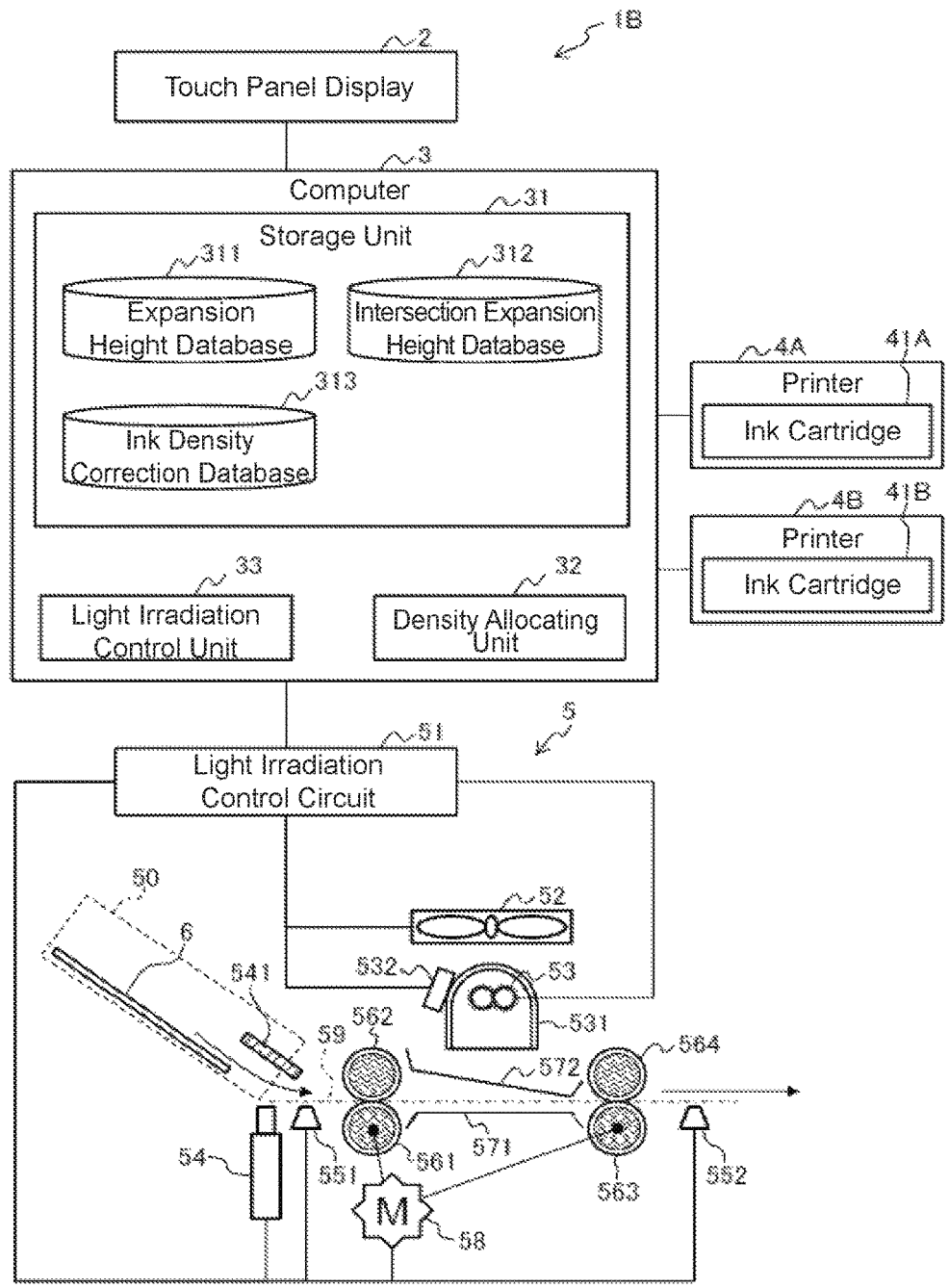
FIG. 55 is a schematic configuration of a three-dimensional image forming system of Embodiment 7.

FIG. 55 is a schematic configuration diagram of a three-dimensional image forming system 1B of Embodiment 7.

The three-dimensional image forming system 1B of Embodiment 7 differs from the three-dimensional image forming system in FIG. 11 in being able to switch and connect to a plurality of types of printers 4A, 4B, etc., and one of the printers prints on the thermally expandable sheet 6.

The printers 4A and 4B are inkjet printing devices, for example. The printer 4A has an ink cartridge 4A inserted therein. The printer 4A prints a density image with black ink from the ink cartridge 41A and a color image on the front surface of the thermally expandable sheet 6, and then prints a density image with black ink on the rear surface of the thermally expandable sheet. Similarly, the printer 4B prints a density image with black ink from the ink cartridge 41B and a color image on the front surface of the thermally expandable sheet 6, and then prints a density image with black ink on the rear surface of the thermally expandable sheet.

Furthermore, the three-dimensional image forming system 1B stores an ink density correction database 313 in the storage unit 31. Other configurations are similar to the three-dimensional image forming system 1A shown in FIG. 11.

FIG. 56 is a plan view showing the configuration of ink density correction database 313.

The ink density correction database 313 contains an ink type column and a correction value column.

The ink type column is a column that stores ink types. Ink A is a reference ink used when creating the expansion height database 311 and intersection expansion height database 312.

The correction value column is a column that stores correction values for each ink type. Ink A is the reference ink and thus has a correction value of 1.0.

Ink A1 is a compatible ink that is compatible with Ink A and stored in a compatible cartridge, for example. Ink A1 has a slightly lower carbon content than Ink A, and thus has a correction value of 1.02.

Ink B is an ink for use in a printer of a different maker than the printer that uses Ink A, for example. Ink B has a slightly higher carbon content than Ink A, and thus has a correction value of 0.98.

Figure 57:
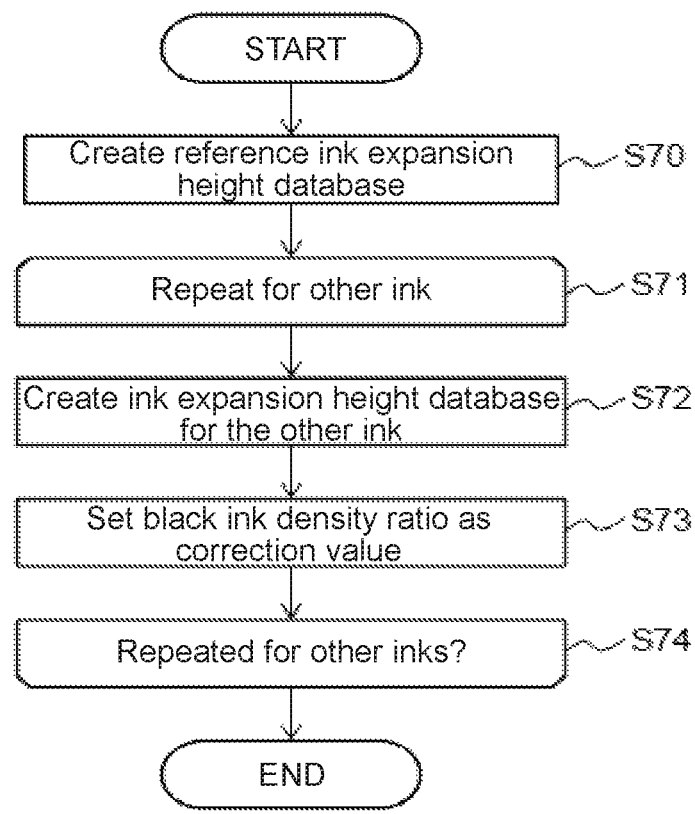
FIG. 57 is a flowchart for explaining a method of calculating correction values.

FIG. 57 is a flowchart for explaining a method of calculating correction values.

First, the designer creates an expansion height database 311 for Ink A, which is the reference ink (step S70).

Hereinafter, the processes in step S71 to S74 are repeated for other inks. The process for Ink A1 will be described below.

The designer creates an expansion height database 311 for Ink A1 (step S72). The designer then calculates a ratio of the black ink density of Ink A1 relative to the black ink density of Ink A and assigns the average as the correction value of Ink A1 (step S73). This process is repeated for all other inks (step S74). By so doing, the designer can create an ink density correction database 313.

Figure 58:
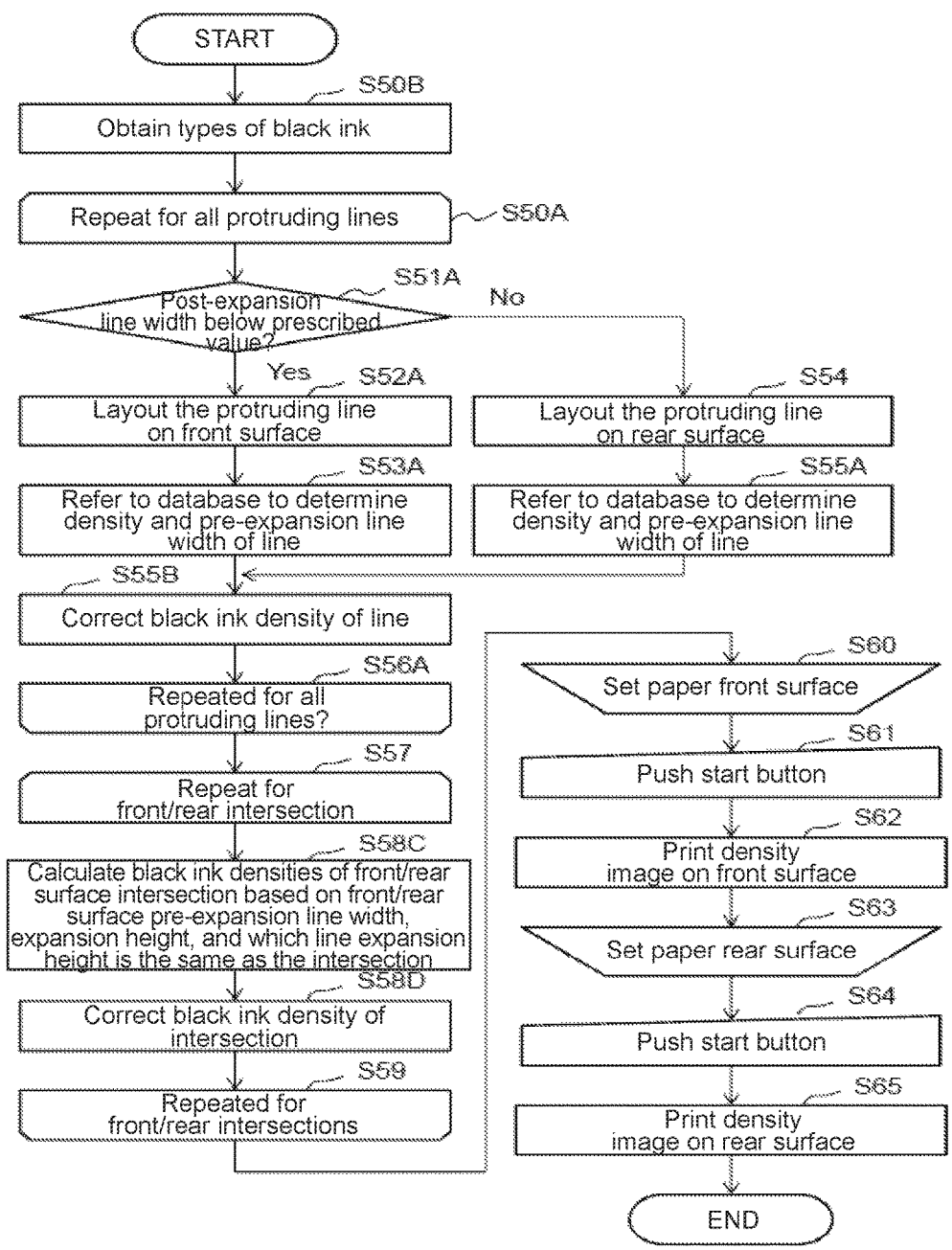
FIG. 58 is a flowchart for explaining line allocation processing.

FIG. 58 is a flowchart for explaining line allocation processing. The allocation processing is processing executed by the density allocating unit 32 (refer to FIG. 1) upon receiving the three-dimensional image design information. Elements that are the same as those in the flowchart of FIG. 54 are denoted by the same symbols.

In step S50B, the density allocating unit 32 obtains the types of black ink. In other words, if the printing destination is printer 4A, for example, the density allocating unit 32 detects ink cartridge 41A inserted in the printer 4A and determines the ink type. Next, the process proceeds to step S50A.

The processes of steps S50A to S55A are the same as the respective processes in the flowchart of FIG. 54.

In step S55B, the density allocating unit 32 determines the correction value in accordance with the type of black ink and the ink density correction database 313 and then corrects the black ink density of the line. Specifically, the density allocating unit 32 calculates the sum of the density and correction value for each pre-corrected line and sets the sum as the corrected density.

The process of step 56A is the same as the corresponding process in the flowchart of FIG. 54. Next, the process proceeds to the intersection allocating process in steps S57 to S59.

In step S57, the density allocating unit 32 specifies a line on the front surface and a line on the rear surface that form an intersection that is to undergo determination and repeats this process for all intersections of lines on the front surface and lines on the rear surface. The density allocating unit 32 calculates the black ink density of the intersection on the front surface and the rear surface on the basis of the front surface and rear surface pre-expansion line width, expansion height, and whichever line expansion height the intersection is equal to (step S58C). Next, the density allocating unit 32 determines the correction value in accordance with the type of black ink and the ink density correction database 313 and then corrects the black ink density of the intersection (step S58D). Specifically, the density allocating unit 32 calculates the sum of the density and correction value for each pre-corrected intersection and sets the sum as the corrected density.

Hereafter, the processes of steps S59 to S65 are the same as the respective processes in the flowchart of FIG. 54.

In other words, the density allocating unit 32 functions to correct the printing density of the ink on the basis of the type of ink forming the photothermal conversion image.

The reasoning behind Embodiment 7 is as explained below

Expansion is related to the amount of carbon contained in the ink. The amount of carbon contained in each black ink differs depending on the ink type and is proportional to the black ink density. A higher amount of carbon increases the expansion height. Accordingly, the magnitude of the amount of carbon contained in the ink is a primary reason for changes in expansion height.

Thus, there is the expansion height database 311 and intersection height database 312, which are based on a reference ink, and other inks are approximately corrected by the ink density correction database 313.

<Effect of Embodiment 7>

The amount stored in the expansion height database, intersection height database, etc. is kept low while making it possible to handle a plurality of types of inks and a plurality of types of printers. Moreover, it is possible to inhibit variation caused by using a plurality of types of inks.

<Modifications>

The present invention is not limited to the above-described embodiments, and can be changed within a range that does not depart from the gist of the present invention as described in the following modifications (a) to (i), for example.

(a) The present invention is not limited to being applied to paths included in a map, and may be applied to a railway map or to a plane or ship chart.

(b) The present invention may be applied to any three-dimensional image formed of protruding lines.

(c) The present invention is not limited to being applied to allocation of lines, and may be applied to allocation of surfaces.

(d) The present invention is not limited to being applied to intersections between lines, and may be applied to an intersecting part between a line on a front surface and a region on a rear surface, to an intersecting part between a region on a front surface and a line on a rear surface, or to an intersecting region between a region on a front surface and a region on a rear surface.

(e) The density allocating unit 32 may execute a procedure for allocating lines that form a three-dimensional image so that the lines are formed on a front surface of a thermally expandable sheet or are formed on a rear surface of the thermally expandable sheet in accordance with expansion heights of the lines.

(f) The density allocating unit 32 may execute a procedure for allocating a line on the front surface of the thermally expandable sheet or the rear surface of the thermally expandable sheet based on a combination of the expansion height and pre-expansion or post-expansion line width of the line forming the three-dimensional image.

(g) The density allocating unit 32 may execute a procedure for allocating intersections of the protruding lines on the front surface of the thermally expandable sheet or the rear surface of the thermally expandable sheet based on the expansion height of the protruding lines forming the three-dimensional image.

(h) The density allocating unit 32 may execute a procedure for allocating intersections of the protruding lines on the front surface of the thermally expandable sheet or the rear surface of the thermally expandable sheet based on a combination of the expansion height and post-expansion line width of the protruding lines forming the three-dimensional image.

(i) The printing materials forming the photothermal conversion image are not restricted to ink, and may be a combination of a toner and developer, for example.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A photothermal conversion image generating device that generates a photothermal conversion image for forming a three-dimensional image by causing a thermally expandable sheet to expand, the device comprising:
   a processor that allocates, based on at least one of a pre-expansion or post-expansion line width and an expansion height of a line in the three-dimensional image, an image for forming said line to either a front surface of the thermally expandable sheet or a rear surface of the thermally expandable sheet, the processor causing the image so allocated to be printed on the allocated front or rear surface of the thermally expandable sheet, wherein the line in the three-dimensional image is a protruding line that will protrude after the thermally expandable sheet has expanded, and the processor performs said allocation based on the post-expansion line width of the protruding line.

2. The photothermal conversion image generating device according to claim 1, wherein the processor performs said allocation based further on the expansion height of the line.

3. The photothermal conversion image generating device according to claim 1, wherein the line in the three-dimensional image is provided in a plurality.

4. A photothermal conversion image generating device that generates a photothermal conversion image for forming a three-dimensional image by causing a thermally expandable sheet to expand, the device comprising:

a processor that allocates, based on at least one of a pre-expansion or post-expansion line width and an expansion height of a line in the three-dimensional image, an image for forming said line to either a front surface of the thermally expandable sheet or a rear surface of the thermally expandable sheet, the processor causing the image so allocated to be printed on the allocated front or rear surface of the thermally expandable sheet, wherein the line in the three-dimensional image is provided in a plurality, and wherein, with respect to an intersection of respective lines of the plurality of lines in the three-dimensional image, the processor allocates the intersection to either the front surface of the thermally expandable sheet or the rear surface of the thermally expandable sheet based on the pre-expansion line widths and the expansion height of the respective lines forming the intersection and an expansion height of the intersection.

5. A photothermal conversion image generating device that generates a photothermal conversion image for forming a three-dimensional image by causing a thermally expandable sheet to expand, the device comprising:

a processor that allocates, based on at least one of a pre-expansion or post-expansion line width and an expansion height of a line in the three-dimensional image, an image for forming said line to either a front surface of the thermally expandable sheet or a rear surface of the thermally expandable sheet, the processor causing the image so allocated to be printed on the allocated front or rear surface of the thermally expandable sheet, wherein the processor sets a density at which the image for forming the line is to be printed based on the pre-expansion or post-expansion line width of the line in the three-dimensional image and the expansion height of the line, wherein the photothermal conversion image generating device further comprises a storage unit that stores height data regarding the expansion height of the line in the three-dimensional image, data regarding the pre-expansion or post-expansion line width of the line, data regarding the density at which the image for forming the line is to be printed, and data regarding the surface on which the image for forming the line is to be printed, all of which are associated with each other, and wherein in setting the density of the image forming the line, the processor reads data regarding the density that is stored in the storage unit as corresponding to the pre-expansion or post-expansion line width and the expansion height of the line.

6. A photothermal image generating device that generates a photothermal conversion image for forming a three-dimensional image by causing a thermally expandable sheet to expand, the device comprising:

a processor that allocates, based on at least one of a pre-expansion or post-expansion line width and an expansion height of a line in the three-dimensional image, an image for forming said line to either a front surface of the thermally expandable sheet or a rear surface of the thermally expandable sheet, the processor causing the image so allocated to be printed on the allocated front or rear surface of the thermally expandable sheet, wherein the line in the three-dimensional image is provided in a plurality, wherein, with respect to an intersection of respective lines of the plurality of lines in the three-dimensional image, the processor sets a density of an image for the intersection to be formed on the front surface and a density of an image for the intersection to be formed on the rear surface based on an expansion height of the intersection, wherein the photothermal image generating device further comprises a storage unit that stores height data of the line in the three-dimensional image, data regarding the pre-expansion or post-expansion line width of each of the respective lines forming the intersection, height data regarding the expansion height of the intersection of the respective lines, data regarding the density of the image for the intersection to be formed on the front surface and data regarding the density of the image for the intersection to be formed on the rear surface, all of which are associated with each other, and wherein in setting the density of the image for the intersection to be formed on the front surface and the density of the image for the intersection to be formed on the rear surface, the processor reads data regarding said respective densities that are stored in the storage unit as corresponding to the expansion height of the intersection.

7. A three-dimensional image forming system for forming a three-dimensional image by causing a thermally expandable sheet to expand, comprising:

a photothermal conversion image generating device including a processor that allocates, based on at least one of a pre-expansion or post-expansion line width and an expansion height of each line in a three-dimensional image, an image for forming said line to either a front surface of the thermally expandable sheet or a rear surface of the thermally expandable sheet;

an image forming device that forms the image of each line on the allocated front or rear surface of the thermally expandable sheet; and a light irradiation device that causes the thermally expandable sheet to expand by irradiating the image formed on the thermally expandable sheet with light, wherein the photothermal conversion image generating device sets a density at which the image is to be printed, and the image forming device prints the image at the density set by the photothermal conversion image generating device, wherein the three-dimensional image forming system further comprises a storage unit that stores height data regarding the expansion height of the line in the three-dimensional image, data regarding the pre-expansion or post-expansion line width of the line, data regarding the density at which the image for forming the line is to be printed, and data regarding the surface on which the image for forming the line is printed, all of which are associated with each other, and wherein in setting the density at which the line is printed, the photothermal conversion image generating device reads data regarding the density stored in the storage device as corresponding to the pre-expansion or post-expansion line width of the line and the expansion height of the line.

8. The three-dimensional image forming system according to claim 7, wherein the processor corrects a printing density of a printing material based on a type of the printing material with which the image forming device forms a photothermal conversion image.

* * * * *